Oct. 16, 1956  J. B. RETALLACK  2,767,246
AUTOMATIC MESSAGE ACCOUNTING SYSTEM
Original Filed Sept. 4, 1947  21 Sheets-Sheet 1

INVENTOR
J.B. RETALLACK
BY
J. W. Schmied
ATTORNEY

Oct. 16, 1956        J. B. RETALLACK        2,767,246
AUTOMATIC MESSAGE ACCOUNTING SYSTEM
Original Filed Sept. 4, 1947        21 Sheets-Sheet 3

INVENTOR
J. B. RETALLACK
BY
J. W. Schmied
ATTORNEY

Oct. 16, 1956  J. B. RETALLACK  2,767,246
AUTOMATIC MESSAGE ACCOUNTING SYSTEM
Original Filed Sept. 4, 1947  21 Sheets-Sheet 14

INVENTER
J. B. RETALLACK
BY
J. W. Schmied
ATTORNEY

Oct. 16, 1956 — J. B. RETALLACK — 2,767,246
AUTOMATIC MESSAGE ACCOUNTING SYSTEM
Original Filed Sept. 4, 1947 — 21 Sheets-Sheet 15

INVENTOR
J. B. RETALLACK
BY
ATTORNEY

Oct. 16, 1956  J. B. RETALLACK  2,767,246

AUTOMATIC MESSAGE ACCOUNTING SYSTEM

Original Filed Sept. 4, 1947  21 Sheets-Sheet 19

INVENTOR
J. B. RETALLACK
BY
J. W. Schmied
ATTORNEY

Oct. 16, 1956      J. B. RETALLACK      2,767,246
AUTOMATIC MESSAGE ACCOUNTING SYSTEM
Original Filed Sept. 4, 1947      21 Sheets-Sheet 20

INVENTOR
J. B. RETALLACK
BY
ATTORNEY

Oct. 16, 1956  J. B. RETALLACK  2,767,246
AUTOMATIC MESSAGE ACCOUNTING SYSTEM
Original Filed Sept. 4, 1947  21 Sheets-Sheet 21

INVENTOR
J. B. RETALLACK
BY  J. H. Schmied
ATTORNEY

United States Patent Office 2,767,246
Patented Oct. 16, 1956

2,767,246

AUTOMATIC MESSAGE ACCOUNTING SYSTEM

John B. Retallack, New York, N. Y., assignor to Bell Telephone Laboratories, Incorporated, New York, N. Y., a corporation of New York Original application September 4, 1947, Serial No. 772,092, now Patent No. 2,639,092, dated May 19, 1953. Divided and this application January 4, 1952, Serial No. 264,909

4 Claims. (Cl. 179—7.1)

This invention relates to telephone exchange systems and more particularly to automatic message accounting equipment for such systems.

Circuits have heretofore been proposed for automatically preparing records for short-haul toll calls which may be used for enabling bills to be prepared for transmission to subscribers for all toll calls made during a billing period. Two types of automatic ticketing circuits have been proposed, the first employing a ticket printer associated with a trunk employed in the establishment of the toll connection, which printer prints on a ticket all of the call data that may be required for ticketing the call. Such a system is fully disclosed, for example, in the application of J. W. Gooderham, Serial No. 448,782, filed June 27, 1942, and in Patent 2,447,533, granted August 24, 1948, to J. B. Retallack. The second type of system employs a magnetic tape recorder which records all of the call data. A system of the latter type is disclosed in my copending application, Serial No. 772,091, filed September 4, 1947.

The toll ticket or tape has printed or recorded thereon the office code and numerical digits of the calling line designation, the class of the calling line, the office code and numerical digits of the called line designation, the charge rate for the call determined from the office zones in which the calling and called lines are located, digits indicative of the total elapsed time in minutes of the conversation, and may also have digits indicative of the month, day, hour, minute and fractional minute of the time when the particular call was made and digits indicative of the numbers of the sender and identifier used. If the tickets are printed, they may be sent to the central accounting office to enable the accounting office to prepare the usual bill for service as is now done with tickets manually prepared by toll operators.

The next logical step is the production of toll tickets or records which are capable of controlling billing or accounting devices to automatically prepare a bill suitable for mailing to a subscriber. In a system in which a toll ticket is printed it would be possible to modify the ticket printer so that in addition to printing the numerical data appertaining to a toll call, it would simultaneously print code data on the ticket corresponding to each item of numerical data whereby the ticket when submitted to an electronic scanner might, through the operation of the scanner, control suitable accounting apparatus. Such an electronic scanner has been disclosed in Patent 2,417,427, granted March 18, 1947, to R. F. Massonneau. If the call data are recorded on a tape magnetically, the tape may be read by a magnetic scanner to control accounting apparatus.

Automatic billing may be on either a bulk or on a detailed basis. If on a detailed basis the electronic or magnetic scanner will scan each of the tickets or records made during a billing period at any or all offices of an exchange area to make registrations of the data recorded on each ticket or record scanned, from which a computation of the money charge for the call is computed and a card punching machine is operated to punch a card corresponding to each toll call. The card would have punched thereon all of the necessary data relating to the call including the computed money charge necessary for billing the call. All of the cards thus prepared may then be sorted by an automatic sorting machine in accordance with the subscriber's account and a stack of sorted cards may then be submitted to an automatic billing machine. If the bulk billing basis is to be used the printed tickets may first be submitted to an electronic scanner which controls a sorting mechanism to sort the tickets into stacks in accordance with the subscribers' accounts. The stack of tickets appertaining to a subscriber's account is then submitted to another scanning device which controls computing mechanism to compute the individual charges for the separate calls in terms of message units, to add the computed individual charges and to add to that total the total message units for all local calls made during the billing period whereby a teletypewriter may be controlled to prepare a bill for the subscriber's account in which the charges are all billed in terms of message units.

It is an object of the present invention to enable the transfer of ticketing information from the ticket printing or recording mechanism of an originating office to receiving equipment of a centralized accounting office.

A further object of the invention is to enable the transfer of ticketing information to a centralized accounting office by voice frequency signals.

The present invention is illustrative of circuits whereby a magnetically recorded record of a toll call may be transferred to a receiver at centralized accounting office, registered therein, and whereby from the data registered in the receiver computations of the money charge for the call may be computed for controlling a card punching mechanism to punch a card for the call, which card will then be capable of use in an automatic billing machine. It is, however, to be understood that the equipment at the centralized accounting office disclosed herein could be controlled by signals transmitted thereto by an electronic scanner employed to scan the code marks on a printed ticket.

Certain of the subject-matter herein disclosed pertaining to the computing and billing apparatus at the centralized accounting office is claimed in my application Serial No. 772,092, filed September 4, 1947, of which this application is a division.

In general, the circuits of the present invention function to attain the hereinbefore enumerated objects in the manner now set forth. As soon as all of the data relating to a toll call have been recorded on the tape of the magnetic recorder, the ticketing trunk to which the recorder is individual is connected over an interoffice trunk circuit with an idle receiver at the centralized accounting office. As soon as the idle receiver becomes connected to the ticketing trunk and recorder, the data on the recorder tape are transmitted over the interoffice trunk by voice frequency signals, the several items of information including the office code and numerical digits of the calling subscriber's directory number, the tens and units digits of the sender number used in establishing the connection, the number of the calling line identifier used, the office code and numerical digits of the called subscriber's directory number, the class of the calling line, the rate at which the call is to be charged and the tens and units digits of the elapsed conversational time. If required, and the tape has recorded thereon the data concerning the month, day, hour and minute when the call was made, such data may also be transferred to other digit registers of the receiver. It is, however, more economical to secure the data as to the time when the call was made from equipment which may be made common to the receiving circuits at the accounting office. It will, of course, be obvious that the registered data of the sender and identifier numbers may be punched in a toll card only for the use of a maintenance man and that such data would not be printed on the subscriber's bill. When all of the data has been transferred to the receiver and the ticketing trunk is signaled to that effect, the connection to the accounting office is then released. The ticketing trunk is then made available for use on another toll call and the record on the tape of the associated recorder becomes erased.

The charge rate for the registered toll call may be determined directly from the charge rate register of the receiver if such charge rate was transferred thereto from the ticket record tape, or may be determined from the office code digits of both the calling and called line numbers as registered in the receiver. This is accomplished by the operation of a calling zone relay operable in accordance with the three registered office code digits of the calling subscriber's line number, by the operation of a called zone relay operable in accordance with the three registered office code digits of the called subscriber's line number and by the operation of a route charge relay under the joint control of the calling and called line zone relays. If required, the charge condition as determined by the operation of the route charge relay may be further modified in accordance with the class of service to which the calling line is entitled as registered in the class of service register of the receiver. When it is required that the place name of the called line be printed on the bill to be prepared, a place name relay may be operated at the time the called zone relay is operated.

With the tens and units elapsed time registers of the receiver operated and the route charge relay operated, a subtracting circuit is operated to subtract the prescribed initial period of conversation which may, for example, be three, four or five minutes, from the total registered elapsed minutes of conversation to determine the overtime minutes of conversation. The overtime minutes of conversation are then divided by a dividing circuit by one, two, three or five dependent upon the prescribed duration of each overtime period of conversation, as determined by the operated route charge relay, to determine the number of periods of overtime. Having determined the number of periods of overtime, such data are applied to a multiplying circuit which multiplies the number of overtime periods by the price set for each period as determined by the route charge relay, which price may, for example, be five or ten cents for each period. The charge for the overtime periods of conversation as determined in dollars, dimes and cents is then applied to a further adding circuit which adds thereto the charge for the initial period of conversation which may be five, ten, fifteen, twenty, twenty-five, thirty or thirty-five cents as determined by the operated route charge relay so that the output from this adding circuit gives the total charge in dollars, dimes and cents for the total period of conversation. This output is then applied to a progress circuit which, at the proper time, will operate punch magnets of a card punching machine to punch holes in a card representing the money charge for the toll call.

If a Federal tax is to be assessed for the call the output from the total charge determining circuit is divided by fifty to determine the number of fifty-cent increments of the charge subject to the tax and is then multiplied by five to determine the amount of tax to charge for the call on the basis that if the total charge is less than twenty cents no tax is assessed, but if the total charge is over twenty-five cents a tax of five cents will be assessed for each fifty-cent increment of the total charge. The output in dollars, dimes and cents of tax is then applied to the progress circuit which at the proper time will operate punch magnets of the punching machine to punch holes in a toll card representing the money charge for the Federal tax.

A progress circuit associated with the receiver is instrumental in enabling the punch magnets of the punching machine to punch the toll card to record in the proper order the items of information which are to appear on the printed bill to be supplied to the subscriber who has made the toll call.

The invention having now been described in a general manner, reference may be had for a more comprehensive understanding thereof to the following detailed description when read in connection with the accompanying drawings in which:

Fig. 1 shows schematically an originating office of an exchange area equipped for automatic ticketing comprising a ticketing trunk represented by the rectangle in the right portion of the figure accessible over line-finders and selector switches from subscribers' lines, a rectangle representing an identifier by which the identity of a calling line may be determined and recorded on the ticket tape recorder of the trunk, and rectangle representative of a central office sender controllable by digit impulses dialed thereto from a calling line for establishing a desired toll connection and for causing such called line number to be recorded on the ticket tape recorder of the trunk;

Figs. 2 and 3 taken together show a trunk circuit for associating the ticketing trunk of Fig. 1 with an idle receiving circuit and associated computing circuits at a centralized accounting office disclosed in Figs. 4 to 21, inclusive. The trunk circuit has access to ticketing trunks over the trunk finder disclosed in Fig. 2 and to an idle receiver and computing circuit over the finder of Fig. 3;

Figs. 4 and 5 taken together show the voice frequency receiving channels of the receiver;

Fig. 22 is a diagram showing how the several figures of the drawings should be arranged to completely disclose the invention.

Figure 1:
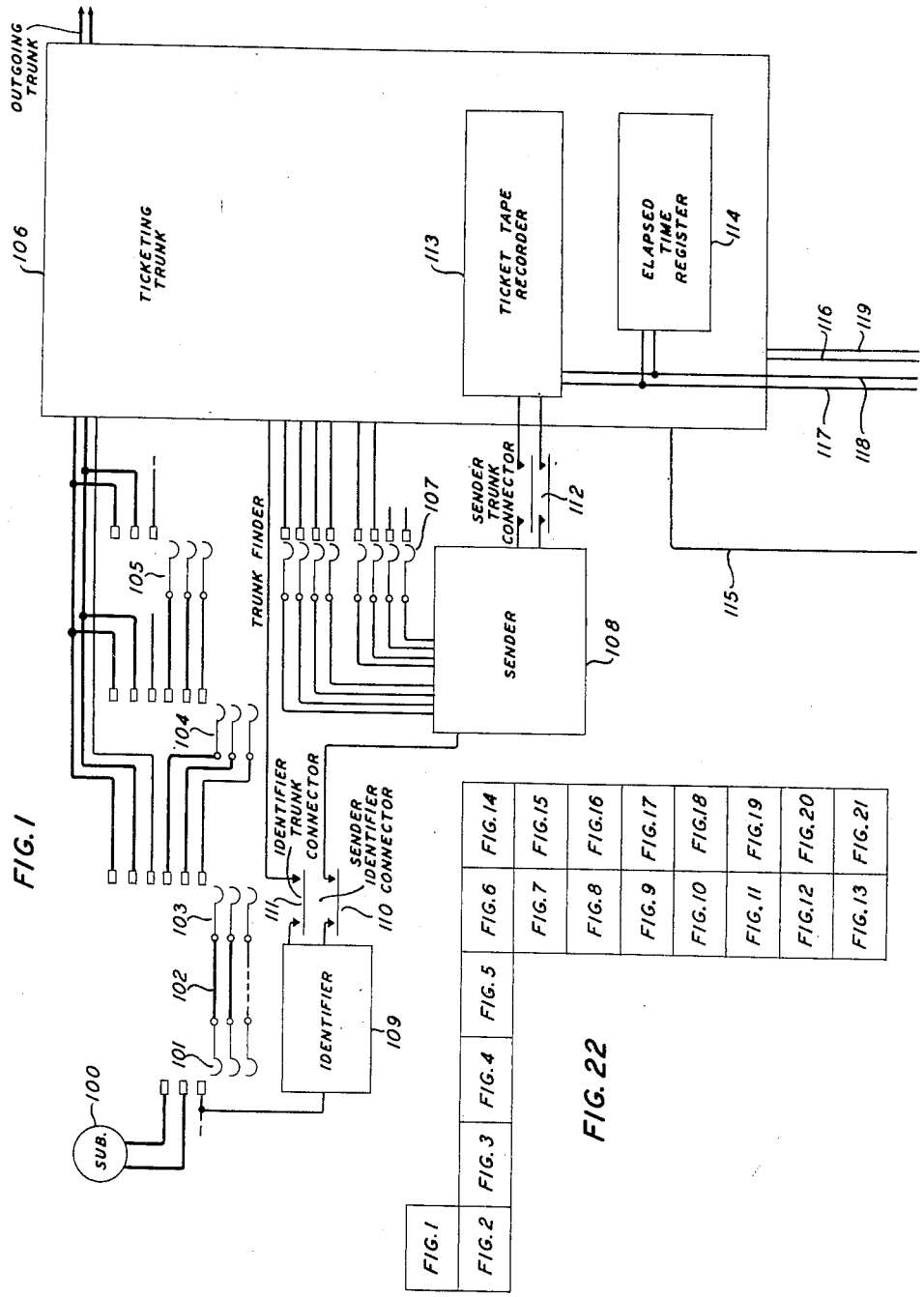

The circuits and apparatus schematically disclosed in Fig. 1 by which a record is secured for accounting purposes on all short haul toll calls is of the general type fully disclosed in the application of J. W. Gooderham hereinbefore referred to but modified for magnetic recording as disclosed in my copending application, Serial No. 772,091, filed September 4, 1947.

Figure 2:
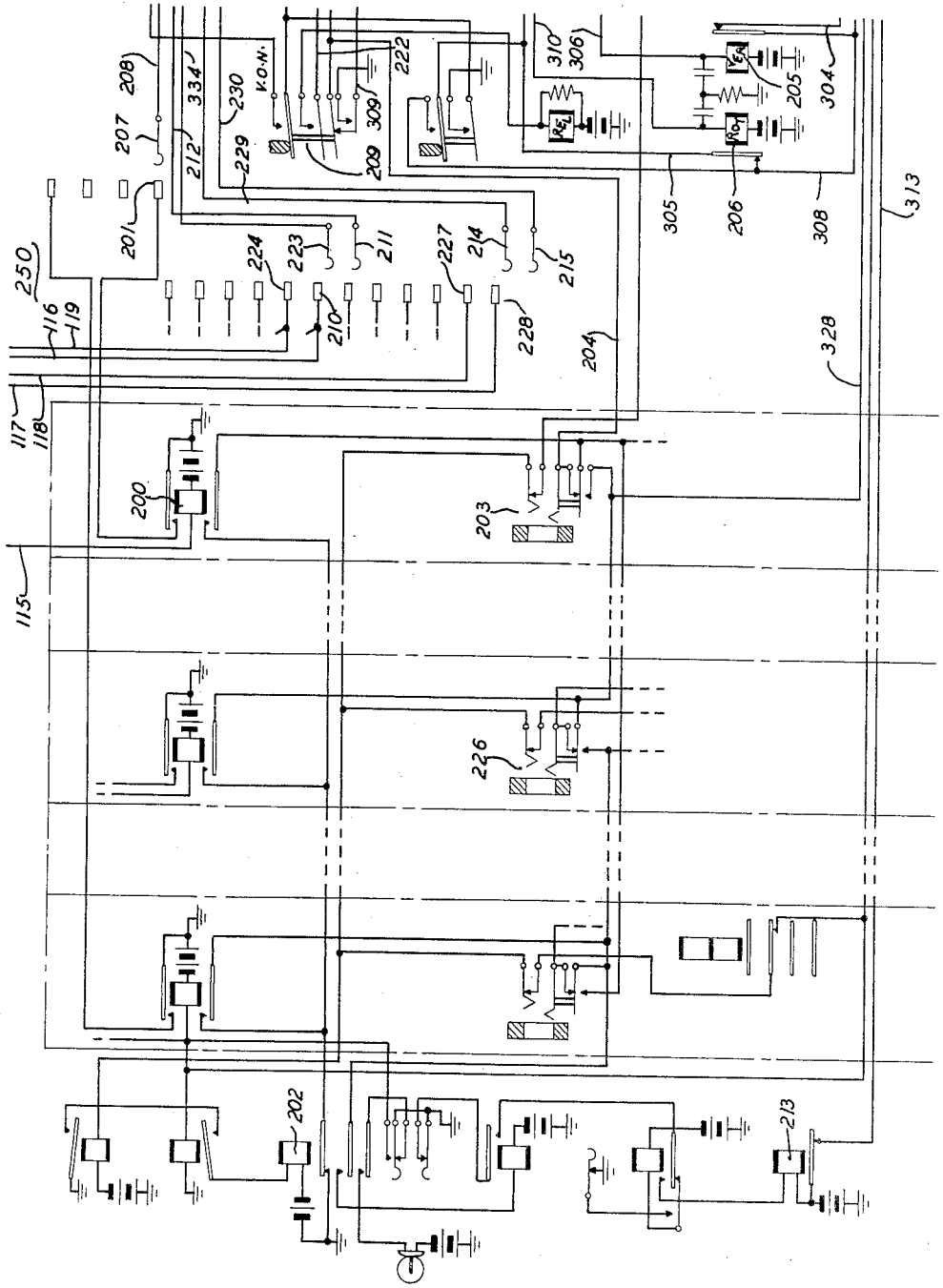
Figure 3:
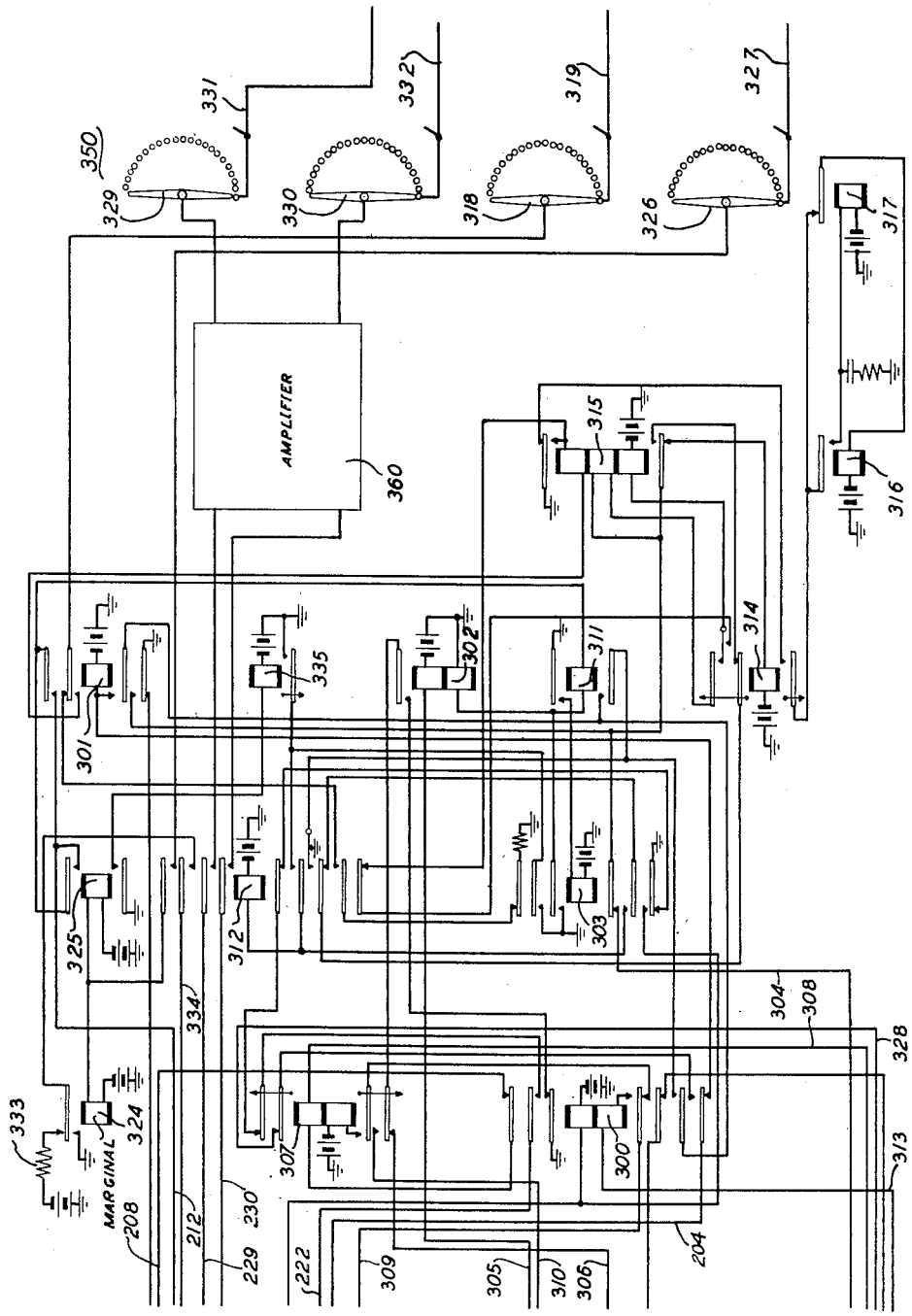

The trunk circuits shown in Figs. 2 and 3 by which any one of a plurality of ticketing trunks may be connected with an idle receiving and computing circuit at a centralized accounting office, may be of the type disclosed in Patent No. 1,780,906, granted November 11, 1930, to W. W. Carpenter and R. E. Hersey. The interoffice trunk circuit terminates at the originating office in a step-by-step trunk finder 250 of the Strowger type which has access to one hundred ticketing trunks grouped into ten groups of ten trunks each. This trunk finder is started in search of a ticketing trunk which has a toll ticket record for transmission to the centralized accounting office when the toll record has been completely recorded by the ticket tape recorder of the trunk. The interoffice trunk terminates at the centralized accounting office in a step-by-step rotary switch 350 of a well-known type having no definite normal position but always remaining standing when idle on the terminals of the receiving and computing circuits last used. If the originating office is quite remotely removed from the centralized accounting office an amplifier of any suitable type may be interpolated in the tip and ring conductors of the interoffice trunk as indicated by the box 360.

Figure 4:
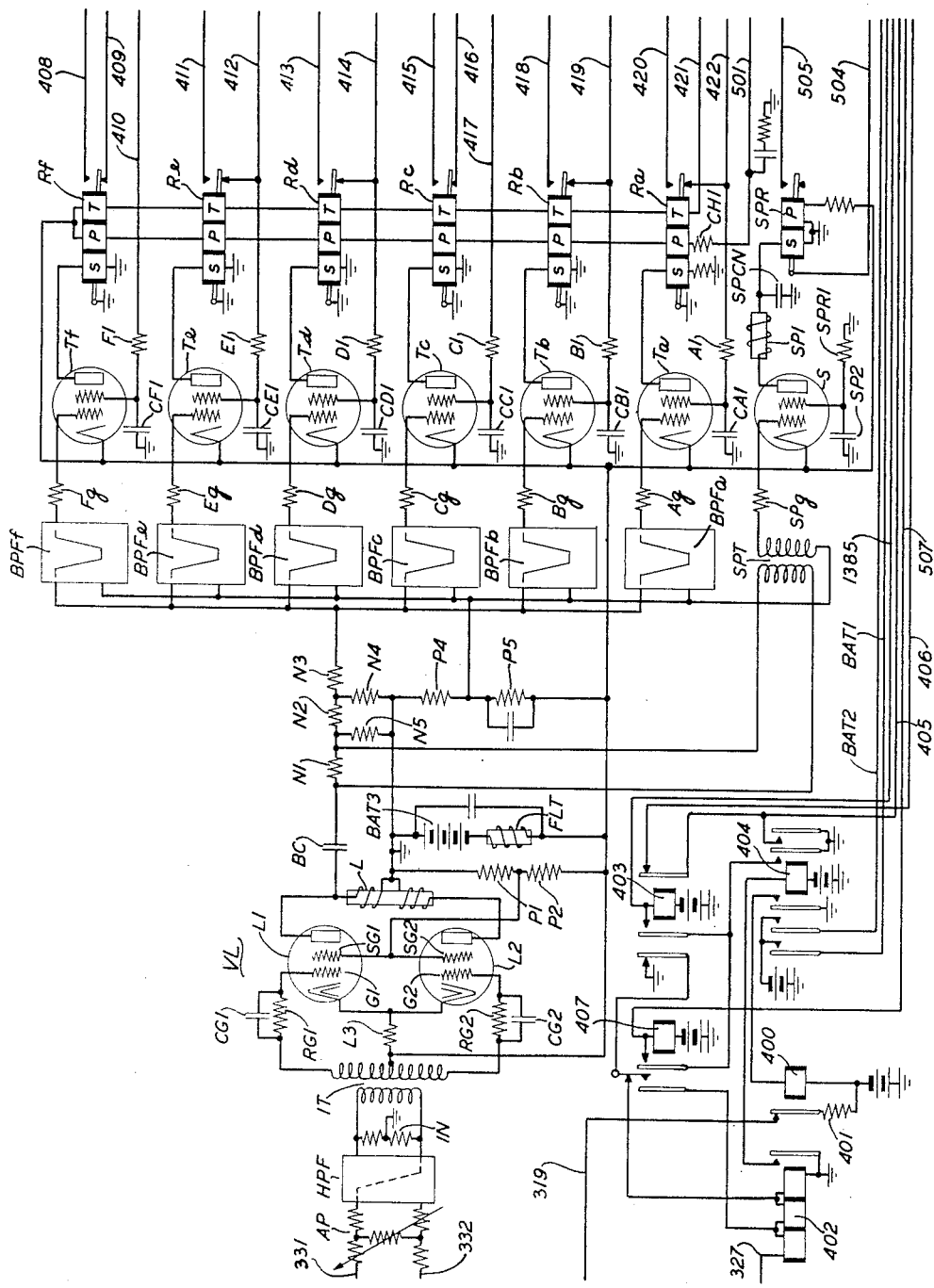
Figure 5:
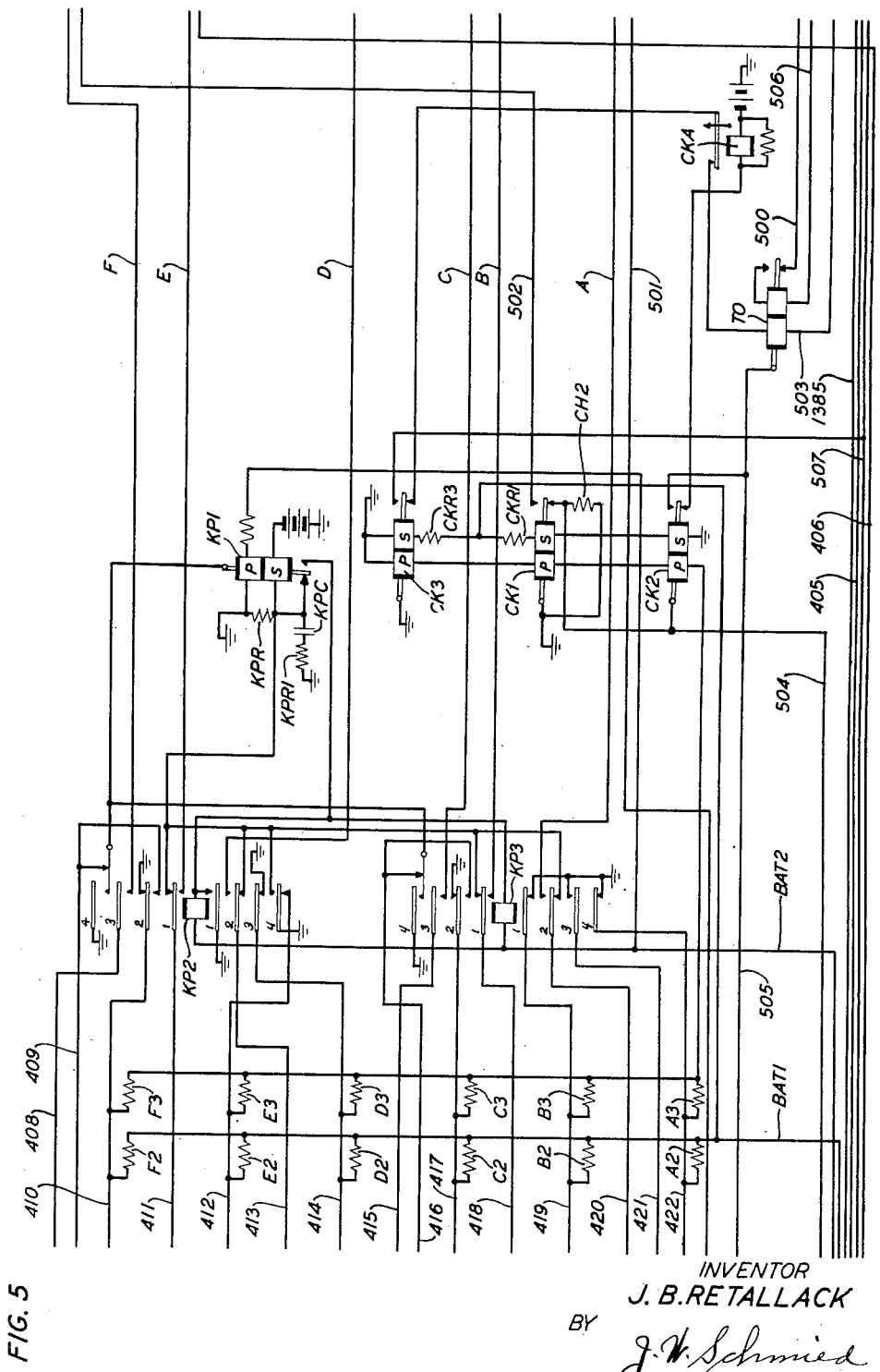

For receiving the voice frequency signals by which the toll call data is transmitted from the ticket tape recorder of a ticketing trunk, each receiving and computing circuit at the accounting office is provided with an amplifier and detector circuit disclosed in Fig. 4 and a check circuit shown in Fig. 5 for checking the accuracy of the received signal impulses. These circuits may be of the general type disclosed in Patent No. 2,332,912, granted October 26, 1943, to G. Hecht, A. A. Lundstrom and E. R. Taylor. The registers shown in Figs. 6 to 13, inclusive, are of the conventional relay type settable in response to received impulses.

Figure 13:
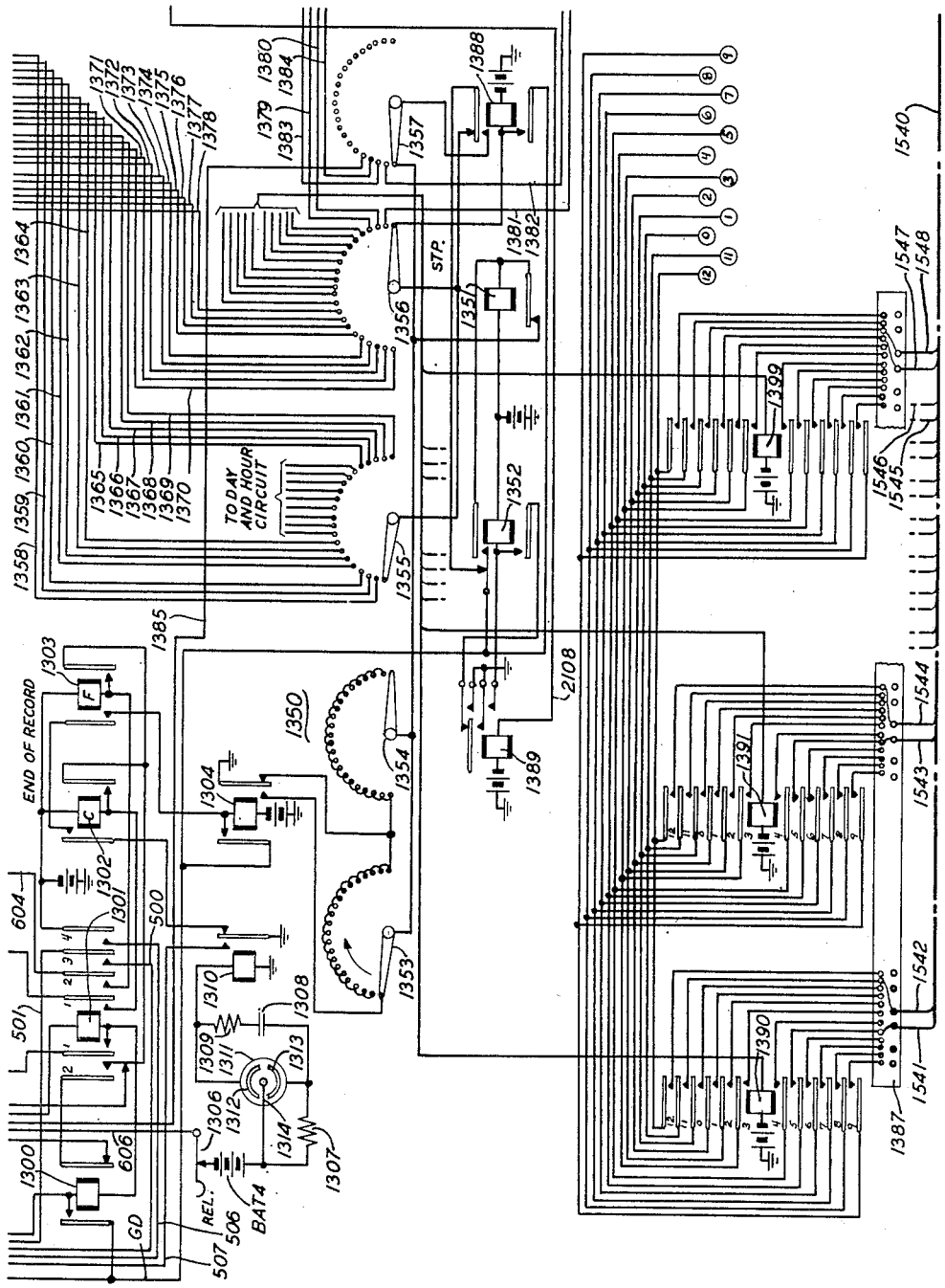
Fig. 13 shows the end-of-record register and the progress switch for controlling the punch machine to punch the registered and calculated data in the required order in a toll card.
Figure 21:
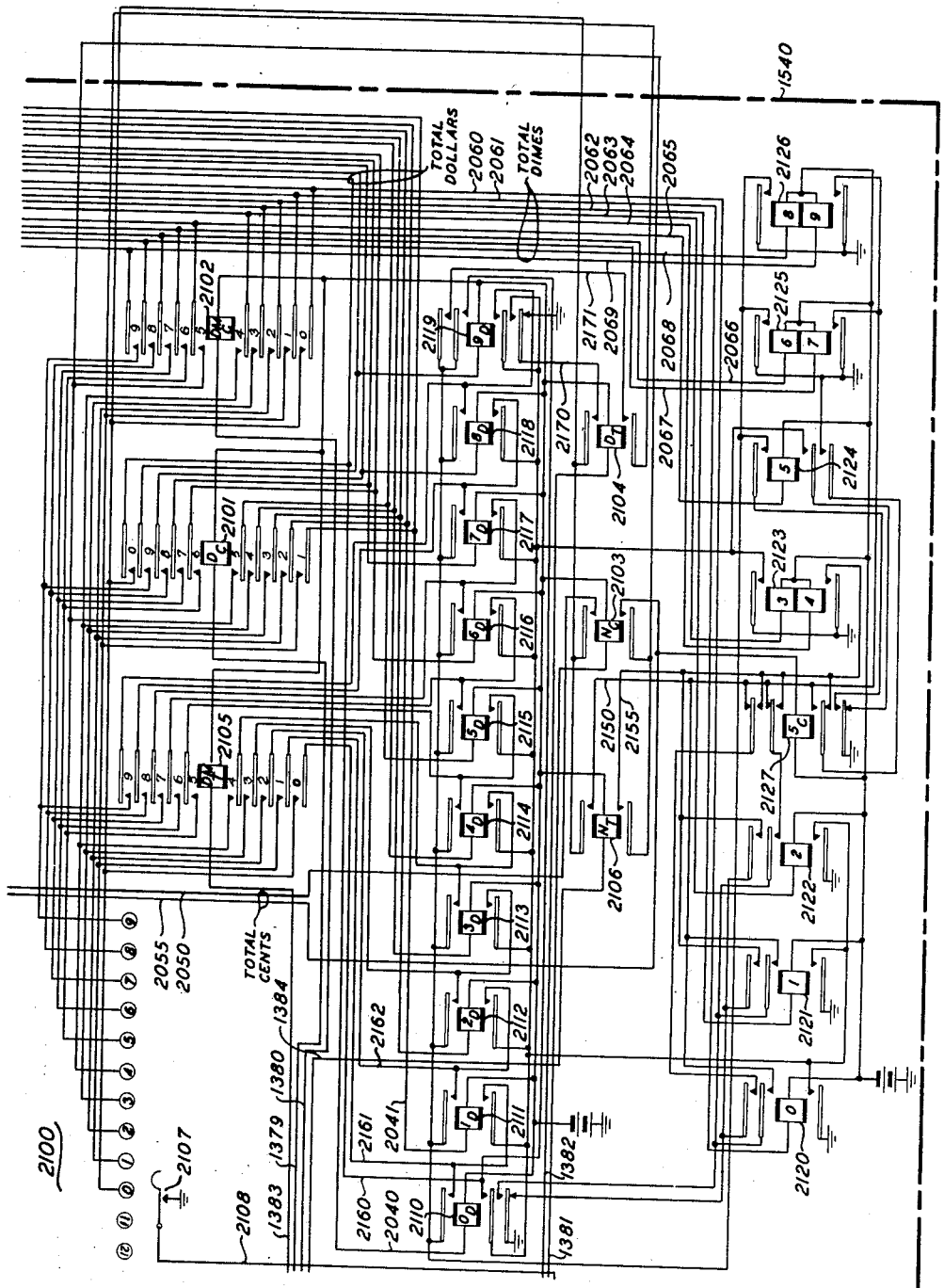
Fig. 21 shows in the upper portion thereof some of the relays of the progress circuit of Fig. 13 and in the lower portion thereof circuits for computing the tax to be assessed for the total charge for the call.

Progress switch 1350 disclosed in Fig. 13 is of the step-by-step rotary type which is advanced step by step under the control of its stepping magnet 1351 and stepping relay 1352 to successively associate the registers of the receiving circuit and portions of the computer circuit with terminals of the connecting rack 2100 of Fig. 21 which are connectable to the punch magnets of a card punching machine (not shown) of any suitable type.

Figure 14:
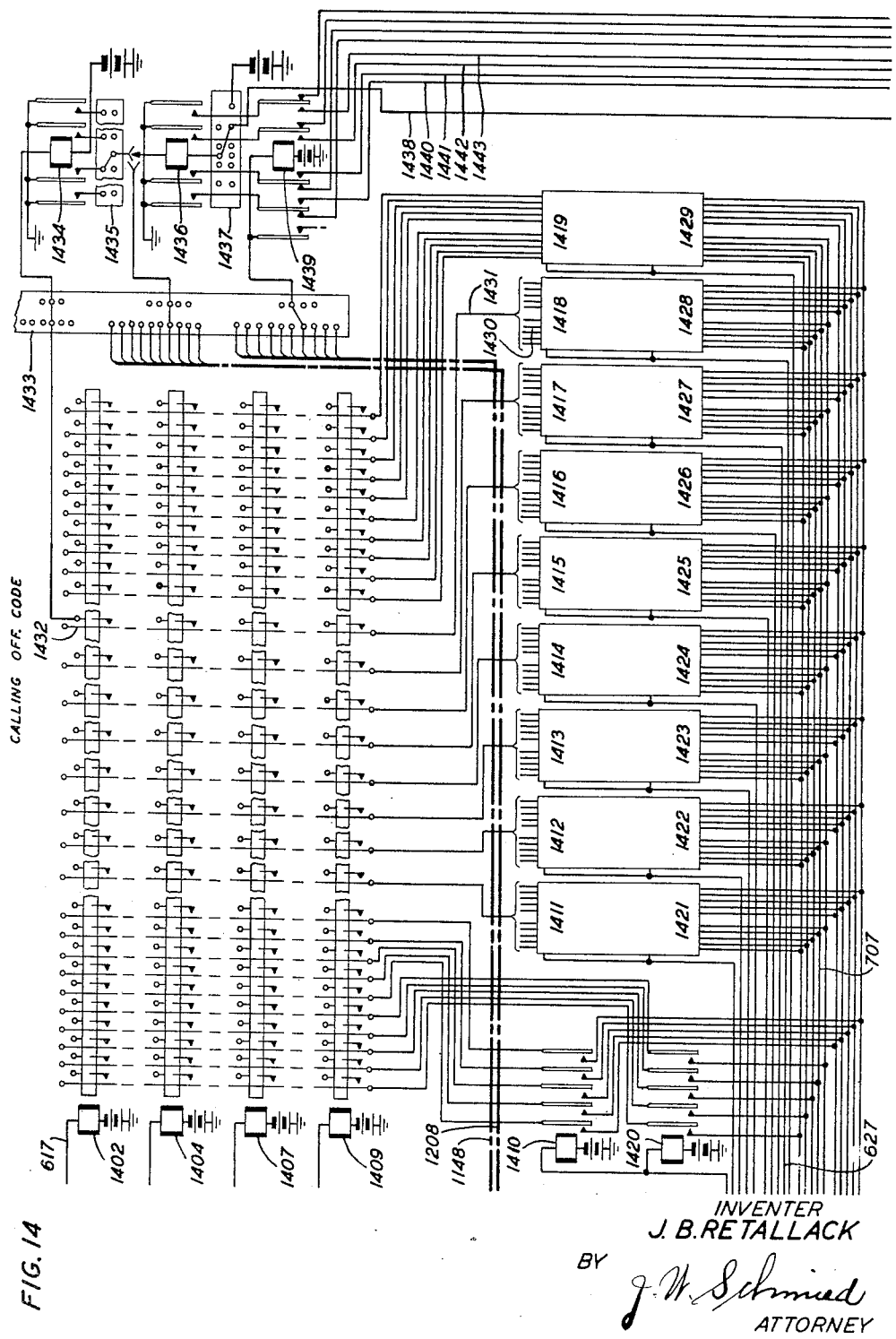
Fig. 14 shows the calling office code translator and calling zone, class of service and route charge relays.
Figure 15:
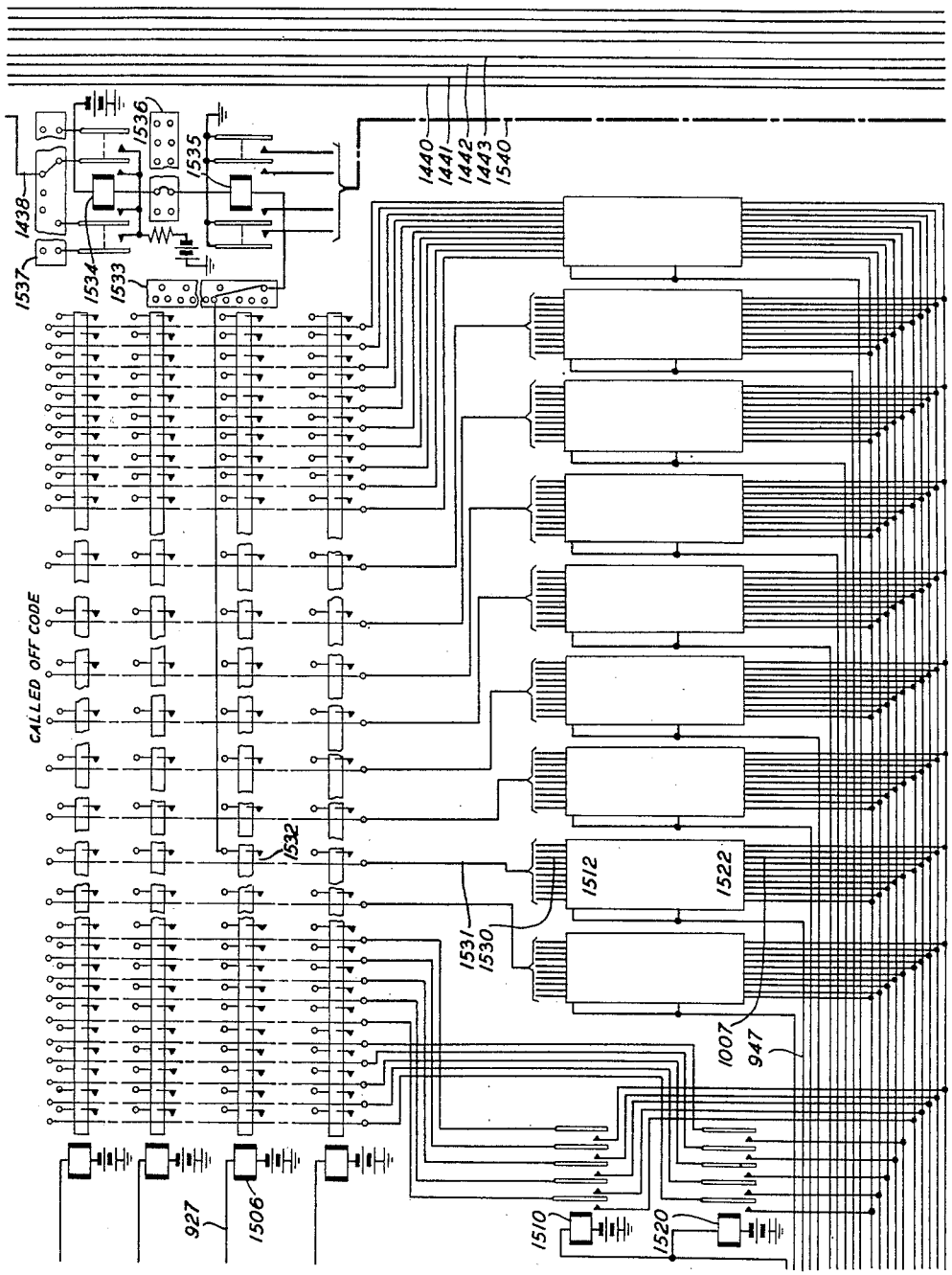
Fig. 15 shows the called office code translator and called zone and place name relays.

The translator circuits disclosed in Figs. 14 and 15 are of the well-known type employed in the decoders of panel type exchange systems, such, for example, as fully disclosed in Patent No. 1,862,549, granted June 14, 1932, to R. Raymond and W. J. Scully.

*Ticket recording*

The invention having now been briefly described, the manner in which the detailed data of a toll call is recorded on the tape of a ticket tape recorder, transferred to the accounting office and translated into data suitable for use by a toll card punching machine so that such card may be used in an automatic billing machine, will now be described in more detail.

It will be assumed that the calling subscribed at substation 100 of Fig. 1 whose directory listing is AUdibon 3–9096 desires a toll connection with a subscriber's line listed in the directory as MArket 7–1345 and initiates the call by removing the receiver at his subset from the switchhook. In response to the removal of the receiver, the line finder 101 is started to find the terminals of the calling line and when a connection is established from the first selector trunk 102 to the calling line, the usual dial tone is transmitted to the calling subscriber. Thereupon the calling subscriber dials the number of the wanted subscriber's line.

In response to the dialing of the first three office code digits M, A and 7, it will be assumed that the first selector 103 is stepped to the sixth bank level and then hunts for an idle second selector trunk in such level, that the selected second selector 104 is then stepped to its second level and hunts for an idle third selector trunk in such level and that the selected third selector 105 is then stepped to its seventh level and hunts for an idle automatic ticketing trunk in such level. It will be further assumed that the automatic ticketing trunk represented by the box 106 of Fig. 1 is thus selected and through an idle sender-trunk-finder 107 becomes connected with an idle sender represented by the box 108. The thousands digit of the called line designation dialed by the calling subscriber becomes registered in a register associated with the ticketing trunk and the remaining called line digits become registered in the sender. As soon as one digit becomes registered in the sender, the sender seizes an idle calling line identifier represented by the box 109 over the sender-identifier-connector 110. When the identifier is seized, it establishes additional circuits with the ticketing trunk over the identifier-trunk-connector 111 and proceeds to reconstruct the called office code digits dialed by the calling subscriber to reach the ticketing trunk and to cause the entire called line number to become registered in the sender. The identifier also proceeds to identify the calling line and to cause the directory number of the calling line to be registered in the sender. When the sender has secured the calling line number and class from the identifier, has registered the called line number and determined the rate to be charged for the call, it connects with the ticketing trunk over a sender-trunk-connector 112 and proceeds to transfer the calling line number, the called line number, a digit representative of the class of the calling line, a digit representative of the rate to be charged, and digits representing the number of the sender and the number of the identifier used, to the ticketing trunk for magnetic recording on the tape of the ticket recorder 113.

In the meantime the sender has proceeded to control selector switches to extend a connection from the ticketing trunk to the line of the called subscriber in accordance with the called line number registered in the sender. As soon as the called subscriber answers the elapsed time register 114 of the ticketing trunk is operated to start the registration of the elapsed time of the conversation and such register continues in operation until the called subscriber hangs up to terminate the conversation. Thereupon the lapsed time in minutes is transferred to and recorded on the tape of the tape recorder 113.

The operations just described are performed in the manner fully set forth in the Gooderham application hereinbefore referred to as modified for tape recording as described in my copending application hereinbefore referred to. The data recorded on the tape of recorder 113 will be in the form of composite waves representing the several digits of the recorded data. Such recorded digits for example, being as follows:

\* \* 283-9096-000-627-1345-52-16 \* \* where the digits 283–9096 represent the calling subscriber's number; the digits 000 represent the sender No. 00 and the identifier number 0; the digits 627–1345 represent the called subscriber's number; the digits 52 represent the calling line class 5 and the rate of charge 2 and the digits 16 represent sixteen minutes' elapsed time of the conversation.

*Starting an interoffice trunk to hunt for the ticketing trunk*

As soon as the recording of the elapsed time has been completed and the tape recorder is thus ready to transmit the toll call data, a start circuit is established for starting an idle interoffice trunk in search for the ticketing trunk and in search for an idle receiving and computing circuit at the accounting office. This start circuit may be common, for example, to a group of ten trunks and extends from ground at the ticketing trunk, over conductor 115 to battery through the winding of group relay 200 of the trunk circuit which has first choice access to the group of trunks in which the ticketing trunk 106 is located. Relay 200 upon operating places ground over its upper contacts upon segment 201 of the group commutator of the trunk finder 250, corresponding to the bank level in which the ticketing trunk appears, in the case assumed the first or lower most segment, and at its lower contacts establishes a circuit from ground at the back contact of relay 202, over the lower contacts of relay 200, over the lower normal contacts of make busy jack 203, conductor 204, the lowermost back contact of relay 300 to battery through the winding of relay 301. Relay 301 energizes in this circuit and establishes a circuit for relay 302 extending from ground over the lower front contact of relay 301, the inner lower back contact of relay 303, conductor 304, the back contacts of vertical magnet 205 and rotary magnet 206 of trunk finder 250, conductor 305 and to battery through the upper winding of relay 302.

With relay 302 operated a circuit is now established for the vertical magnet 205 of the trunk finder 250 which may be traced from battery through the winding of magnet 205, conductor 306, the lower back contact of relay 307, contacts of relay 302 and to ground at the inner upper back contact of relay 300. Magnet 205, upon operating opens at its back contact the circuit of relay 302, whereupon relay 302 in turn releases opening the circuit of magnet 205. Thus magnet 205 and relay 302 reciprocally control each other to cause the magnet 205 to step the brushes of trunk finder 250 vertically step by step until the commutator brush 207 engages the grounded segment 201. When this occurs a circuit is established for relay 307 extending from ground on brush 207, over conductor 208, over the upper back contact of relay 300, through the upper winding of relay 307, conductor 308, the back contact of rotary magnet 206, conductor 305 and to battery through the upper winding of relay 302. Relays 302 and 307 operate in this circuit, relay 307 locking over its lower winding and inner lower front contact, inner lower back contact of relay 300, conductor 309 and to ground at the lower alternate contacts of vertical off-normal springs 209, which springs closed when the trunk finder 250 took its first vertical step off normal. Relay 307 at its lower back contact also opens the operating circuit of the vertical magnet 205. With both relays 302 and 307 energized, a circuit is now established for the rotary magnet 206 extending from battery through the winding of magnet 206, over conductor 310, the lowermost front contact of relay 207 and contacts of relay 302 to ground at the innermost upper back contact of relay 300. Magnet 206, upon energizing, opens at its back contact the previously traced circuit extending through the upper winding of relay 302, whereupon relay 302 deenergizes in turn opening the circuit of magnet 206. Thus magnet 206 and relay 302 reciprocally control each other to cause magnet 206 to step the brushes of finder 250 over the terminals of the first bank level to which they were previously raised until the set of terminals is reached to which the ticketing trunk 106 is connected. Thereupon a circuit is established from battery through the winding of a relay in the trunk (not shown) over conductor 116, bank terminal 210, brush 211, conductor 212, upper contacts of relay 301, winding of relay 311 and to ground through the lower winding of relay 302. Relays 302 and 311 operate in this circuit, relay 311 closing an obvious circuit for relay 303 and a locking circuit for relay 301 extending from battery through the winding and inner lower contact of relay 301, over the lower contacts of relay 311 to ground at the intermediate lower normal contacts of relay 312 for holding relay 301 operated after relay 300 operates as later discussed. Relay 303, upon operating, closes at its innermost upper contacts a shunt around the lower winding of relay 302 causing the release of relay 302, closes at its lower front contact an obvious operating circuit through the upper winding of relay 300 and at its lower intermediate contacts prepares a circuit for relay 312. Relay 300, upon operating, locks from off-normal ground on conductor 309, over its innermost lower front contact and lower winding, conductor 313 and to battery at the back contact of relay 213 and at its uppermost back and innermost lower back contacts opens the initial operating and locking circuits of relay 307. Relay 307 thereupon releases. At the trunk circuit the relay operated in series with relays 302 and 303 opens the group start circuit over conductor 115 thereby releasing group relay 200 if there is at the time no other trunk in the same group waiting to be connected to the accounting office.

*Hunting for an idle receiving and accounting circuit*

At the time relay 301 operated, immediately following the starting of the trunk circuit, a circuit was also established for relay 314 extending from battery through the winding of relay 314, over the lower back contact of test relay 315 to ground at the lower front contact of relay 301. At its upper front contact, relay 314 establishes a saturating circuit for the test relay 315 which may be traced from battery through the lower winding of relay 315 over the upper contacts of relay 314, through the middle winding of relay 315 to ground at the lower front contact of relay 301. Relay 315 does not, however, become energized sufficiently to attract its armature. At its lower contacts relay 314 establishes a circuit for the stepping relay 316 of the finder 350 which extends from battery through the winding of relay 316 over the back contact of stepping magnet 317, the lower contacts of relay 314 and to ground at the upper back contact of test relay 315. Relay 316, upon energizing, connects the winding of stepping magnet 317 to ground at the upper back contact of relay 315 whereupon magnet 317 energizes opening the energizing circuit of stepping relay 316. Magnet 317 and relay 316 thus reciprocally control each other thereby advancing the brushes of the finder 350 step by step in search of an idle receiving circuit. As soon as the terminal set is reached to which an idle receiving circuit is connected, a circuit becomes established for test relay 315 extending from ground through the middle winding of test relay 315, the upper front contacts of relay 314, the lowermost back contact of relay 312, the upper winding of relay 315, the innermost upper contacts of relay 301, brush 318, conductor 319, back contact of relay 400, and through resistance 401 to battery. Relay 315 now receiving current through all of its windings operates quickly, locking in a circuit extending from ground over its upper front contact and through its upper winding, thence as traced to battery at the back contact of relay 400, opening at its upper back contact the operating circuits of relay 316 and magnet 317 and opening at its lower back contact the operating circuit of relay 314.

After an interval measured by its slow-releasing characteristic, relay 314 deenergizes and if at this time the trunk finder has completed its operation and relay 303 has operated, a circuit is established for relay 312 extending from battery through the winding of relay 312, the lower intermediate contacts of relay 303; the intermediate lower back contact of relay 312, the upper back contact of relay 314, the lower front contact of relay 315 and to ground at the lower front contact of relay 301. Relay 312, upon energizing, closes a holding circuit for itself extending from battery through its winding and its next-to-inner-most lower contact to ground at the intermediate upper contacts of relay 303; opens, at its intermediate lower back contact, its own initial operating circuit; transfers the locking circuit of relay 301 from direct ground to ground over the upper back contact of relay 314, the lower front contact of relay 315, and the lower front contact of relay 301; connects brushes 214 and 215 of finder 250 over conductors 229 and 230 to the input of amplifier 360; establishes a circuit extending in parallel through the windings of relays 324 and 325, over the upper contacts of relay 312, brush 326, conductor 327, through the left and intermediate windings of relay 402, over the left normal contacts of relay 407 and to ground at the left back contact of relay 403; and at its next to upper contacts connects battery through the high resistance 333, the back contact of relay 324, conductor 334, brush 223, bank terminal 224 and conductor 119 through the winding of a relay (not shown) in the ticketing trunk for the purpose of marking the ticketing trunk as busy so long as the trunk finder 250 is engaged therewith. Relays 325 and 402 operate in the circuit just traced, but relay 324 being marginal does not operate. At its upper contacts, relay 325 bridges the upper contacts of relay 301 in the holding circuit of relay 311 to hold the latter relay operated following the release of relay 301 and at its lower contacts establishes the circuit of slow-to-release relay 335 which operates and establishes an alternate holding circuit for relay 312 for holding relay 312 operated following the release of relay 303.

Should a second ticketing trunk of the same group be selected at this time with relay 300 operated and relay 307 unoperated, and the group relay 200 reoperated, relay 200 will again make the lowermost commutator terminal 207 busy as before described but will now start the trunk finder normally having first choice access to the group of trunks in the first level of its bank and in the second level of finder 250. The start circuit extends from ground at the back contact of relay 203, over the lower contacts of relay 200, lower normal contacts of jack 203, conductor 204, the lowermost contacts of relay 300, the innermost upper back contact of relay 307, conductor 328, the lower normal contacts of jack 226, thence through the winding of the relay of the interoffice trunk circuit corresponding to relay 301. Since the commutator segment and bank multiples are slip multipled in the well-known manner, the trunk finder started will step vertically to the second bank level when it will be arrested by its commutator brush, corresponding to brush 207, engaging the second segment of its commutator which is multipled to segment 201. In a similar manner should other trunks in the same group be placed in a calling condition, the operation of group relay 200 will be instrumental in starting succeeding trunk finders which normally have first choice access to other groups of ticketing trunks. This starting arrangement is in accordance with well-known so-called "paddle wheel" start circuit arrangement.

At the receiving circuit of Fig. 4 the operation of relay 402 establishes an obvious circuit for the off-normal relay 404 which, in turn, establishes an obvious circuit for relay 400. Relay 400 thereupon operates and removes battery from the previously traced circuit extending through the windings of test relay 315 in the interoffice trunk circuit, which test relay releases in turn opening the locking circuit of relay 301 which also releases. Relay 404 upon operating connects ground at its outer right contacts, over conductor 405 to the ground bus bar GD; connects battery over its middle left contacts to battery bus bar BAT2; connects battery over its outer left contacts to battery bus bar BAT1 and establishes a circuit from ground over its outer right contacts, the right back contact of relay 403, conductor 406 and serially through the windings of transfer relay 600 and progress relay 601. Relays 600 and 601 operate preparatory to registering a beginning of record registration.

Relay 600 upon operating locks itself and relay 601 to the ground bus bar GD and over its inner left contacts establishes a circuit from ground on bus bar GD, serially through the windings of transfer relay 610 and progress relay 611 which, in turn, operate. Similarly, relay 610 locks itself and relay 611 to ground bus bar GD and establishes an operating circuit for transfer relay 620 and progress relay 621. In the same manner the remaining transfer relays 700, 720, 740, 800, 820, 840, 860, 900, 920, 940, 1000, 1020, 1040, 1100, 1120, 1140, 1200, 1220, 1240, and 1300 and the remaining progress relays 701, 721, 741, 801, 821, 841, 861, 901, 921, 941, 1001, 1021, 1041, 1101, 1121, 1141, 1201, 1221, 1241 and 1301 are operated and locked to the ground bus bar GD.

The receiving circuits are now ready to receive signal impulses of voice frequencies transmitted from the tape recorder of the ticketing trunk. The signals transmitted are combinations of two out of six frequencies according to the following table:

| Character | Frequencies |
|---|---|
| 0 | $a, b$ |
| 1 | $a, d$ |
| 2 | $b, d$ |
| 3 | $d, e$ |
| 4 | $b, e$ |
| 5 | $c, d$ |
| 6 | $a, c$ |
| 7 | $b, c$ |
| 8 | $c, e$ |
| 9 | $a, e$ |
| KP and beginning of record | $c, f$ |
| End of record | $c, f$ |

The receiving circuits comprise a volume limiter VL, a "signal present" channel including the transformer SPT, vacuum tube S, a polarized relay SPR and associated circuits; a plurality of receiving channels one for each frequency in the entire signal band $a \ldots f$, each of which comprises a band pass filter BPF, a vacuum tube T and a polarized relay R such as, for instance, a channel reserved for frequency $a$ which is made up of band pass filter BPF$a$, a vacuum tube T$a$, and a relay R$a$; the "key pulse" signal circuit comprising relays KP1, KP2 and KP3 and associated circuits which operate in response to the initial operation of relay R$c$, R$f$ of the channels reserved for frequencies $c$, $f$ respectively when a beginning of record signal KP is transmitted to the receiving circuit; and a check circuit comprising relays CK1, CK2 and CK3 and associated networks which operate in the manner hereinafter set forth to check the impulses as they are received by the various channels affected by the frequencies in the signal impulses.

The alternating current signals from the transmitting magnet of the tape recorder are transmitted over a loop circuit including conductors 117 and 118, bank terminals 227 and 228 and brushes 214 and 215 of trunk finder 250, conductors 229 and 230 and the upper contacts of relay 312, to the input of amplifier 360, are amplified by the amplifier 360 and applied over brushes 329 and 330 of finder switch 350 and conductors 331 and 332 to the input of the receiving circuit of Fig. 4. The input elements of the receiving circuit comprise the adjustable pad AP, which is a means for adjusting the sensitivity of the receiving circuit to the minimum requirement since, by keeping the sensitivity as low as possible the likelihood of false operation on currents which may be produced by noise is materially reduced; the high pass filter HPF; the terminating resistance IN, the center tap of which is grounded; and the input transformer IT, the input winding of which is connected to the terminals of resistance IN and the output winding of which is connected to the common terminal of resistance RG1 and paralleled condenser CG1 and the common terminal of resistance RG2 and paralleled condenser CG2. The other common terminal of resistance RG1 and condenser CG1 is in turn connected to control grid G1 of vacuum tube L1 while that of resistance RG2 and condenser CG2 is connected to control grid G2 of tube L2. The mid tap of the output winding of transformer IT is connected through resistance L3 to the cathodes of tubes L1 and L2. High pass filter HPF at the receiver input is employed to suppress the unwanted frequencies below the signaling frequency band which may be present in the incoming signals.

The volume limiter VL comprises the pentode vacuum tubes L1 and L2 and their accompanying input and output circuits. The tubes are operated in the well-known push-pull relationship with their respective anodes connected together by means of retardation coil L and connected through the blocking condenser BC to the resistance network comprising resistances N1 to N5, inclusive. Anode potential is supplied to the anodes of the tubes from the anode battery BAT3 through the two sections of retardation coil L. The volume limiter provides adequate amplification of the incoming alternating current impulses to cause operation of the desired channels but limits its output signal voltage to such a value that channels other than those intended to be responsive to the frequencies in the signal will not operate on the transient currents generated at channel filter outputs of filters BPFa . . . BPFf by said signals when they start and stop.

The limiting action of the volume limiter VL is obtained by means of the control grid resistances and condensers RG1, CG1 and RG2 and CG2, which resistances and condensers cause the grid bias to become more negative when the alternating signal voltage on the control grids becomes high enough to cause them to draw current during the positive half waves. When this condition is reached the power output of the limiter becomes approximately constant regardless of further increases in the control grid voltage. The actual point at which limiting occurs is controlled by the bias voltage on the screen grids SG1 and SG2 by the bias voltage on the control grids and by the inherent limitation in maximum anode current with zero control potential and particular screen grid and plate potentials. The desired value of bias potential for the screen grids is obtained from the potential divider consisting of resistances P1 and P2 bridged across the battery source BAT3. The control grids G1 and G2 are held negative in the normal condition by the voltage drop across the cathode resistance L3.

The output of the limiter VL is divided into two parts by the resistances N1 and N5. The voltage across resistance N1 is applied to the "signal present" circuit which, as before stated, comprises the input transformer SPT, vacuum tube S and polarized relay SPR. This circuit responds to the small voltage generated across resistance N1 in consequence of any signal transmitted from the tape recorder, which signal, being stepped up by the input transformer SPT, is applied to the grid of the pentode vacuum tube S which functions as a rectifier by virtue of the normal positive grid bias and because of the resistance SPg in its control grid circuit. The signal voltage across resistance N5 is passed through the resistance network comprising resistances N2, N3 and N4 to the inputs of filters BPFa . . . BPFf which act to separate the signaling frequencies into the bands corresponding to the mid-band frequencies a, b, c, d, e, f, respectively.

The resistance network N2, N3 and N4 serves a threefold purpose (1) it provides attenuation to afford the desired relationship between channel sensitivity and the output of the volume limiter VL; (2) it affords a relatively constant impedance termination between the filters and the widely varying output impedance of the volume limiter; and (3) it attenuates transient disturbances reflected back from the filters to such an extent that they do not cause objectionable chatter of relay SPR.

The control grid of tube S is normally held positive by the voltage obtained from the potential divider comprising resistances P4 and P5 bridged across the battery BAT3. This positive bias, together with the reduced screen grid voltage obtained by the use of resistance SPR1 connected to the screen grid of tube S, improves the operation of the circuit and reduces the effect of tube variations. Condenser SP2 serves to by-pass the alternating current around resistance SPR1. Relay SPR has its secondary or bias winding (S) connected into the plate circuit of tube S, while its primary or operate winding (P) is connected to the battery BAT3 through the low resistance filtering retard coil FLT. When there is no signal present on the incoming trunk and therefore no signal voltage is being applied to the control grid of the tube S, the plate current flowing through the bias winding of relay SPR is sufficiently large to overcome the effect of the current in the operate winding and the relay armature remains in the normal position disclosed. But when an alternating current signal is applied to the control grid of tube S, the plate current is reduced due to the change in the potential on the grid, and the current through the operate winding (P) of relay SPR overcomes the reduced current through the winding (S) and the relay operates to move its armature into engagement with its upper contact.

The plate circuit of tube S includes retardation coil SP1 and condenser SPCN. These serve to reduce modulation products that would cause the relay SPR to chatter and to slow up the operate and release times of relay SPR by delaying the dying down and building up of the plate current through the secondary (S) winding of relay SPR. These delays compensate somewhat for the fact that there is no band-pass filter in the signal present channel, as compared, for example, with the filters BPFa . . . BPFf in the signal channels, and aid in preventing the operation of said signal channels by transients since as subsequently set forth, without the operation of relay SPR, signal channel relay operation cannot take place.

The armatures of relays SPR and CK2 are connected together over conductor 504 and to ground over the normal lower contacts of relay CK1, and the upper contacts of such relays are also multipled together over conductor 505 and connected to the armature of the polarized relay TO. From the lower normal contact of relay TO a circuit is extended over conductor 500, over the right No. 3 contacts of operate progress relay 1301, conductor 501, through resistance CH1 and through the middle (P) or operate windings of relays Ra . . . Rf in series to battery BAT3. Hence when relay SPR operates in response to an incoming signal it causes the energization of the operate windings of all of the channel relays preparing such relays for operation when their associated channels will have responded to frequencies in the signals as hereinafter set forth. It may be noted that when relay CK2 operates as described later it has the same effect as relay SPR and also that when relay CK1 operates it removes a short circuit from resistance CH2 and thus inserts high resistance into the circuit established over the contacts of relays SPR and CK2 for a purpose to be later described.

With the receiving circuit thus cut through to the tape recorder there is a brief period during which the receiver might be exposed to noise currents if the receiving circuit were ready to receive signal frequency impulses, which might cause the circuit to operate falsely and thereby cause a false setting of the registers of the receiving circuit. To guard against this the receiving circuit is normally held in a condition whereby signal impulses cannot be registered until a definite timed impulse consisting of frequencies c, f, is received indicative of the start of transmission from the tape recorder of recorder toll data for a toll call, which impulse is transmitted in response to a KP or start signal recorded on the tape. The signal of composite frequencies cf is applied through the pad AP, the filter HPF and the left winding of input transformer IT. The signal voltage thereby generated in the left winding of transformer IT is induced into the right winding of such transformer, amplified by the volume limiter VL and then applied partly across resistance N1 and partly across resistance N5. The potential developed across resistance N1 is then applied to the left winding of transformer SPT of the "signal present" circuit, and the potential developed across resistance N5 is then applied to the input terminals of the several filters BPFa . . . BPFf. Since only the filters BPFc and BPFf are each tuned to pass one of the two frequencies in the signal, the voltages at the outputs of such filters are applied to the grids of vacuum tubes Tc and Tf through resistances Cg and Fg but not to any of the other channel tubes.

Now each of the channel tubes Ta . . . Tf is provided with a positive grid bias from the battery BAT3 through the coil FLT and resistances P4 and P5 and a control grid resistance Ag . . . Fg respectively to make each tube to function as a detector. The signal present circuit functions in the manner previously described to cause the operation of relay SPR and the consequent application of current to the primary (P) windings of the channel relays Ra . . . Rf. Positive potential is normally supplied to the anodes of the tubes Ta . . . Tf through the secondary (S) windings of the associated channel relays Ra . . . Rf and with positive potential between the grids and cathodes of these tubes, anode current flows through the tubes and through the secondary (S) windings of the channel relays but such relays will not operate due to the opposing energization of the primary windings of such relays as described. However, in response to the application of voltage to the control grids of tubes Tc and Tf in response to the incoming KP signal, the anode current flowing through these two tubes is reduced, causing relays Rc and Rf to operate in response to the current flowing through their primary windings.

With relays Rc and Rf thus operated, ground is disconnected from conductors 409 and 416 thereby opening the circuits which extend in parallel from ground over the normal contacts of relays Rc and Rf, over conductors 409 and 416, over the upper No. 4 normal contacts of relays KP2 and KP3 and thence over the armature and left normal contact of relay KP1 and through the lower winding of relay KP1 to battery. Relay KP1 now operates slowly over an obvious circuit through its operate (P) winding, the slowing of its operation being due to the charging current for condenser KPC flowing through its secondary winding (S) and resistance KPR1, which current opposes the current flowing through the primary winding. When the condenser KPC is completely charged the current flowing through the winding (S) is limited by the high resistance KPR and since the magnetic flux generated by the current flowing through the secondary winding is smaller than the flux produced by the current flowing through the primary winding the relay operates. Resistance KPR is provided to insure that the armature of relay KP1 shall always engage its left contact when the circuit is idle.

Now when the KP signal is terminated after the required interval to operate relay KP1, the release of relays Ac and Af will cause ground to be reconnected to conductors 409 or 416 and over the upper No. 4 normal contacts of relays KP2 and KP3, over the armature and right contact of relay KP1 and through the windings of the KP2 and KP3 relays to the battery bus bar BAT2. These relays now operate and lock to ground over the lower No. 1 contacts of relay KP2. The upper No. 4 alternate contacts of relays KP2 and KP3 maintain ground connected over the contacts of relay KP1 to the windings of relay KP2 and KP3 as they operate. At its lower No. 4 contacts relay KP2 now establishes a circuit from ground to the secondary winding (S) of relay KP1 increasing the current flow therethrough in consequence thereof and causing relay KP1 to release and move its armature into engagement with its left contact.

Relays KP2 and KP3 upon operating perform the general function of connecting the upper contacts of the channel relays Ra . . . Rf to conductors A . . . F which, in turn, are connectable by the progress relays, such as 601, to relays of the registers of the receiving circuit. Relays KP2 and KP3 also remove ground from the vacuum tube side of the resistance A2, A3 . . . F2, F3 but ground is still maintained on each pair of resistances as, for example, resistances A2 and A3 through the lower contacts of each channel relay to maintain the screen grid of the corresponding channel tube at the required potential. As explained later, when the circuit is in this condition the screen grid potential of each channel tube is changed when the corresponding channel relay operates, whereas in the original condition the operation of the channel relays has no such effect. In addition, relay KP3, over its lower No. 3 contacts and conductor 421, establishes a circuit serially through the tertiary (T) windings of all channel relays. These windings are poled to oppose the primary windings (P) of such relays and, for certain operations described hereinafter, function to release the channel relays.

As previously described, it is necessary that frequencies c and f be received for a definite interval of time without the presence of frequencies a, b, d or e if the circuit is to unlock; that, is relay KP1 is to operate and in turn operate relays KP2 and KP3. If an impulse containing one or more of these latter frequencies should appear at any time before relays KP2 and KP3 have operated, the corresponding channel relay, or relays will, of course, operate and supply ground to the secondary winding (S) of relay KP1 and to condenser KPC by way of the upper No. 4 and lower No. 2 back contacts of relays KP2 and KP3, or any of them. This ground restores the full bias current to the secondary winding of relay KP1 and, if this relay had already started to operate because of the presence of frequencies c and f in the extraneous impulse along with the other frequencies, it will restore immediately because of the full bias current produced by the connection of ground to its secondary winding, and condenser KPC will discharge to said ground in preparation for a new timing cycle. If relay KP1 is normal when the extraneous impulse appears, the application of ground to the secondary winding of relay KP1 simply causes the relay to remain in its unoperated position; that is, with its armature against its left contact. In either case, the result is that the channel relays remain ineffective for the purpose of registering their operated condition until frequencies c and f appear by themselves for the necessary length of time, since, with relays KP2 and KP3 normal, the front contacts of the channel relays are not cut through to the first register of the receiving circuit, and the channel relays which were operated by the impulse will therefore restore when the impulse is terminated, since with the removal of the grid potential from the associated tube by the termination of the impulse, the full anode potential is restored, which flowing through the secondary winding of the associated channel relay will cause the latter to restore. It will be noted that during these operations the screen grid of each tube remains grounded through appropriate contacts of relays KP2 and KP3 and therefore will have no effect upon the intensity of the anode current when the signal potential is removed from the grid. That is, prior to the reception of the KP signal, the channel relays are free to operate and release in accordance with the application and removal of the incoming alternating-current signal. The reason for this is because the screen grids of the several channel tubes, being grounded at the contacts of the KP2 and KP3 relays, are powerless to change the intensity of associated anode currents when the latter increase to their normal strength upon the removal of the impulse potential, in consequence of which the several channel relays restore to normal in response to the preponderating bias current flowing through their respective secondary windings. After the KP signal has been received, however, and relays KP2 and KP3 have become operated in consequence thereof, the direct ground formerly applied by way of some of their back contacts to the screen grids of all the channel tubes is removed and these grids are connected to ground only as long as their respective channel relays remain on their back contacts with the result that, when a channel relay operates, the screen grid potential of its associated tube is changed in such a way that the relay is locked up. This locking action is caused by the fact that when a channel relay operates, after the anode current flowing through the winding (S) has been reduced sufficiently by the incoming signal, the operated relay, by causing its grounded armature to break with its back contact, removes ground from the screen grid of its associated tube and causes the latter to be connected to a potential divider which supplies a much lower voltage than normal between the screen grid and cathode and, as a consequence the anode current of the tube remains reduced after the signal has terminated and the control grid has been restored to its normal potential.

Thus should a signal comprising frequencies $a$ and $b$ be transmitted before the KP signal of frequencies $c$ and $f$ and therefore before relays KP2 and KP3 are operated the voltage due to the signal will be applied to the control grids of the tubes T$a$ and T$b$ and relays R$a$ and R$b$ will therefore operate. When operated, relay R$a$ opens one of the two paths by which ground reaches conductor 422 and relay R$b$ opens one of the two paths by which ground reaches conductor 419 but, since relays KP2 and KP3 are not operated ground is still applied to these conductors over the lower Nos. 1 and 4 back contacts of relay KP3 and thence to the screen grids of tubes T$a$ and T$b$. The presence of ground on these grids will cause the reduction of anode current to be determined exclusively by the potential of the signal applied to the control grids so that when the signal ceases the anode current is restored to its original value and relays R$a$ and R$b$ release. When, however, a signal comprising any two of the frequencies $a$ ... $f$, say $a$ and $c$, is transmitted after the operation of relays KP2 and KP3 and the consequent removal of ground supplied over their back contacts to conductors 410, 412, 414, 416, 419 and 422, the corresponding channel relays R$a$ and R$c$ now operate as before but in so doing remove ground from the screen grids of their respective tubes T$a$ and T$c$. With these grounds removed these grids are connected to a potential divider comprising resistances A2 and C2, A3 ... F3 and the (P) windings of relays CK1, CK2 and CK3 as follows: Through resistances A2 and C2 and to battery bus bar BAT1 and through resistances A3 and C3 serially through the primary windings (P) of relays CK1, CK2 and CK3 and to ground shunted by the four resistances B3, D3, E3 and F3 in parallel. The potential applied by this network to each of the screen grids of the tubes T$a$ and T$c$ is lower than that available over the previous ground connection and thus will cause a further reduction in the anode currents. When the signal voltage ceases the control grids are restored to their normal positively biased state but since a low potential is still available at the screen grids from the potential divider network the anode currents are still reduced in spite of the restoration of the control grids to their normal state thereby causing relays R$a$ and R$c$ to remain in an operated condition until their operate windings are opened.

It will be noted that when relay KP2 operates it applies ground over its lower No. 4 contacts to the secondary winding of relay KP1 and to condenser KPC in the same way as the channel relays R$a$, R$b$, R$d$ and R$c$ when and if any of them operate on an alternating-current impulses prior to the appearance of the timed KP impulse of frequencies $c$ and $f$. This ground causes relay KP1 to release and condenser KPC to discharge as above stated but the release of the relay does not interfere with the operation of relays KP2 and KP3 since these relays are now locked to ground over the lower No. 1 contacts of relay KP2. The purpose of this arrangement is to make sure that the timing circuit, comprising relay KP1 and condenser KPC, is normal and ready to provide a complete timing cycle on the next signal. A sequence adjustment of the lower No. 1 contacts of relay KP2 insures that these contacts are closed ahead of the lower No. 4 front contacts which release relay KP1.

As hereinbefore stated the operation of any of the channel relays following the operation of relays KP2 and KP3 by the KP signal causes ground to be connected to the associated one of conductors A ... F for operating relays of the registers in various combinations; causes ground to be removed from the corresponding resistances A2 ... F2 to reduce the voltage on the screen grids of the tubes; causes the operated channel relays to lock in consequence thereof and allows current to flow through the primary windings of relays CK1, CK2 and CK3 in an amount directly proportional to the number of relays R$a$ ... R$f$ which are operated in response to any signal impulse. It will be noted that prior to the reception of the KP signal the (P) windings of relays CK1, CK2 and CK3 are short-circuited through resistances A3 ... F3 and over back contacts of relays KP2 and KP3.

Relays CK1, CK2 and CK3 are all polarized by their secondary windings (S) which are energized from the bus bar BAT1 through resistances CKR1 and CKR3. The operate current through the respective primary windings (P) and the bias current through the respective secondary windings (S) are so proportioned that none of the relays will operate when a single channel relay is operated. Relays CK1 and CK2 will operate, however, when two channel relays operate because of the increase of current through their primary windings and relays CK1, CK2 and CK3 will be operated when three or more of the channel relays operate because of a still higher increase in the current through their primary windings. Relays CK1, CK2 and CK3 thus serve to check each of the incoming signals and to inform the registering circuits whether or not the signals should be registered.

It will be recalled that all of the transfer and progress relays of the register circuit have been operated and it will now be assumed that the KP signal has been received resulting in the operation of the KP2 and KP3 relays. It will also be assumed that the tape recorder transmits a second KP signal of the frequencies $c$ and $f$. These two KP signals signify the beginning of a toll call record in the same manner as the two asterisks printed on the toll ticket as dislosed in the Gooderham application hereinbefore referred to. Upon the response of the channel relay R$c$ to the frequency $c$ a circuit is established from ground over its front contact, over conductor 415, the upper No. 3 contacts of relay KP3, conductor C, over the right No. 3 front contact of operated progress relay 601, and to battery through the winding of the C relay 602 of the Beginning of Record register of Fig. 6. Also upon the response of the channel relay R$f$ to the frequency $f$ a circuit is established from ground over its front contact, conductor 408, the upper No. 3 contacts of relay KP2, conductor F, over the right No. 6 front contact of progress relay 601, and to battery through the winding of the F relay 603 of the Beginning of Record register. When the CK1 and CK2 relays operate in response to the second KP signal, relay CK1 establishes a supplemental holding circuit for progress relay 601 and transfer relay 600 which may be traced from ground, over the armature and front contact of relay CK1, conductor 502, left No. 1 contacts of relay 601, thence through the winding of relay 601, to battery. Relay 601 is thus held operated so long as relay CK1 remains operated but the application of holding ground shunts down relay 600 which thereupon releases. When the second KP signal impulse ceases and relays CK1 and CK2 release, the locking ground for progress relay 601 is removed by the release of relay CK1 and relay 601 releases. The operated relays 602 and 603 of the Beginning of Record register are held operated by the holding circuits extending from battery through their windings and over their lower contacts, over the No. 2 left contacts of relay 601 before it releases, over conductor 503, through the left winding of relay TO, contacts of relay CKA and the normal contacts of relay CK3 to ground, which latter relay is not operated if only two frequencies were present in the signal. Relay TO operates, disconnects the resistance ground being supplied through resistance CH2 by way of the contacts of relay SPR or relay CK2 to the operate windings (P) of the channel relays and locks to such resistance ground over its armature and front contact, through its right winding, over conductor 506, and over the right No. 4 contacts of progress relay 1301 to battery. If the signal is short and relay SPR releases before registration is completed, relays Rc and Rf are nevertheless held operated by the ground supplied through resistance CH2 and over the upper contacts of relay CK2 until relay TO operates to signify that the registration of the digit has taken place. If the signal remains on longer than the time required for the register relays and relay TO to operate the channel relays Rc and Rf unlock but relay TO which has been locked up remains operated until relay SPR releases upon the end of the signal impulse. At the end of the impulse when relay 601 releases as previously described, the operating circuit of relay TO is opened at the left No. 2 contacts of relay 601 and upon the release of relay SPR the locking circuit of relay TO is opened so that relay TO releases. Following the release of relay 601 the locking circuit of register relays 602 and 603 extends over the left No. 2 normal contacts of relay 601, over conductor 605 and to ground on the ground bus bar GD. With relay 601 released the initial operating circuits of register relays 602 and 603 are opened and operating circuits are prepared for the relays of the Calling Code A register.

The receiver circuit is now prepared to register the next signal impulse which it has been assumed is for the first office code letter A of the calling line number having a digital value 2. This signal impulse will comprise frequencies b and d and will, through the operation of channel relays Rb and Rd, establish operating circuits for the B and D register relays 613 and 615 of the Calling Code A register of Fig. 6, over conductors B and D, the right Nos. 2 and 4 back contacts of released progress relay 601 and the right Nos. 2 and 4 front contacts of operated progress relay 611. In response to the signal relays CK1 and CK2 operate as previously described and relay CK1 establishes a circuit extending over conductor 502, the left No. 1 back contact of relay 601, and the left No. 1 front contact of relay 611 for locking relay 611 operated and for shunting down relay 610. Register relays 613 and 615 upon operating lock over their inner lower front contacts, over the No. 2 alternate contacts of relay 611, over the right back contact of relay 610 and thence as traced through the left winding of relay TO to ground whereupon relay TO operates and locks up in the manner before described. When the signal impulse ceases relays CK1 and CK2 release whereupon the holding circuit of relay 611 is opened by relay CK1 and relay 611 releases to open the initial operating circuits of relays 613 and 615 and to prepare circuits for selectively operating register relays of the Calling Code B register. With relays 610 and 611 both released the holding circuits for operated register relays 613 and 615 are extended over the left No. 2 normal contacts of relay 611 to ground on ground bus bar GD. Relay TO also releases.

In a similar manner succeeding signal impulses are registered on succeeding registers, the associated pairs of progress and transfer relays releasing successively in the manner previously described. Thus in response to the transmission of signals representative of the recorded toll data in accordance with the assumed record the C and E relays 624 and 626 of the Calling Code B register, the D and E relays 705 and 706 of the Calling Code C register, the A and E relays 722 and 726 of the Calling Thousands register, the A and B relays 742 and 743 of the Calling Hundreds register, the A and E relays 802 and 806 of the Calling Tens register, the A and C relays 822 and 824 of the Calling Units register, the A and B relays 842 and 843 of the Sender Tens register, the A and B relays 862 and 863 of the Sender Units register, the A and B relays 902 and 903 of the Identifier Number register, the A and C relays 922 and 924 of the Called Code A register, the B and D relays 943 and 945 of the Called Code B register, and B and C relays 1003 and 1004 of the Called Code C register, the A and D relays 1021 and 1025 of the Called Thousands register, the D and E relays 1045 and 1046 of the Called Hundreds register, the B and E relays 1103 and 1106 of the Called Tens register, the C and D relays 1124 and 1125 of the Called Units register, the C and D relays 1144 and 1145 of the Calling Class register, the B and D relays 1203 and 1205 of the Rate register, the A and D relays 1222 and 1225 of the Elapsed Time Tens register, and the A and C relays 1242 and 1244 of the Elapsed Time Units register are operated and locked up.

Following the registration of the units digit of the elapsed time, progress relay 1241 and transfer relay 1240 release, relay 1241 upon releasing extending the control conductor C over its right No. 3 back contact and the right No. 1 front contact of progress relay 1301 to the winding of the C relay 1302 of the End of Record register of Fig. 13. With progress relay 601 previously released, the control conductor F is extended over the right No. 6 back contact of relay 601, conductor 604 and over the right No. 2 contacts of progress relay 1301 to the winding of the F register relay 1303. When thereafter an end of record signal comprising frequencies c and f is transmitted from the tape recorder, register relays 1302 and 1303 become operated and lock first over a circuit extending over the outer left front contact of relay 1301, and the right back contact of relay 1300, following the release of relay 1300 at the beginning of the signal, and through the operating winding of relay TO as previously described in connection with the functioning of relays 600 and 601. Following the subsequent release of relay 1301, relays 1302 and 1303 lock over the No. 2 left normal contacts of relay 1301 to ground on the ground bus bar GD. It has been assumed that the end of record signal comprises the same frequencies as the beginning of record signal, corresponding to the practice of printing asterisks on the toll ticket to denote the beginning and end of the ticket as disclosed in the Gooderham application hereinbefore referred to. It is, however, to be understood that the end of record signal might be composed of different frequencies such as, for example, frequencies e and f.

When the progress relay 1301 releases it disconnects conductor 500 from conductor 501 at its right No. 3 contacts and thereby opens the energizing circuit previously traced through the (P) windings of the channel relays Ra . . . Rf to prevent their further operation. Relay 1301 also at its No. 4 right contacts disconnects battery from conductor 506 and thereby opens the holding circuit of relay TO which thereupon releases. With relays 1302 and 1303 both operated a circuit is established from battery through the winding of relay 1304, over the left contacts of the register relays and to ground, whereupon relay 1304 operates and locks over its left contacts to ground on bus bar GD and over its right front contact and the normal terminal of the arc associated with brush 1353 of progress switch 1350, establishes a self-interrupting circuit for stepping magnet 1351 of the progress switch which magnet thereupon advances the brushes 1353, 1355 and 1357 into engagement with the second terminals of their associated arcs in readiness to control the progress of toll card punching.

Should only one channel relay operate due to the existence of only one frequency in the impulse produced, for example, by some abnormal condition, the corresponding register relay would be operated also but the latter would not lock up since with relay CK1 released no ground would be applied to conductor 502 and the transfer relay such, for example, as 600 associated with the digit register under operation would not release and no locking circuit for the register relay would be available through the left winding of relay TO. Should more than two channel relays operate the relay CK3 would operate in addition to relays CK1 and CK2 for the reason already stated and relay CK3 upon operating would apply ground to conductor 507 thereby causing the operation of relay 407. Relay 407 upon operating locks under the control of relay 404, opens at its outer left contacts the shut of the right winding of relay 402 and establishes a new shunt around the middle and right windings of relay 402. With these windings of relay 402 shunted the current flowing through the windings of relays 324 and 325 in parallel is increased to such an extent that marginal relay 324 then operates to remove battery through resistance 333 from the circuit previously traced to the ticketing trunk and to connect direct ground to such circuit as a signal that the tape recorder should release the connection to the accounting office, reestablish a new connection and retransmit the recorded information to the receiving circuit then associated with the ticketing trunk.

Relay CKA, which is of the slow to release type, is normally operated by ground on conductor 504 applied thereto over the back contact of relay CK2. Relay CKA, however, is released when relay CK2 operates and serves to delay the closing of the register locking circuit and hence the operation of relay TO for a short interval in order to allow ample time for relay CK3 to function in case one or more interfering frequencies should cause the operation of more than two channel relays which would be operated by a normal signal impulse.

When the second KP signal is registered by the operation of relays 602 and 603 of the Beginning of Record register a circuit is established from ground over the upper contacts thereof, over conductor 606, through release key 1306, battery BAT4, resistance 1307, condenser 1308, resistance 1309, and through the winding of relay 1310 to ground. Condenser 1308 charges in this circuit at a rate determined by the values of resistances 1307 and 1309 but relay 1310 does not operate. After an interval sufficient for the tape recorder to transmit signal impulses for the entire toll call to the receiver, the condenser reaches a potential equal to the breakdown potential of the gas-filled tube 1311 whereupon it discharges across the gap between cathodes 1312 and 1313 and the tube then fires across the gap between cathode 1312 and anode 1314 to which anode high positive potential is applied from battery BAT4. Relay 1310 therefore operates to prevent the operation of relay 1304 and to connect ground over its front contact and conductor 507 to the winding of relay 407 which then functions in the manner previously described. If the signal impulses are received as they should be, the End of Record register relays 1302 and 1303 will operate to cause the operation and locking up of relay 1304 before the timing circuit functions to operate relay 1310.

*Translation of calling and called office codes*

It will be recalled that relays 613 and 615 of the Calling Code A register, relays 624 and 626 of the Calling Code B register and relays 705 and 706 of the Calling Code C register have been operated and locked. These relays are jointly effective in operating a calling zone relay through the operation of the translator shown in Fig. 14. The translator comprises eight multicontact relays 1402 to 1409, inclusive, of which relays 1402, 1404, 1407 and 1409 are disclosed, operated in accordance with the first digit of the calling office code and ten pairs of relays 1410 and 1420 . . . 1419 and 1429 operated in accordance with the second digit of the calling office code.

With relays 613 and 615 of the Calling Code A register operated, as assumed, a circuit is established from ground over the middle upper contacts of relay 613, over the middle upper contacts of relay 615, and conductor 617, through the winding of multicontact relay 1402 to battery whereupon relay 1402 operates. With relays 624 and 626 of the Calling Code B register operated, as assumed, a circuit is established from ground over the inner upper contacts of relay 624, the middle lower contacts of relay 626, conductor 627 and thence through the windings of multicontact relays 1418 and 1428 to battery whereupon these relays operate. With relays 705 and 706 of the Calling Code C register operated, as assumed, a circuit is established from ground over the inner upper contacts of relay 705, the inner upper contacts of relay 706, conductor 707, over the next to inner contacts of relay 1428, similar to relay 1420, conductor 1430 of cable 1431, contact set 1432 of operated relay 1402, cross-connected terminals of rack 1433, and to battery through the winding of calling zone relay 1434.

In a similar manner with relays 922 and 924 of the Called Code A register operated, as assumed, a circuit is established from ground over the middle lower contacts of relay 922, over the upper contacts of relay 924, conductor 927 of cable 928, and the winding of multicontact relay 1506 to battery. With relays 943 and 945 of the Called Code B register operated, as assumed, a circuit is established from ground over the middle upper contacts of relay 943, over the middle upper contacts of relay 945, conductor 947 of cable 948, and in parallel through the windings of the pair of relays 1512 and 1522 to battery. With relays 1003 and 1004 of the Called Code C register operated, as assumed, a circuit is established from ground over the middle upper contacts of relays 1003 and 1004, conductor 1007 of cable 1008, the middle contacts of relay 1512, corresponding to the relay 1510, conductor 1530 of cable 1531, contact set 1532 of the operated multicontact relay 1506, terminals of cross-connecting rack 1533 cross-connected to either a terminal connected to one terminal of the place name relay 1535, if it should be desired to translate the called line code digits into the place name directory designation, and thence from the other terminal of the winding of relay 1535, over cross-connected terminals of rack 1536, through the winding of the called zone relay 1534 to battery, or from the contact set 1532 to a terminal on rack 1536 to which one terminal of the winding of relay 1534 is connected, if the translation of the office code digits into the place name designation is not required, and thence to battery.

The calling zone relay 1434 having now operated to register the zone of the toll area in which the calling line is located, and the called zone relay 1534 having operated to register the zone of the toll area in which the called line is located, a charge route relay 1436 now operates under the joint control of relays 1434 and 1534 in a circuit extending from ground over contacts of relay 1434, cross-connected terminals of rack 1435, through the winding of charge route relay 1436, cross-connected terminals of rack 1437, conductor 1438, cross-connected terminals of rack 1537, and over contacts of relay 1534 to battery. Relay 1436 thus operates to establish the route charge for the toll call.

Figure 12:
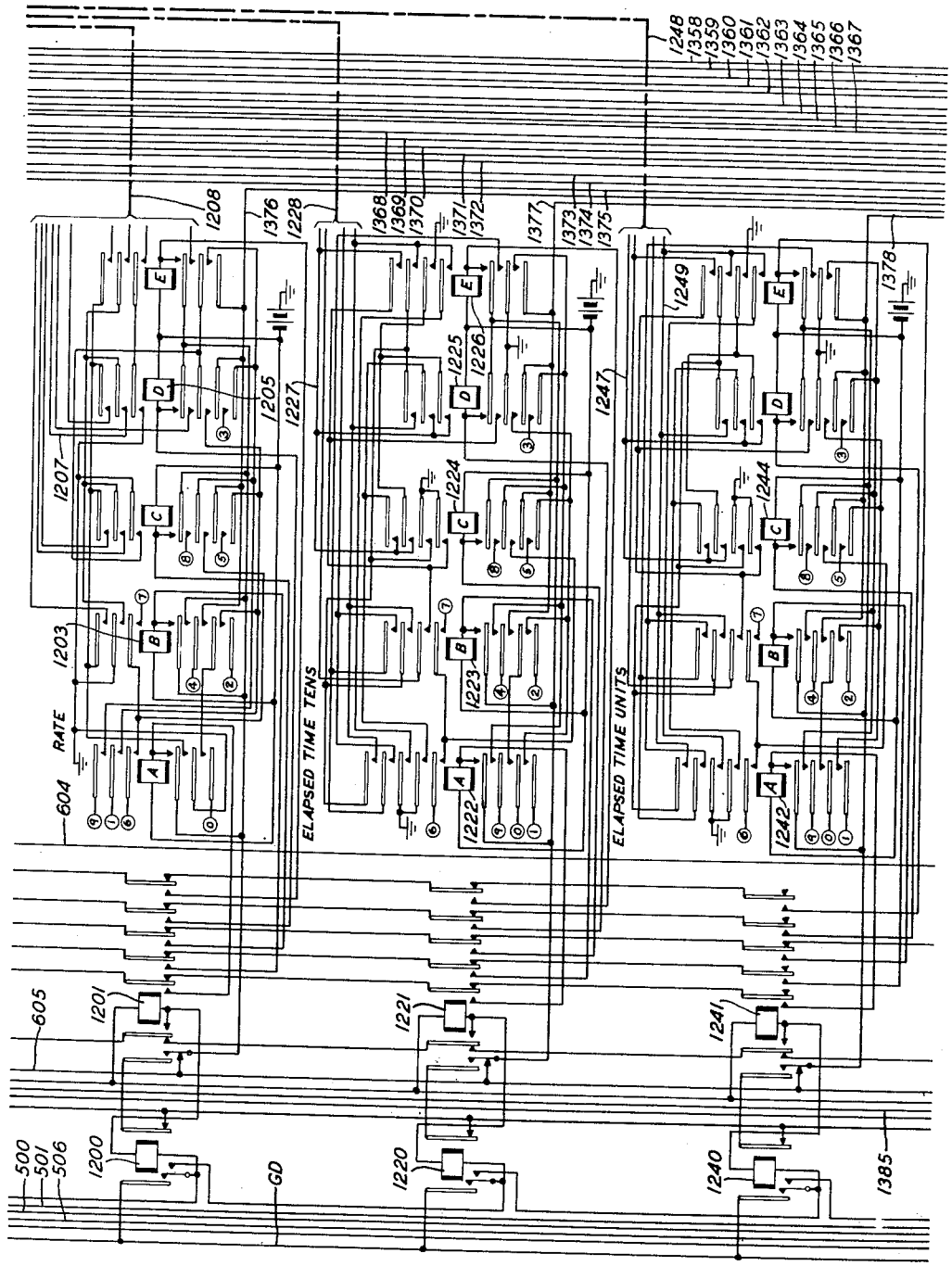
Fig. 12 shows the registers for registering the charge rate and the tens and units digits of the elapsed time of conversation.

If the charge rate has been registered in the receiving circuit as, for example, by the operation of relays 1203 and 1205 of the Rate register of Fig. 12, then it is not necessary to translate the calling and called office codes as previously described to determine which charge route relay shall be operated, since this translation has already been performed in the originating office. In the case assumed, a circuit for the charge route relay, for example, relay 1436, would be established from ground, over the upper middle contacts of register relays 1203 and 1205, conductor 1207 of cable 1208, cross-connected terminals of rack 1433, and through the winding of relay 1436 to battery.

It is possible that in some areas a condition may be encountered where certain classes of subscribers receive a different rate treatment from others for calls having the same routing. In such a case a class of service relay, such as 1439, is provided, which when operated, modifies the basic rate information supplied to the computing circuits. A group of these class relays may be provided, any one of which may be selectively operated in accordance with the setting of the Calling Class register of Fig. 11. It has previously been assumed that relays 1144 and 1145 of this register have been operated thereby establishing the circuit of class relay 1439 which may be traced from ground, over the inner upper contacts of register relay 1144, over the next-to-inner lower contacts of register relay 1145, conductor 1147 of cable 1148, over cross-connected terminals on rack 1433 and through the winding of class relay 1439 to battery.

The operated charge route relays, such as 1436, determine the basic rates at which calls shall be charged. Representative rates are disclosed in the following table:

| Charge Route Number | Minutes, Initial Period | Minutes, Overtime Period | Initial Charge in Nickels | Overtime Charge in Nickels |
|---|---|---|---|---|
| 1 | 5 | 5 | 1 | 1 or None |
| 2 | 5 | 3 | 2 | 1 |
| 3 | 5 | 2 | 3 | 1 |
| 4 | 5 | 2 | 4 | 1 |
| 5 | 4 | 2 | 5 | 1 |
| 6 | 3 | 1 | 6 | 2 |
| 7 | 3 | 1 | 7 | 2 |

*Determination of the overtime minutes of conversation*

Figure 16:
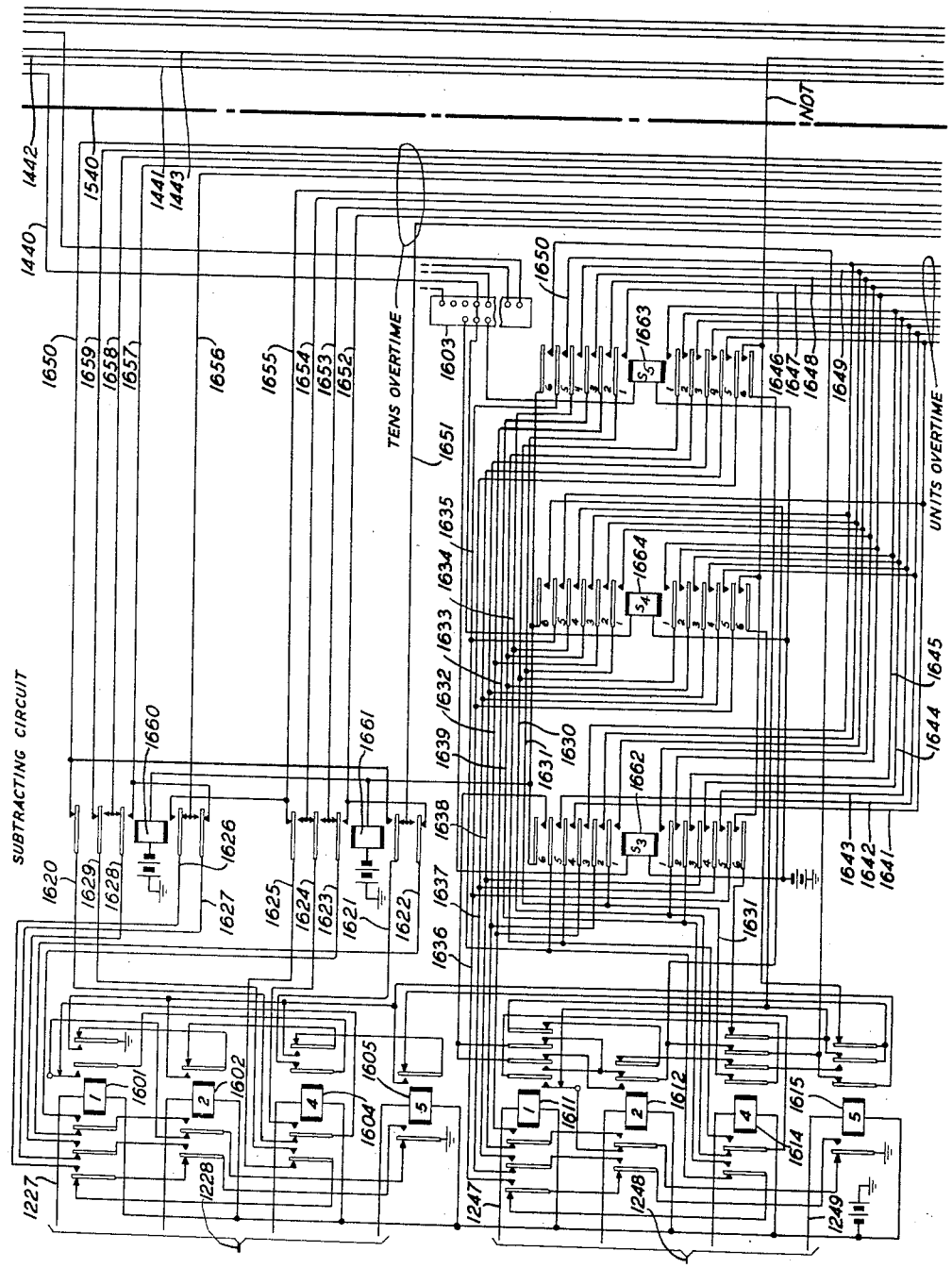
Fig. 16 shows a portion of the subtracting circuits of the computer whereby any one of a plurality of prescribed initial periods of conversation may be subtracted from the total period of conversation.

The overtime minutes of conversation are determined from the total elapsed time of conversation by subtracting from the minutes of total elapsed time of conversation the minutes for the initial period prescribed for the charge route, that is, as determined by the operated charge route relay. From the preceding table it will be noted that the initial period may be either five, four or three minutes. This subtraction is accomplished by the relays disclosed in Fig. 16. It will be assumed that with the route charge relay 1436 and the class relay 1439 both operated the S4 relay 1664 is operated to subtract four minutes from the total elapsed time. The circuit of relay 1664 may be traced from ground, over the outer left contacts of route charge relay 1436, over the middle left front contact of relay 1439, conductor 1440, cross-connection on rack 1603, and through the winding of relay 1664 to battery.

It will be recalled that relays 1222 and 1225 of the Elapsed Time Tens register and relays 1242 and 1244 of the Elapsed Time units register were operated and locked and therefore with relays 1222 and 1225 operated to register the assumed tens digit 1 of the elapsed time, a circuit is established from ground over the next to inner upper contacts of relay 1222, over the middle upper contacts of relay 1225, conductor 1227 of cable 1228, and through the winding of relay 1601 of the tens digit portion of the elapsed time register of the subtracting circuit to battery. Also with relays 1244 and 1242 operated to register the assumed units digit 6 of the elapsed time, a circuit is established from ground over the next to inner upper contacts of relay 1242, over the upper contacts of relay 1244, conductor 1247 of cable 1248, and through the winding of relay 1611 of the units digit portion of the elapsed time register of the subtracting circuit to battery, and a second circuit is established from ground, over the next to inner upper contacts of relay 1244, over the upper contacts of relay 1242, conductor 1249 of cable 1248 and through the winding of relay 1615 to battery. Relays 1611 and 1615 thus operate to register the units digit 6 of the elapsed time.

With the tens digit register relay 1601 operated ground is connected to conductor 1621 over the left back contact of relay 1605, over the inner left back contact of relay 1602, over the inner right alternate contacts of relay 1601, over the inner right back contact of relay 1604 and to conductor 1621 indicative of a tens digit 1. With the units relays 1611 and 1615 both operated ground is connected over the left front contact of relay 1615, over the outer left back contact of relay 1612, over the outer left front contact of relay 1611 and to conductor 1636 indicative of a units digit 6. Ground is applied to other conductors of the group 1620 to 1629, inclusive, indicative of the tens digit of the elapsed time of a call and to other conductors of the group 1630 to 1639, inclusive, indicative of the units digit of the elapsed time in response to the selective operation of relays of the Elapsed Time Tens and Elapsed Time Units registers of the receiving circuit and the consequent selective operation of the tens and units register relays of the subtracting circuit in accordance with the following tables:

| Tens Digit | Operated Relays Elapsed Time Tens register of Receiver | Operated Relays of Tens Register of Subtracting Circuit | Grounded Tens Conductor |
|---|---|---|---|
| 0 | 1222, 1223 | None | 1620 |
| 1 | 1222, 1225 | 1601 | 1621 |
| 2 | 1223, 1225 | 1602 | 1622 |
| 3 | 1225, 1226 | 1601, 1602 | 1623 |
| 4 | 1223, 1226 | 1604 | 1624 |
| 5 | 1224, 1225 | 1605 | 1625 |
| 6 | 1222, 1224 | 1601, 1605 | 1626 |
| 7 | 1223, 1224 | 1602, 1605 | 1627 |
| 8 | 1224, 1226 | 1601, 1602, 1605 | 1628 |
| 9 | 1222, 1226 | 1604, 1605 | 1629 |

| Units Digit | Operated Relays Elapsed Time Units Register of Receiver | Operated Relays of Units Register of Subtracting Circuit | Grounded Units Conductor |
|---|---|---|---|
| 0 | 1242, 1243 | None | 1630 |
| 1 | 1242, 1245 | 1611 | 1631 |
| 2 | 1243, 1245 | 1612 | 1632 |
| 3 | 1245, 1246 | 1611, 1612 | 1633 |
| 4 | 1243, 1246 | 1614 | 1634 |
| 5 | 1244, 1245 | 1615 | 1635 |
| 6 | 1242, 1244 | 1611, 1615 | 1636 |
| 7 | 1243, 1244 | 1612, 1615 | 1637 |
| 8 | 1244, 1246 | 1611, 1612, 1615 | 1638 |
| 9 | 1242, 1246 | 1614, 1615 | 1639 |

It will be recalled that the S4 relay 1664 has been operated in accordance with the assumed rate structure to subtract an initial four-minute period of conversation from the total elapsed time assumed to be sixteen minutes. With relay 1664 operated, units conductor 1636 to which ground has been applied through the operation of units register relays 1611 and 1615, is connected over the lower No. 5 contacts of relay 1664 to outgoing units conductor 1642 representative of the units digit 2. Relays 1660 and 1661 are not operated unless the units digit of the initial period of conversation is equal to or less than the units digit of the total elapsed time and therefore since the units digit of the initial period assumed to be 4, is less than the units digit 6 of the total elapsed time relays 1660 and 1661 are not operated and all of the tens digit conductors 1620 to 1629, inclusive, are therefore connected over back contacts of relays 1660 and 1661 to correspondingly numbered tens digit conductors 1650 to 1659, inclusive. The grounded conductor 1621 is therefore extended over the inner lower back contact of relay 1661 to outgoing tens conductor 1651. Ground thus applied to conductors 1642 and 1651 is indicative of an overtime period of conversation of twelve minutes or sixteen minutes total elapsed time less four minutes of initial period conversation.

Had the S3 relay 1662 been operated instead of relay 1664, grounded units conductor 1636 would have been extended over the lower No. 5 contacts of relay 1662 to outgoing units conductor 1643 and grounded tens conductor 1621 would have been extended over the inner lower back contact of relay 1661 to outgoing tens conductor 1651 as before. Ground thus applied to conductors 1643 and 1651 would be indicative of an overtime period of conversation of thirteen minutes. Had the S5 relay 1663 been operated instead of relay 1664, grounded units conductor 1636 would have been extended over the lower No. 5 contacts of relay 1663 to outgoing units conductor 1641 and grounded tens conductor 1621 would have been extended over the inner lower back contact of relay 1661 to outgoing tens conductor 1651 as before. Ground thus applied to conductors 1641 and 1651 would be indicative of an overtime period of conversation of eleven minutes.

On calls on which the elapsed time is equal to or less than the initial period of conversation a signal is provided to a "No Overtime Circuit" which nullifies any signal which may exist in the intermediate circuits. If the initial period is three minutes and the S3 relay 1662 is operated on a call for which the elapsed time does not require the operation of either the No. 4 or No. 5 units relays 1614 and 1615 and which does not require the operation of any of the tens relays 1601, 1602, 1604 and 1605, that is, on a call having an elapsed time of less than four minutes, ground is applied over the outer right back contacts of relays 1601, 1602, 1604 and 1605, over the middle right back contact of No. 5 register relay 1615, over the right back contact of register relay 1614 and over the lower No. 6 contacts of the S3 relay 1662 to the "No Overtime" conductor NOT. The same condition exists in case the S4 relay 1604 is operated if the No. 5 units relay 1615 is not operated and none of the tens register relays is operated. In this case the ground applied from the right back contact of register relay 1605, is applied over the outer right back contact of units register relay 1615 and the lower contacts of the S4 relay 1664 to conductor NOT. If the S5 relay 1663 is operated and the units digit registration is less than 6 as indicated by the non-operated condition of all of the tens register relays and the No. 5 units register relay 1615 is operated but none of the Nos. 1, 2 or 4 register relays 1611, 1612 and 1614 is operated, ground is connected to conductor NOT from the right back contact of relay 1605, over the right front contact of relay 1615, the next to inner right back contact of relay 1604, outer right back contact of relay 1602, outer right back contact of relay 1611 and over the lower No. 6 contacts of the S5 relay 1663. If the total elapsed period is less than five minutes, then with relay 1615 unoperated and the S5 relay 1663 operated, ground is connected from the right back contact of tens register relay 1605, over the middle right back contact of units register relay 1615 and over the lower No. 6 contacts of relay 1663 to conductor NOT. These preceding conditions are those encountered when the elapsed time has not gone into the overtime period and represent a high percentage of the cases to be handled.

In the preceding discussion it was assumed that the units digit of elapsed time was greater in every case than the initial period. The case will now be discussed in which the initial period, for example, three minutes, is greater than the units digit of elapsed time, for example twelve minutes. Under this assumption the tens register relay 1601 and the units register relay 1612 will be operated. When therefore relay 1662 is operated, grounded conductor 1632 becomes connected over the upper No. 2 contacts of relay 1662 to outgoing units conductor 1649 and a circuit is established for relays 1660 and 1661 from ground over the outer right front contact of relay 1601, inner right back contact of relay 1615, the next to outer right back contact of relay 1614, the inner right front contact of 1612, the next to the inner right back contact of relay 1611, over the upper No. 6 contacts of the S3 relay 1662 and through the windings of relays 1660 and 1661 in parallel to battery. With relay 1661 operated ground connected to conductor 1621 by the operation of register relay 1601 is extended over the inner lower front contact of relay 1661 to the outgoing tens conductor 1650 whereby, with conductors 1650 and 1649 both grounded, an overtime period of nine minutes is indicated.

As a further example it will be assumed that the elapsed time registered is twenty-three minutes and that therefore register relays 1602, 1611 and 1612 are operated and that the initial period of conversation is five minutes and that therefore the S5 relay 1663 is operated. With relays 1611, 1612 and 1663 operated ground is connected over the right back contact of relay 1615, over the inner left front contact of relay 1612, over the inner left front contact of relay 1611, conductor 1633 and over the upper No. 3 contacts of relay 1663 and to outgoing units conductor 1648. A circuit is also established for relays 1660 and 1661 from ground over the outer right back contact of tens register relay 1601, over the right front contact of relay 1602, the inner right back contact of units register relay 1615, the upper No. 6 contacts of the S5 relay 1663 and through the windings of relays 1660 and 1661 in parallel to battery. With battery 1661 operated ground is extended over the left back contact of relay 1605, the inner left front contact of relay 1602, the inner left back contact of relay 1601, conductor 1622, the lower front contact of relay 1661 and to the outgoing tens conductor 1651 whereby, with conductors 1651 and 1648 both grounded an overtime period of eighteen minutes is indicated.

Thus when the elapsed time goes into the overtime period with the S3 relay 1662 operated, a 3 is subtracted from the digital value of each one of the conductors 1630 to 1639, inclusive, extending from the units register and a 1 in the tens place is subtracted from the digital value of each one of the conductors 1620 to 1629, inclusive, extending from the tens register if the units registration is less than 3 and the tens registration is anything but zero. With the S4 relay 1664 operated, a 4 is subtracted from the digital value of each one of the conductors 1630 to 1639, inclusive, and in the tens place a 1 is subtracted from the digital value of each one of the conductors 1620 to 1629, inclusive, extending from the tens register, if the units registration is less than 4 and the tens registration is anything but zero, and with the S5 relay 1663 operated a 5 is subtracted from the digital values of each one of the conductors 1630 to 1639, inclusive, extending from the units register and a 1 in the tens place is subtracted from the digital values of each one of the conductors 1620 to 1629, inclusive, extending from the tens register if the units registration is less than 5 and the tens registration is anything but zero.

Determination of the number of overtime periods

Figure 17:
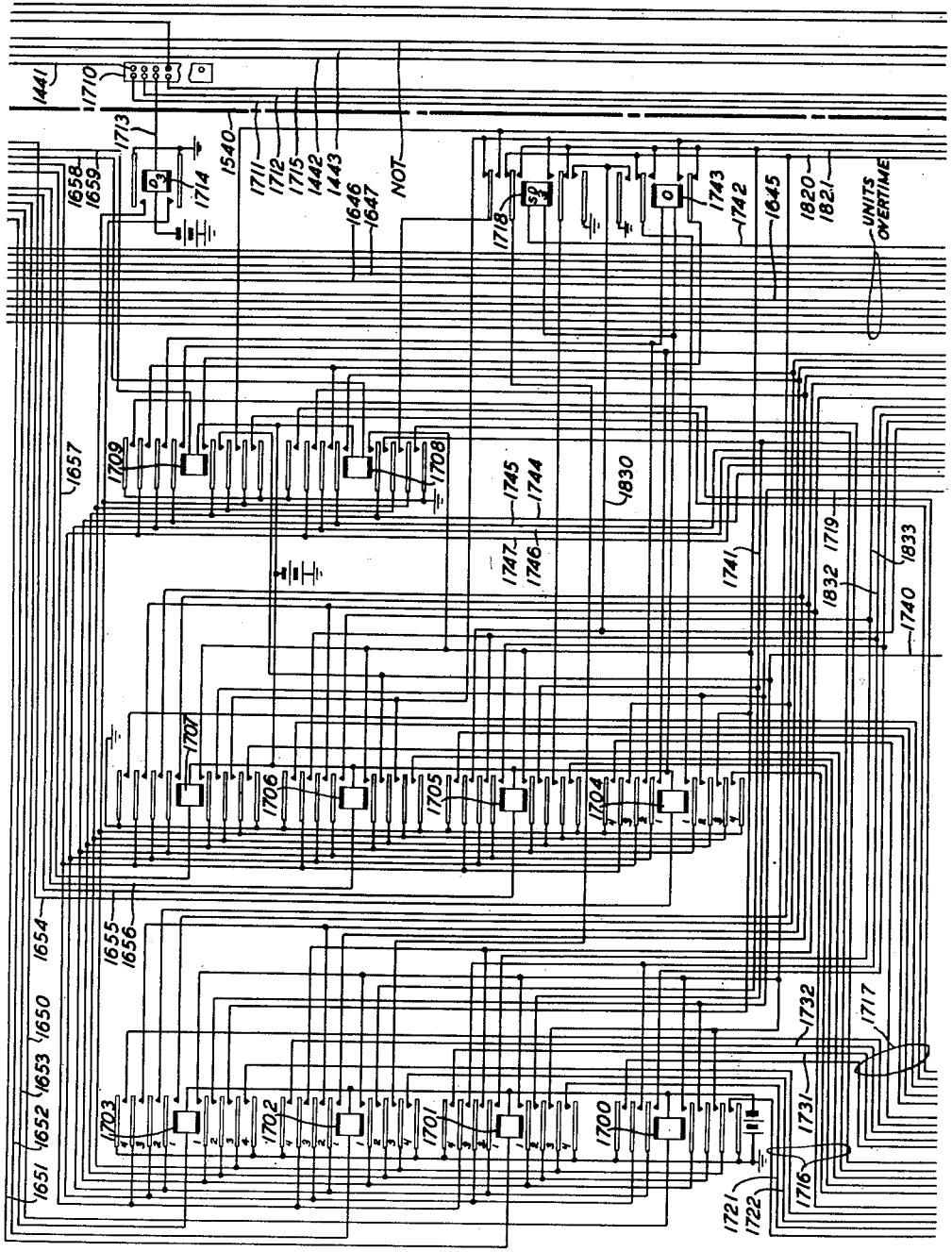
Fig. 17 shows in the left portion thereof the remainder of the subtracting circuits and in the right portion thereof the circuits for dividing the output of the subtracting circuits by three to determine the number of three-minute overtime periods.

The connection of ground to one of the conductors 1650 to 1659, inclusive, of the Tens Overtime group of conductors results in the operation of one of the ten relays 1700 to 1709, inclusive, of Fig. 17 to register the tens digit of the overtime period. It has been assumed that the tens digit of the overtime period is one and that therefore the connection of ground as previously described to conductor 1651 results in the operation of the tens overtime register relay 1701.

Figure 18:
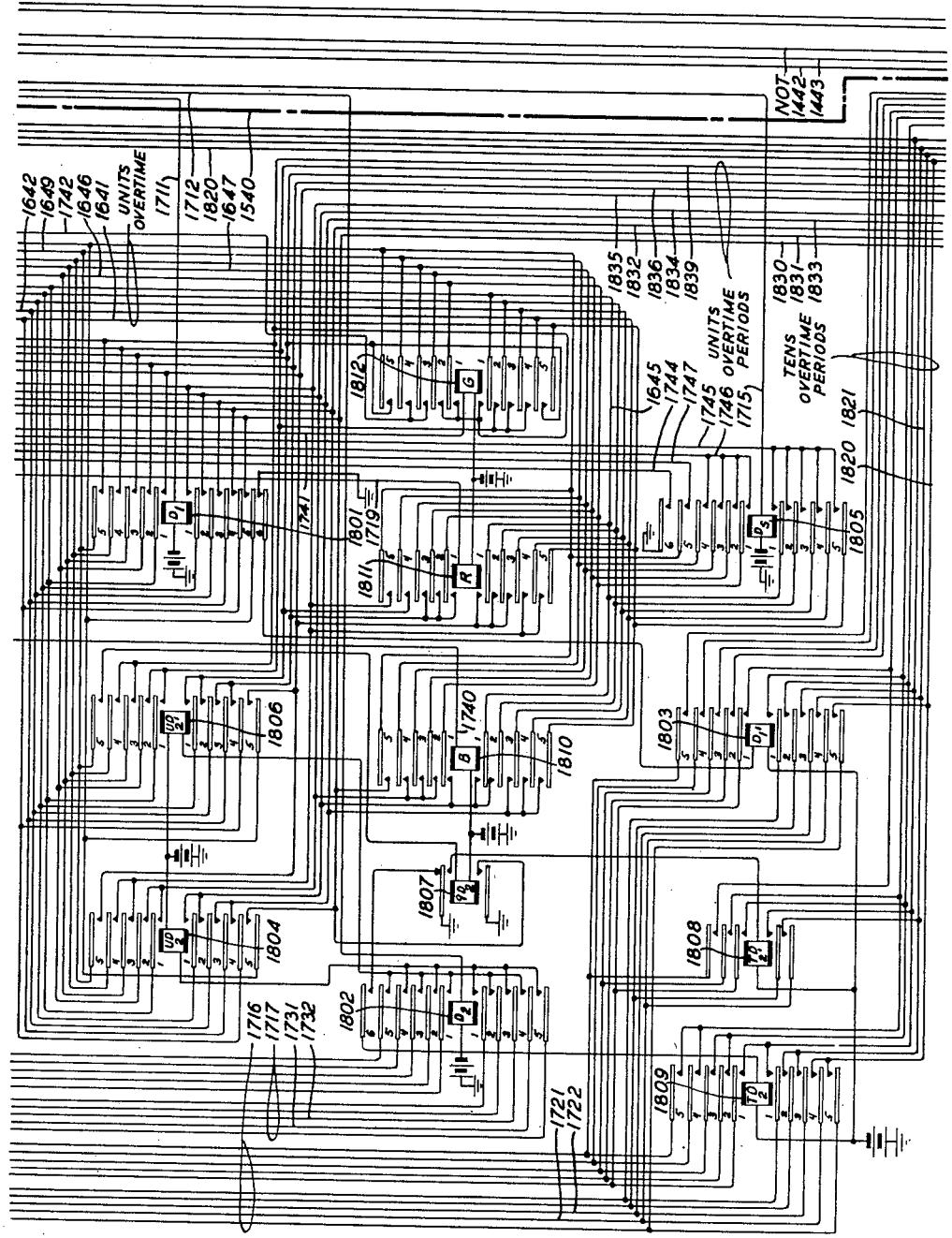
Fig. 18 shows the circuits of the computer for dividing the output of the subtracting circuit by one, two or five to determine the number of one, two or five-minute overtime periods.

For controlling the dividing circuits of Figs. 17 and 18 to determine the number of overtime periods in the total overtime, a circuit is established from ground over the inner left contacts of the operated route charge relay 1436, over the inner left front contact of class relay 1439, assumed to be operated, over conductor 1441 to a terminal on cross-connecting rack 1710, which terminal may be cross-connected to a terminal connected over conductor 1711 to the winding of the D1 relay 1801 of Fig. 18 if each prescribed overtime period is to be one minute, to a terminal connected over conductor 1712 to the winding of the D2 relay 1802 of Fig. 18 if each overtime period is to be two minutes, to a terminal connected over conductor 1713 to the winding of the D3 relay 1714 of Fig. 17 if each overtime period is to be three minutes, or to a terminal connected over conductor 1715 to the winding of the D5 relay 1805 of Fig. 18 if each overtime period is to be five minutes.

If the D1 relay 1801 is operated indicative of the fact that the overtime period of conversation is to be charged on the basis of one minute intervals, an obvious circuit is established over its lower No. 6 contacts for the D1' relay 1803. With any one of relays 1700 to 1709, inclusive, operated to register the tens digit of the entire overtime period, a circuit will be established from ground, over the lower No. 4 contacts of the operated register relay, over a conductor of group 1716 and over contacts of relay 1803 to a conductor of the Tens Overtime Periods group, extending to the multiplying circuit of Fig. 19, indicative of the same tens digit value as the tens digit value of the operated register relay. For example, with register relay 1701 operated to register the tens digit one of the overtime period, ground is applied over the lower No. 4 contacts of relay 1701, over conductor 1721 of the group 1716 and over the lower No. 4 contacts of the D1' relay 1803 to conductor 1821 of the Tens Overtime Periods group indicative of a tens digit one for the number of overtime periods. With relay 1801 operated conductors of the Units Overtime group are extended to conductors of the Units Overtime Periods group extending to the multiplying circuit without change in the units digit value. For example, conductor 1642, to which ground was applied indicative of a units digit two for the duration of overtime, is extended over the lower No. 3 contacts of relay 1801 to conductor 1832 of the Units Overtime Periods group representative of the units digit 2. Thus, the twelve minute overtime period is divided into twelve one minute overtime periods.

Figure 19:
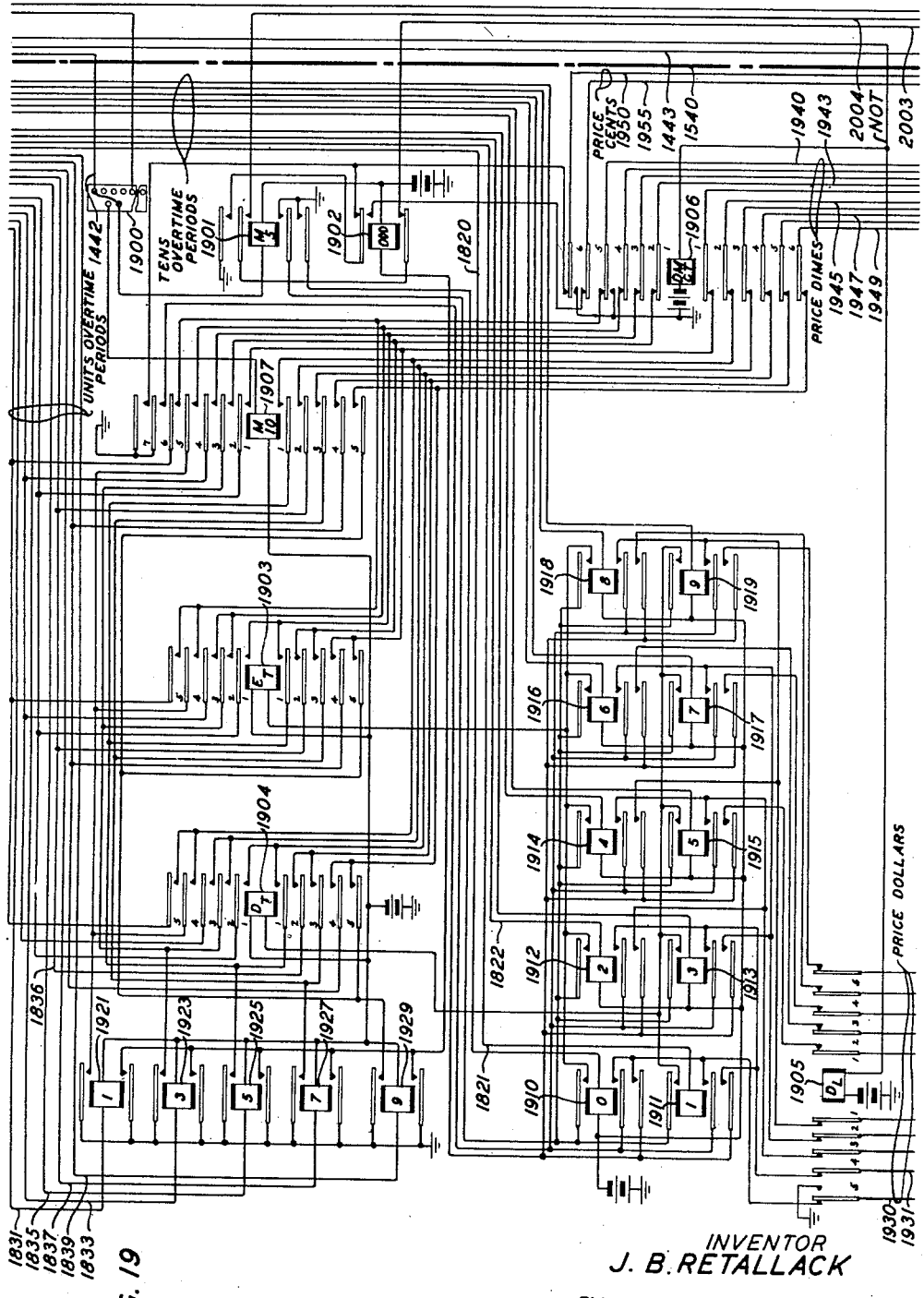
Fig. 19 shows the circuits of the computer for multiplying the outputs of the dividing circuits of Fig. 17 or 18 by five or ten to determine the charge in dollars, dimes and cents for the overtime periods of conversation.

If the overtime period of conversation is to be charged on the basis of two-minute intervals, relay 1802 is operated. It should be understood that in dividing by any number other than one, the fractional remainders in all cases increase the quotient to the next higher integer. This is because the entrance into the beginning of an overtime interval is treated as though the conversation has proceeded to the end of the overtime interval. Thus, the division of six by two is three and also the division of five by two will be three. Thus in dividing by two any odd number just preceding an even number will result in the same answer as the succeeding even number would give by ordinary arithmetical processes. Thus, it will be noted that the units input to this circuit from the Units Overtime group of conductors is connectable over the contacts of the UD2 and UD2' relays 1804 and 1806 to the Units Overtime Periods group of conductors, the values of the units digits, however, being dependent upon whether the tens digits are odd or even. However, when the tens digit is even one and two units become one, three and four units become two, etc. The shift in the tens place is also in groups of two and zero and one become zero, two and three become one, etc., except in those cases when the units digit is a nine in which event the one of tens becomes one, the three of tens becomes two, five of tens becomes three, etc. This is accomplished by the provision of the 9D2 relay 1807 which operates when the units digit is nine and in operating causes the operation of the tens TD2' relay 1808 which accomplishes the above result. In this manner the Tens Overtime Periods and the Units Overtime Periods conductors extending to the multiplying circuit of Fig. 19 are grounded in a way which indicates the division of the overtime period by two and thus the number of overtime intervals involved in the call.

It will be recalled that from the previous computation an overtime period of twelve minutes was indicated and that the D2 relay 1802 of the divide-by-two circuit was operated. Since the tens digit of the overtime period is one and relay 1701 is therefore operated, a circuit is established from ground over the upper No. 4 contacts of relay 1701, over conductor 1731 of group 1717, over the lower No. 4 contacts of relay 1802, and to battery through the winding of the UD2' relay 1806. Relay 1806 thereupon operates and connects conductor 1642 to which ground was connected in the subtracting circuit to indicate the units digit of the overtime period as two, over the lower No. 3 contacts of relay 1806 to conductor 1836 of the Units Overtime Periods group extending to the multiplying circuit indicative of a units digit 6. Since the units digit of the overtime period is two and not nine, no circuit is established by the operation of the UD2' relay 1806 for the 9D2 relay 1807 and therefore the operation of the D2 relay 1802 results in the establishment of a circuit from ground over the upper back contact of relay 1807, over the upper No. 6 contacts of relay 1802 and through the winding of the TD2 relay 1809 to battery. Relay 1809 upon operating now connects conductor 1721 of the group 1716, to which ground was connected by the operation of relay 1701 of the subtracting circuit of Fig. 17, over the lower No. 4 contacts of relay 1809 to conductor 1820 of the Tens Overtime Periods group extending to the multiplying circuit indicative of a tens digit zero. Thus, the result of dividing the twelve minutes overtime period by two is to produce an indication of six two-minute periods of overtime.

It will now be assumed that the overtime period was eleven minutes and that therefore ground has been connected to the tens conductors 1721 and 1731 by the operation of relay 1701 and that ground has been connected to units conductor 1641 representative of the tens and units digits of the overtime period. The connection of ground to conductor 1731, with the D2 relay 1802 operated, causes the operation of the UD2' relay 1806 as before, which relay upon operating connects conductor 1641 over its lower No. 4 contacts to conductor 1836 of the Units Overtime Periods group extending to the multiplying circuit. Relay 1809 operates as before and connects grounded conductor 1721 over its lower No. 4 contacts to conductor 1820 of the Tens Overtime Periods group extending to the multiplying circuit. Thus, the result of dividing the eleven minutes overtime period by two is to produce an indication of six two-minute periods of overtime since conversation overran the fifth two-minute period.

As a further illustration it will be assumed that the overtime period was of twenty-nine minutes duration and that therefore the tens register relay 1702 has been operated to register the tens digit two and that ground has been connected to conductor 1649 of the Units Overtime group extending from the subtracting circuit to indicate the units digit nine. With relay 1702 operated, ground is connected over its lower No. 4 contacts to conductor 1722 of group 1716 and ground is also connected over its upper No. 4 contacts to conductor 1732 of group 1717. With the D2 relay 1802 operated conductor 1732 is extended over its lower No. 3 contacts and through the winding of the UD2 relay 1804 to battery. Thereupon relay 1804 operates and establishes a circuit from the grounded units conductor 1649 over the upper No. 5 contacts of relay 1804 to conductor 1835 of the Units Overtime Periods group extending to the multiplying circuit. Relay 1809 operates as before and connects grounded conductor 1722 over its lower No. 3 contacts to conductor 1821 of Tens Overtime Periods group extending to the multiplying circuit. Thus, the result of dividing the twenty-nine minutes' overtime period by two is to produce an indication of fifteen two-minute periods of overtime since conversation ran over the fourteenth two-minute period.

As a still further illustration it will be assumed that the overtime period was of nineteen minutes duration and that therefore the tens register relay 1701 has been operated to register the tens digit one and that ground has been connected to conductor 1649 of the Units Overtime group extending from the subtracting circuit to indicate the units digit nine. With relay 1701 operated, ground is connected to conductors 1721 and 1731 as before described, and with the D2 relay 1802 operated, conductor 1731 is extended over its lower No. 4 contacts and through the winding of relay 1806 to battery whereupon relay 1806 operates and with ground connected to conductor 1649 establishes a circuit from conductor 1649, over the upper No. 5 contacts of relay 1806 and through the winding of the 9D2 relay 1807 to battery. Relay 1807 thereupon operates and over its upper front contact establishes the circuit of the TD2' relay 1808 which also operates. Relay 1808 upon operating establishes a circuit from grounded conductor 1721 over its lower contacts and to conductor 1821 of the Tens Overtime Periods group extending to the multiplying circuit. Relay 1807 at its lower contacts also connects ground to conductor 1830 of the Units Overtime Periods group extending to the multiplying circuit. Thus, the result of dividing the nineteen minutes' overtime period by two is to produce an indication of ten two-minute periods of overtime since conversation ran over the ninth two-minute period.

In the process of dividing by three the switching of the necessary conductors in the tens digit place is accomplished by using contacts of the tens register relays 1700 to 1709, inclusive, of the subtracting circuit. The units digits are switched in groups of three by the B, R and G relays 1810, 1811 and 1812. For example, Units Overtime conductors for units digits one, two and three will be connected to a conductor outgoing to the multiplying circuit for the units digit one, conductors for units digits four, five and six will be connected to the outgoing conductor for the units digit two, and conductors for units digits seven, eight and nine will be connected to the outgoing conductor for the units digit three by the operation of relay 1810 only when the tens digit is zero, three, six or nine. When the tens digit is either one, four or seven a different shift occurs in the units digit through the operation of relay 1811 whereby conductors for units digits one and two will be connected to an outgoing conductor for the units digit four, conductors for the units digits three, four and five will be connected to an outgoing conductor for the units digit five, conductors for the units digits six, seven and eight will be connected to an outgoing conductor for the units digit six, the conductor for the units digit nine will be connected to an outgoing conductor for the units digit seven and the conductor for units digit zero will be connected to an outgoing conductor for the units digit four. When the tens digit is either two, five or eight and relay 1812 is operated a third shift is made in the units digit whereupon the conductor for the units digit one will be connected to the outgoing conductor for units digit seven, the conductors for the units digits two, three and four will be connected to the outgoing conductor for the units digit eight, the conductor for the units digits five, six and seven will be connected to the outgoing conductor for the units digit nine, the conductors for the units digits eight and nine will result in the connection of ground to the ougoing conductor for the units digit zero, and the conductor for the units digit zero will be connected to the outgoing conductor for the units digit seven.

In addition to these shifts in the units determined by the tens registration, a shift of the tens output digit is determined by the units in the case where the units digit of the overtime period received from the subtracting circuit is either eight or nine and the tens digit is two, five or eight. In this case the outgoing tens digit of the quotient is increased one in value by the operation of the SD3 relay 1718. Thus any number received from the subtracting circuit is divided by three if the D3 relay 1714 is cross-connected to the contacts of the charge route relay 1436. It is to be understood, however, that any fractional remainders increase the quotient to the next higher integer in all cases.

As illustrative of the manner in which division by three is accomplished it will first be assumed that the overtime period of conversation was twelve minutes and that consequently the tens register relay 1701 of the subtracting circuit has been operated and ground has been connected to conductor 1642 of the Units Overtime group. With the divide-by-three (D3) relay 1714 operated a circuit is now effective from ground, over the upper contacts of relay 1714, over the lower No. 2 contacts of relay 1701 and over conductor 1719 through the winding of the R relay 1811 to battery. Relay 1714 also establishes a circuit from ground over its lower contacts, the lower No. 3 contacts of relay 1701 to conductor 1820 of the Tens Overtime Periods group extending to the multiplying circuit. With relay 1811 operated the grounded conductor 1642 is connected over the lower No. 4 contacts of relay 1811 to conductor 1834 of the Units Overtime Periods group extending to the multiplying circuit. Thus the result of dividing the twelve minutes overtime period by three is to produce an indication of four three-minute periods of overtime.

As a further illustration it will be assumed that the overtime period of conversation was thirty-one minutes and that consequently the tens register relay 1703 of the subtracting circuit has been operated and ground has been connected to conductor 1641 of the Units Overtime group. With relay 1714 operated a circuit is now established from ground, over the upper contacts of relay 1714, over the lower No. 2 contacts of relay 1703, over conductor 1740 and through the winding of the B relay 1810 to battery. Relay 1714 also establishes a circuit from ground, over its lower contacts, the lower No. 3 contacts of relay 1701 to conductor 1821 of the Tens Overtime Periods group extending to the multiplying circuit. With relay 1810 operated the grounded conductor 1641 is connected over the lower No. 5 contacts of relay 1810 to conductor 1831 of the Units Overtime Periods group extending to the multiplying circuit. Thus the result of dividing the thirty-one minutes' overtime period by three is to produce an indication of eleven three-minute periods of overtime since conversation overran the tenth three-minute period by a minute.

As another illustration it will be assumed that the overtime period of conversation was twenty-seven minutes and that consequently the tens register relay 1702 of the subtracting circuit has been operated and ground has been connected to conductor 1647 of the Units Overtime group. With relay 1714 operated a circuit is now effective from ground, over the upper contacts of relay 1714, over the lower No. 2 contacts of relay 1702, over conductor 1741 and through the winding of the G relay 1812 to battery. Relay 1714 also establishes a circuit from ground over its lower contacts, the lower No. 3 contacts of relay 1702, over the inner upper back contact of the SD3 relay 1718 to conductor 1820 of the Tens Overtime Periods group extending to the multiplying circuit. With relay 1812 operated the grounded conductor 1647 is connected over the upper No. 2 contacts of relay 1812 to conductor 1839 of the Units Overtime Periods group extending to the multiplying circuit. Thus the result of dividing the twenty-seven minutes' overtime period by three is to produce an indication of nine three-minute periods of overtime.

As a further illustration it will be assumed that the overtime period of conversation was twenty-nine minutes and that consequently the tens register relay 1702 of the subtracting circuit has been operated and ground has been connected to conductor 1649 of the Units Overtime group. With relay 1714 operated a circuit is established from ground over its upper contacts, over the lower No. 2 contacts of relay 1702, over conductor 1741 and through the winding of the G relay 1812 to battery. Since the units digit conductor 1649 has been assumed to be grounded a circuit is established from such conductor over the upper No. 4 contacts of relay 1812, over conductor 1742 and to battery through the winding of the SD3 relay 1718. Relay 1718 thereupon operates and with relay 1714 operated a circuit is now established from ground, over the lower contacts of relay 1714, over the lower No. 3 contacts of relay 1702 and over the inner upper front contact of relay 1718 to conductor 1821 of the Tens Overtime Periods group extending to the multiplying circuit. Relay 1718 also establishes a circuit from ground over its lower contact to conductor 1830 of the Units Overtime Periods group extending to the multiplying circuit. Thus the result of dividing the twenty-nine minutes' overtime period by three is to produce an indication of ten three-minute periods of overtime since conversation overran the nine three-minute periods by two minutes.

To divide by five the route charge relay 1436 will have been cross-connected so as to cause the operation of the D5 relay 1805 of Fig. 18 as previously described. In this case the conductors for the units digits one to five of the Units Overtime group incoming from the subtracting circuit are connectable in a group of five over contacts of relay 1805 to a first conductor 1745, conductors for the units digits six to nine, inclusive, are connectable to a second conductor 1746 over a group of four other contacts of relay 1805, and the conductor for the units digit zero is connectable over a further contact of relay 1805 to a third conductor 1747. These three conductors are strapped selectively to contacts of the tens register relays 1700 and 1709, inclusive, of the subtracting circuit and in accordance with the tens digit registered govern the proper choice of the units digit of the quotient. The tens digit is determined directly by the operation of the tens register relays, a shift, however, being necessary when the tens digit is either four or nine. In this case when the units digit is six to nine, inclusive, and the tens digit is four or nine, and thus either relay 1704 or 1709 is operated, the relay 1743 is operated to increase the tens digit by one. As before stated when any overtime is divided by five all fractional remainders increase the quotient to the next higher integer.

As an illustration it will be assumed that the overtime period of conversation was fifteen minutes and that consequently the tens register relay 1701 of the subtracting circuit has been operated and ground has been connected to conductor 1645 of the Units Overtime group. With relay 1805 operated a circuit is established from ground, over the upper No. 6 contacts of relay 1805, conductor 1744 and over the lower No. 1 contacts of register relay 1701 to conductor 1820 of the Tens Overtime Periods group extending to the multiplying circuit. In addition a circuit is extended from the grounded units conductor 1645, over the lower No. 1 contacts of relay 1805, conductor 1745, the upper No. 1 contacts of register relay 1701 and to conductor 1833 of the Units Overtime Periods group extending to the multiplying circuit. Thus the the result of dividing the fifteen minutes overtime period by five is to produce an indication of three five-minute periods of overtime.

As a further illustration it will be assumed that the overtime period of conversation was twenty-nine minutes and that consequently the tens register relay 1702 of the subtracting circuit has been operated and ground has been connected to conductor 1649 of the Units Overtime group. With relay 1805 operated a circuit is established from ground, over the upper No. 6 contacts of relay 1805, over conductor 1744, over the lower No. 1 contacts of register relay 1702 and to conductor 1820 of the Tens Overtime Periods group extending to the multiplying circuit. In addition a circuit is extended from grounded units conductor 1649, over the upper No. 4 contacts of relay 1805, over conductor 1746, over the upper No. 2 contacts of register relay 1702 and to conductor 1836 of the Units Overtime Periods group extending to the multiplying circuit. Thus the result of dividing the twenty-nine minutes' overtime period by five is to produce an indication of six five-minute periods of overtime since conversation overran the fifth five-minute period by four minutes.

As another example it will be assumed that the overtime period of conversation was forty-nine minutes and that therefore the tens register relay 1704 of the subtracting circuit has been operated and ground has been connected to conductor 1649 of the Units Overtime group. With relay 1805 operated a circuit is established from ground on conductor 1649 of the Units Overtime group, over the upper No. 4 contacts of relay 1805, over conductor 1746, over the upper No. 2 contacts of register relay 1704 and through the winding of relay 1743 to battery. Relay 1743 thereupon operates, and with relay 1704 operated, establishes a circuit from ground, over the upper No. 6 contacts of relay 1805, over conductor 1744, over the lower No. 1 contacts of relay 1704, and over the inner upper front contact of relay 1743 to conductor 1821 of the Tens Overtime Periods group extending to the multiplying circuit. In addition, relay 1743 connects ground over its upper contacts to conductor 1830 of the Units Overtime Periods group. Thus the result of dividing the forty-nine minutes' overtime period by five is to produce an indication of ten five-minute periods of overtime since conversation overran the ninth five-minute period by four minutes.

As another example it will be assumed that the overtime period of conversation was ten minutes and that therefore the tens register relay 1701 of the subtracting circuit has been operated and ground has been connected to conductor 1650 of the Units Overtime group. With relay 1805 operated a circuit is established from ground over the upper No. 6 contacts of relay 1805, over conductor 1744, over the lower No. 1 contacts of relay 1701 to conductor 1820 of the Tens Overtime Periods group extending to the multiplying circuit. In addition, a circuit is extended from grounded units conductor 1650, over the upper No. 5 contacts of relay 1805, over conductor 1747, over the upper No. 3 contacts of relay 1701 and to conductor 1832 of the Units Overtime Periods group extending to the multiplying circuit. Thus the result of dividing the ten minutes' overtime period by five is to produce an indication of two five-minute periods of overtime.

Determination of charge for overtime period of conversation

After the determination of the number of overtime periods of conversation, through the operation of the dividing circuit, the charge to be made for the entire overtime conversational period may be determined by multiplying the number of overtime periods by the charge to be made for each period as prescribed by the operated charge route relay 1436. For example the charge may be at the rate of 5 cents or at the rate of 10 cents for each of the overtime periods. It has been previously assumed that with the charge route relay 1436 operated, the D2 relay 1802 was operated to divide the total elapsed overtime, assumed to be twelve minutes, by two. As a consequence, the dividing circuit of Fig. 18 has connected ground to the No. 0 conductor 1820 of the Tens Overtime Periods group and to the No. 6 conductor 1836 of the Units Overtime Periods group representative of six two-minute periods of overtime. It will now be assumed that with the charge route relay 1436 operated, a circuit is established from ground over the inner right contacts of relay 1436, over the inner right front contact of relay 1439, over conductor 1442 and strapped terminals of cross-connecting rack 1900 through the winding of the M5 relay 1901 to battery. Relay 1901 thereupon operates indicative of the fact that each two-minute overtime period is to be charged at the rate of 5 cents for each period. In other words the assumed six two-minute overtime periods are to be multiplied by five.

It was assumed that conductor 1820 was grounded indicative of a tens digit 0 of the number of two-minute elapsed time intervals and therefore as a result the circuit of the 0 relay 1910 is established resulting in the operation of relay 1910. It is obvious that in multiplying by five the cents in the product will always be either zero or five, a zero being obtained when the incoming units digit is even and a five being obtained when the incoming units digit is odd. This result is accomplished in the circuit by providing a relay in each odd incoming units conductor of the Units Overtime Periods group, such relays being connected to the conductors 1831, 1833, 1835, 1837 and 1839. These relays are shown in the upper left portion of Fig. 19 designated 1921, 1923, 1925, 1927 and 1929, respectively, and in turn control over their lower contacts, the operation of the ODD relay 1902 and over their upper contacts control circuits for determining the proper digit for the dimes place.

The determination of the dimes digit depends upon whether the incoming tens digit is odd or even. This result is accomplished by providing a relay in each incoming tens conductor of the Tens Overtime Periods group, such relays being designated 1910 to 1919, inclusive, and connected to the conductors 1820, 1821, etc. With the M5 relay 1901 operated, the operation of any one of the even numbered relays 1910, 1912, etc. establishes a circuit from ground over the lower contacts of relay 1901, over the upper contacts of the operated tens relays 1910, 1912, etc. and to battery through the windings of the ET relay 1903, or the operation of any one of the odd numbered relays 1911, 1913, etc. establishes a circuit from ground over the lower contacts of relay 1901, over the upper contacts of the operated tens relays 1911, 1913, etc. and to battery through the winding of the OT relay 1904. Thus if the incoming tens digit is odd and OT relay 1904 is operated, the incoming units digit 0 or 1 determines that the dimes calculation shall be 5, the incoming units digit 2 or 3 determines that the dimes calculation shall be 6, the incoming units digit 4 or 5 determines that the dimes calculation shall be 7, the incoming units digit 6 or 7 determines that the dimes calculation shall be 8 and the incoming units digit 8 or 9 determines that the dimes calculation shall be 9. However, if the incoming tens digit is even and ET relay 1903 is operated, the incoming units digit 0 or 1 determines the dimes calculation shall be 0, the incoming units digit 2 or 3 determines that the dimes calculation shall be 1, etc.

The incoming tens, in addition to determining the grouping of the incoming units to determine the dimes calculation, also determines the number of dollars of the charge. Thus if the tens digit is 0 or 1 and the relay 1910 or 1911 is operated, the dollars calculation becomes 0, if the tens digit is 2 or 3 and relay 1312 or 1313 is operated, the dollars calculation becomes 1, if the tens digit is 4 or 5 and relay 1914 or 1915 is operated, the dollars calculation becomes 2, if the tens digit is 6 or 7 and relay 1916 or 1917 is operated, the dollars calculation becomes 3 or if the tens digit is 8 or 9 and relay 1918 or 1919 is operated, the dollars calculation becomes 4. Thus the number of overtime periods is calculated into dollars, dimes and cents to represent the price of the overtime period of conversation.

Reverting now to the assumption that for an overtime period of twelve minutes or six two-minute periods, the tens relay 1910 is operated as previously assumed, then since the units digit is 6, no relay of the group 1921, 1923, etc. is operated and consequently the ODD relay 1902 is not operated. With the even tens digit relay 1910 operated, the ET relay 1903 is operated as previously described. With relay 1901 operated a circuit is established from ground over its inner lower contacts, over the inner lower contacts of operated relay 1910 and over the left No. 5 back contact of the DL relay 1905 to conductor 1930 of the Price Dollars group indicative of a zero dollar price for the overtime period. With ground connected to conductor 1836 as previously described, ground on such conductor is extended over the lower No. 2 contacts of the operated relay 1903, over the upper No. 1 back contact of the DM—CT relay 1906, to conductor 1943 of the Price Dimes group indicative of a three dimes price for the overtime period. Also with the ODD relay 1902 unoperated, ground is connected over the upper contacts of relay 1901, over the upper back contact of relay 1902 and over the upper No. 6 back contact of relay 1906 to conductor 1950 of the Price Cents group indicative of a zero cents price for the overtime period. Thus the total indicated charge for the overtime period is calculated to be 30 cents.

As a further illustration, it will be assumed that there were fifteen overtime periods of conversation and that ground has therefore been applied to the incoming tens conductor 1821 thereby causing the operation of the odd tens group relay 1911 and that ground has been applied to the incoming units conductor 1835, thereby causing the operation of the odd units relay 1925 and a consequent operation of the ODD relay 1902. As previously described, the odd tens relay 1911 upon operating has in turn caused the operation of the OT relay 1904. With relay 1901 operated a circuit is established from ground over the inner lower contacts of such relay, over the inner lower contacts of operated relay 1911 and over the left No. 5 back contact of the DL relay 1905 to conductor 1930 of the Price Dollars group indicative of a zero dollar price for the overtime period. With relay 1925 operated, a circuit is established from ground over its upper contacts, over the lower No. 1 contacts of the operated OT relay 1904 and over the lower No. 4 contacts of the DM—CT relay 1906 to conductor 1947 of the Price Dimes group indicative of a seven dimes price for the overtime period. Also with the ODD relay 1902 operated, ground is connected over the upper contacts of relay 1901, over the upper front contact of relay 1902 and over the upper No. 5 back contact of the DM—CT relay 1906 to conductor 1955 of the Price Cents group indicative of a five cents price for the overtime period. Thus the total indicated charge for the overtime period is calculated to be 75 cents.

As a further example, it will be assumed that there were twenty-one overtime periods of conversation and that ground has therefore been applied to the incoming tens conductor 1822 thereby causing the operation of the even units relay 1912 and the consequent operation of the ET relay 1903 and that ground has been applied to the incoming units conductor 1831 thereby causing the operation of units relay 1921 and the consequent operation of the ODD relay 1902. With relay 1901 operated, a circuit is established from ground over the inner lower contacts of such relay, over the inner lower contacts of relay 1912 and over the left No. 4 back contact of the DL relay 1905 to conductor 1931 of the Price Dollars group indicative of a one dollar price for the overtime period. With relay 1921 operated, a circuit is established from ground over its upper contacts, over the upper No. 4 contacts of operated relay 1903 and over the upper No. 4 back contact of the DM—CT relay 1906 to conductor 1940 of the Price Dimes group indicative of a zero dimes price for the overtime period. Also with the ODD relay 1902 operated, ground is connected over the upper contacts of relay 1901, over the upper front contact of relay 1902, and over the upper No. 5 back contact of the DM—CT relay 1906 to conductor 1955 of the Price Cents group indicative of a five cent price for the overtime period. Thus the total indicated charge for the overtime period is calculated to be $1.05.

It is obvious that in multiplying by ten, if the charge is to be ten cents for each unit of overtime, it is only necessary to treat the incoming tens and units as dollars and dimes, respectively and to connect ground to conductor 1950 of the Prince Cents group. To accomplish this the M10 relay 1907 will be operated under the control of the charge route relay 1436, the tens relays 1910 to 1919, inclusive, being instrumental in determining the dollar values in the product. The M10 relay 1907 cuts through the incoming conductors of the Units Overtime Periods group without modifying their numerical values. As an example, it will be assumed that there are fifteen periods of overtime and that as a consequence ground has been applied to the incoming tens conductor 1821 thereby causing the operation of the tens relay 1911 and that ground has been applied to the incoming units conductor 1835 thereby causing the operation of the units relay 1925. With relay 1907 operated, ground is connected over its upper No. 6 contacts, over the lower contacts of relay 1911 and over the No. 4 left back contact of the DL relay 1905 to conductor 1931 of the Price Dollars group indicative of a one dollar price for the overtime period. Also a circuit is established from ground over the upper contacts of operated relay 1925, over the upper No. 1 contacts of the M10 relay 1907 and over the lower No. 2 back contact of the DM—CT relay 1906 to conductor 1945 of the Price Dimes group representative of a five dimes price for the overtime period. In addition relay 1907 connects ground over its upper No. 7 contacts and the upper No. 6 back contact of the DM—CT relay 1906 to conductor 1950 of the Price Cents group indicative of a zero cents price for the overtime period. Thus the total indicated charge for the overtime period is calculated to be $1.50.

*Adding the charge for the initial period of conversation*

The output of the multiplying circuit of Fig. 19 in dollars, dimes and cents represents the complete charge for the overtime period and in order to arrive at the total charge for the call it is necessary to add the charge of the initial period. This initial charge as indicated on the preceding table of basic rates may be any value from 5 to 35 cents inclusive, in multiples of five cents. The amount of the initial charge to be added is determined by the circuits disclosed in Fig. 20 under the control of the charge route relay 1436 which connects ground over its outer right contacts, the outer right front contact of relay 1439 and conductor 1443 to a terminal on cross-connecting rack 2000 which may be cross-connected to the winding of any one of the A5, A10, A15, A20, A25, A30 and A35 relays designated 2005, 2010, 2015, 2020, 2025, 2030, and 2035, respectively. If the amount of the initial charge is 5 cents, and the A5 relay 2005 is operated, the tens charge represented by ground connected to either incoming conductor 1950 or 1955 of the Price Cents group is changed from a 0 to 5 or vice versa. For example, if the charge for the overtime period was 30 cents conductor 1930 of the Price Dollars group, conductor 1943 of the Price Dimes group and conductor 1950 of the Price Units group were grounded. With relay 2005 operated conductor 1950 is extended over the inner contacts of relay 2005 to conductor 2055 of the Total Cents group representative of the addition of 5 cents in the cents place for the total charge for the call. Since the input was registered as 0 cents it was not necessary to carry one in the dollars or dimes places and consequently the DL relay 2001 is not operated and grounded conductor 1930 is therefore extended over the lower No. 5 back contact of relay 2001 to conductor 2040 of the Total Dollars group extending to the progress circuit, representative of a zero dollar charge in the dollars place. Also the DM relay 2002 is not operated and grounded conductor 1943 is therefore extended over the upper No. 3 back contact of relay 2002 and over the upper No. 3 back contacts of unoperated relays 2010, 2020 and 2030 to conductor 2063 of the Total Dimes group extending to the progress circuit indicative of a digit 3 in the dimes place. Thus the total indicated charge for the call is calculated to be 35 cents.

If, however, the input registered a 5 in the units place as for an overtime charge of 75 cents, then it would be necessary to carry one in the dimes place. This is accomplished by the operation of the DM relay 2002 under the control of the A5 relay 2005 and the ODD relay 1902 of Fig. 19 which is always operated if the cents price for the overtime period is odd or 5 cents. Under these conditions the circuit for relay 2002 may be traced from ground over the lower contacts of relay 2005, over the lower contacts of relay 1902, over the inner upper contacts of the M5 relay 1901, which would also be operated, over conductor 2004 and through the winding of the DM relay 2002 to battery. No circuit is, however, effective at this time for the DL relay 2001. Under the assumption that the charge for the overtime period was 75 cents, ground is connected to conductor 1939 of the Price Dollars group, to conductor 1947 of the Price Dimes group and to conductor 1955 of the Price Cents group. With relay 2005 operated conductor 1955 is extended over the upper front contact of relay 2005 to conductor 2050 of the Total Cents group representative of the addition of 5 cents in the tens place for the total charge for the call. With the DM relay 2002 operated, grounded conductor 1947 is extended over the lower No. 2 front contact of relay 2002 and over the lower No. 3 back contacts of relays 2010, 2020 and 2030 to conductor 2068 of the Total Dimes group representative of an increase of one in the dimes place. With the DL relay 2001 unoperated, grounded conductor 1930 is extended over the upper No. 5 back contact of relay 2001 to conductor 2040 of the Total Dollars group representative of a zero dollar charge in the dollars place. Thus the total indicated charge for the call is calculated to be 80 cents.

Figure 20:
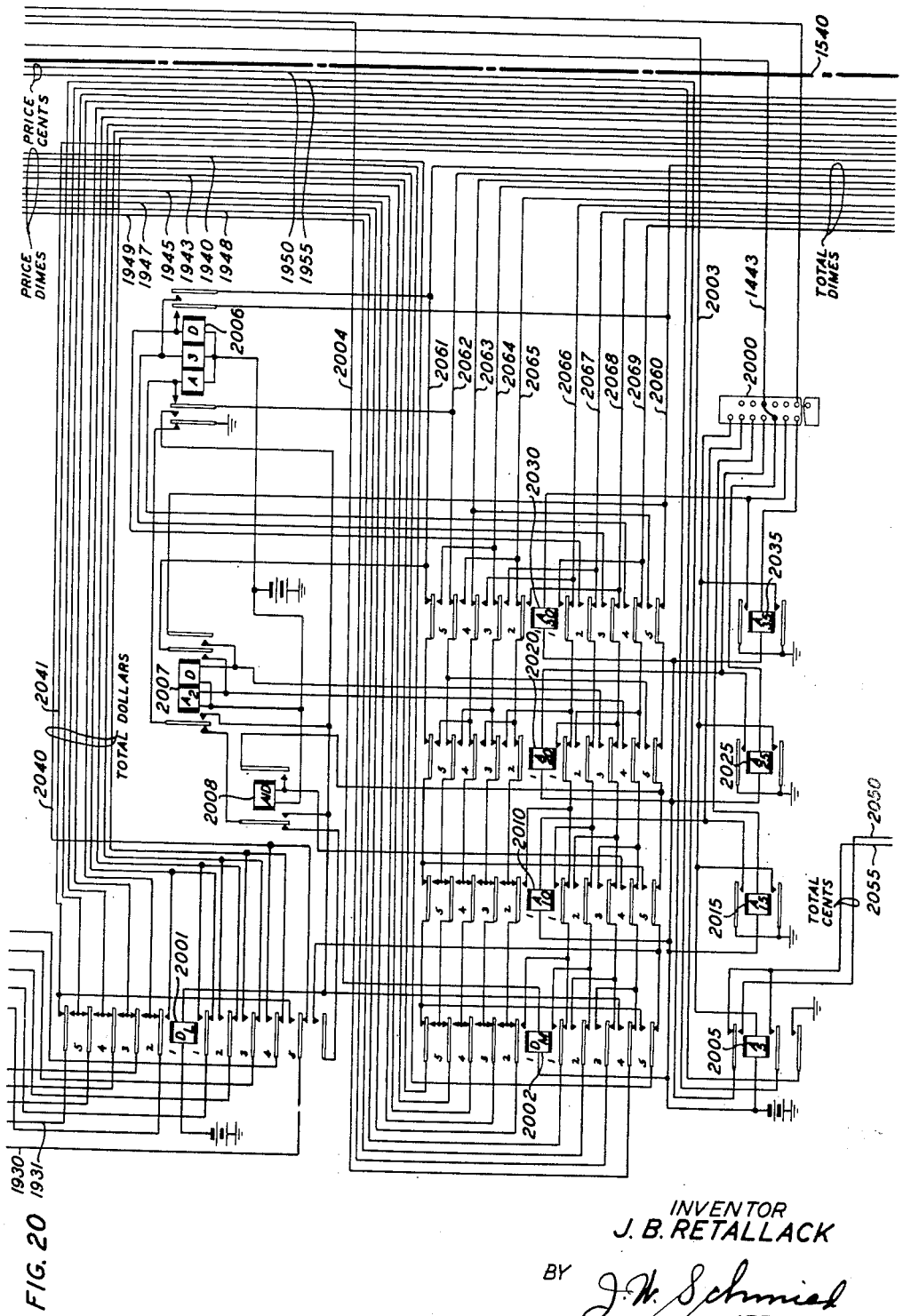
Fig. 20 shows the circuits for computing the charge for the initial period of conversation and for adding it to the charge for the overtime periods of conversation as determined by the circuits of Fig. 19.

In the event that the input to the circuit of Fig. 20 is registered as 95 cents by the connection of ground to conductors 1930, 1949 and 1955, the operation of the A5 relay 2005 is instrumental as before in extending the grounded conductor 1955 to conductor 2050 and in the operation of the DM relay 2002 indicative of the necessity for adding one in the dimes place. Now, however, with relay 2002 operated and ground connected to the incoming conductor 1949, a circuit is established from such conductor over the lower No. 4 front contact of relay 2002 and through the winding of the DL relay 2001 to battery, whereupon relay 2001 operates indicative of the necessity for adding one in the dollars place. With relay 2001 operated, grounded conductor 1930 now becomes connected over the lower No. 5 front contact of relay 2001 to conductor 2041 of the Total Dollars group representative of a one in the dollars place. A circuit is also established from ground over the outer left back contact of the A3D relay 2006, over the left back contact of the A2D relay 2007, over the left back contact of the A1D relay 2008, over the lower No. 6 contacts of the DM relay 2001, thence over the lower No. 5 back contacts of relays 2010, 2020 and 2030 to conductor 2060 indicative of an increase of one in the dimes place. With ground thus connected to conductors 2041, 2060 and 2050 the total calculated charge for the call is now indicated as $1.00.

If the initial period of conversation is to be charged at the rate of 10 cents then the A10 relay 2010 is operated. With relay 2005 now unoperated, no change is made in the units place but one is added in the dimes place and if the incoming conductor 1949 is grounded representative of a nine in the dimes place, the operation of relay 2010 causes the operation of the DL relay 2001 to add one in the dollars place. Thus assuming the charge for the overtime period of conversation to have been 95 cents and conductors 1930, 1949 and 1955 therefore grounded, the operation of the A10 relay 2010 extends conductor 1949 over the lower No. 4 back contact of relay 2002, over the lower No. 4 front contact of relay 2010, through the winding of the A1D relay 2008 to battery, whereupon relay 2008 operates and establishes a circuit for the DL relay 2001, which circuit may be traced from ground over the outer left back contact of relay 2006, over the left back contact of relay 2007, over the left front contact of relay 2008 and through the winding of relay 2001 to battery. Relay 2001 thereupon operates and extends conductor 1930 over its lower No. 5 front contact to conductor 2041 of the Total Dollars group. With relay 2010 operated, a circuit is established from ground on conductor 1949, over the lower No. 4 back contact of relay 2002, over the lower No. 4 front contact of relay 2010, over the right contacts of relay 2008 and over the lower No. 5 back contacts of relays 2020 and 2030 to conductor 2060 of the Total Dimes group. With relay 2005 unoperated, conductor 1955 is extended over the upper back contact of relay 2005 to conductor 2055 of the Total Cents group. Thus the total calculated charge for the call is now indicated by the grounding of conductors 2041, 2060 and 2055 as $1.05.

If the initial period of conversation is to be charged at the rate of 15 cents, then the A15 relay 2015 is operated which in turn causes the operation of the A5 relay 2005 and the A10 relay 2010. The operation of relay 2005 causes the addition of 5 cents to the charge for the overtime period and the operation of relay 2010 causes the addition of an additional 10 cents. As an example, it will be assumed that the overtime charge for the call was 30 cents as indicated by the connection of ground to conductors 1930, 1943 and 1950. With the A5 relay 2005 now operated, grounded conductor 1950 is extended over the inner lower front contact of relay 2005 to conductor 2055 of the Total Cents group, but since the incoming cents value is zero and consequently relay 1902 is not operated, relay 2005 is not instrumental in causing the operation of DM relay 2002. Grounded conductor 1943 is now extended over the upper No. 4 back contact of relay 2002, over the upper No. 3 front contact of the A10 relay 2010 and over the upper No. 3 back contacts of relays 2020 and 2030 to conductor 2064 of the Total Dimes group. The DL relay 2001 is not operated and therefore conductor 1930 is extended over the lower No. 5 back contact of relay 2001 to conductor 2040 of the Total Dollars group. Thus the total charge for the call is now indicated through the grounding of conductors 2040, 2064 and 2055 as 45 cents.

As a further example, it will be assumed that the charge for the overtime period of conversation was 95 cents as indicated by the connection of ground to conductors 1930, 1949 and 1955. With the A5 relay 2005 now operated, ground connected to conductor 1955 is extended over the upper front contact of relay 2005 to conductor 2050 of the Total Cents group and since the incoming cents value is odd and relay 1902 is operated, the operation of relay 2005 establishes the previously-traced circuit for the DM relay 2002. Grounded conductor 1949 is now extended over the lower No. 4 front contact of relay 2002 and through the winding of the DL relay 2001 which relay operates and over its lower No. 5 front contact connects grounded conductor 1930 to conductor 2041 of the Total Dollars group and establishes a circuit from ground over the left back contacts of relays 2006, 2007 and 2008, over the lower No. 6 contacts of relay 2001, over the lower No. 5 front contact of the A10 relay 2010 and over the upper No. 5 back contacts of relays 2020 and 2030 to conductor 2061 of the Total Dimes group. Thus the total charge for the call is now indicated by the grounding of conductors 2041, 2061 and 2050 as $1.10.

As a still further example, it will be assumed that the charge for the overtime period of conversation was 90 cents as indicated by the grounding of conductors 1930, 1949 and 1950. With the A5 relay 2005 now operated, ground connected to conductor 1950 is extended over the inner lower front contact of relay 2005 to conductor 2055 of the Total Cents group and since the incoming cents value is even, no circuit is established to cause the operation of the DM relay 2002. Grounded conductor 1949 is now extended over the lower No. 4 back contact of relay 2002, the lower No. 4 front contact of the operated A10 relay to battery through the winding of the A1D relay 2008 which extends its operating ground over its right contacts and over the lower No. 5 back contacts of relays 2020 and 2030 to conductor 2060 of the Total Dimes group. Relay 2008 also establishes over its left front contact the previously traced circuit for the DL relay 2001 which now operates and extends conductor 1930 over its lower No. 5 front contact to conductor 2041 of the Total Dollars group. Thus the total charge for the call is now indicated by the grounding of conductors 2041, 2060 and 2055 as $1.05.

If the initial period of conversation is being charged at the rate of 20 cents, then the A20 relay 2020 is operated to cause a shift of two in the dimes place. As an example, it will be assumed that incoming conductors 1930, 1943 and 1950 have been connected to ground indicative of an overtime charge of 30 cents. Now with the A5 relay unoperated, conductor 1950 is extended over its lower back contact to conductor 2050 of the Total Cents group and with the A20 relay 2020 operated, conductor 1943 is extended over the upper No. 3 back contact of relay 2002, over the upper No. 3 back contact of relay 2010, over the upper No. 3 front contact of relay 2020 and the upper No. 1 back contact of relay 2030 to conductor 2065 of the Total Dimes group. The DL relay 2001 is not operated and therefore conductor 1930 is extended over the lower No. 5 back contact of relay 2001 to conductor 2040 of the Total Dollars group. Thus the total charge for the call is now indicated by the grounding of conductors 2040, 2065 and 2050 as 50 cents.

As a further example, it will be assumed that the charge for the overtime period of conversation was 95 cents, as indicated by the grounding of conductors 1930, 1949 and 1955. With the A5 relay 2005 unoperated, conductor 1955 is extended over the upper back contact of relay 2005 to conductor 2055 of the Total Cents group and with the A20 relay 2020 operated, conductor 1943 is extended over the lower No. 4 back contact of relay 2002 over the lower No. 4 back contact of relay 2010, over the lower No. 4 front contact of relay 2020 and to battery through the left winding of the A2D relay 2007. Relay 2007, upon operating extends its operating ground over its inner right contacts to conductor 2061 of the Total Dimes group and establishes a circuit from ground at the left back contact of relay 2006 over its left front contact and through the winding of the DL relay 2001 to battery. Relay 2001 therefore operates and extends conductor 1930 over its lower No. 5 front contact to conductor 2041 of the Total Dollars group. Thus the total charge for the call is now indicated through the grounding of conductors 2041, 2061 and 2055 as $1.15.

Had the charge for the overtime period been 85 cents as indicated by the grounding of conductors 1930, 1948 and 1955, then with relay 2005 unoperated, ground would have been extended from conductor 1955 to conductor 2055 and ground on conductor 1948 would have been extended over the lower No. 3 back contact of relay 2002, over the lower No. 3 back contact of relay 2010 and over the lower No. 3 front contact of relay 2020 to battery through the right winding of the A2D relay 2007. Relay 2007 upon operating would then have extended its operating ground over its outer right contacts to conductor 2060 of the Total Dimes group and would have caused the operation of the DL relay 2001 to extend conductor 1930 to conductor 1941 of the Total Dollars group. Thus the total charge for the call would have been indicated through the grounding of conductors 2041, 2060 and 2055 as $1.05.

If the initial period of conversation is to be charged at the rate of 25 cents, then the A25 relay 2025 is operated in turn causing the operation of the A5 relay 2005 and the A20 relay 2020. Relay A5 functions as previously described to cause the operation of the DM relay 2002 to increase the value in the dimes place by one if the cents value of the charge for the overtime period is odd and relay 2020 functions in the manner previously described to increase the value in the dimes place by two and to increase the value in the dollars place by one if the dimes value of the charge for the overtime period is either 8 or 9 and ground is connected to either conductor 1948 or 1949.

If the initial period of conversation is to be charged at the rate of 30 cents, then the A30 relay 2030 is operated. With the A5 relay 2005 unoperated, the value in the cents place remains unchanged but the value in the dimes place is increased by three. As an example, it will be assumed that the charge for the overtime period was 30 cents and that therefore ground has been connected to conductors 1930, 1943 and 1950. With relays 2001 and 2005 both unoperated, conductor 1930 is extended over the lower No. 5 back contact of relay 2001 to conductor 1940 of the Total Dollars group and conductor 1950 is extended over the lower back contact of relay 2005 to conductor 2050 of the Total Cents group. Conductor 1943 is also extended over the upper No. 3 back contacts of relays 2002, 2010 and 2020 and over the upper No. 3 front contact of operated relay 2030 to conductor 2066 of the Total Dimes group. Thus the total charge for the call is indicated by the grounding of conductors 2040, 2066 and 2050 as 60 cents.

As a further example, it will be assumed that the charge for the overtime period was 70 cents and that therefore ground has been connected to conductors 1930, 1947 and 1950. With relay 2005 unoperated, conductor 1950 is extended to conductor 2050 of the Total Cents group. Grounded conductor 1947 is also extended over the lower No. 2 back contacts of relays 2002, 2010 and 2020 and over the lower No. 2 front contact of relay 2030 through the right winding of the A3D relay 2006 to battery. Relay 2006 thereupon operates and extends its operating ground over its inner right contacts to conductor 2060 and at its outer left front contact establishes the circuit of the DL relay 2001 which, upon operating, extends grounded conductor 1930 over its lower No. 5 front contact to conductor 2041 of the Total Dollars group. Thus the total charge for the call is now indicated by the grounding of conductors 2041, 2060 and 2050 as $1.00.

In a similar manner if the overtime period was charged at 80 cents or 90 cents, ground on conductor 1948 or 1949 would cause the operation of the A3D relay 2006 over either its middle or left winding. If relay 2006 is energized over its middle winding, its operating ground is extended over its outer right contacts to conductor 2061 of the Total Dimes group and the DL relay 2001 is operated to connect conductor 1930 to conductor 1941 of the Total Dollars group, and if energized over its left winding, its operating ground is extended over its inner left contacts to conductor 2062 of the Total Dimes group and the DL relay 2001 is operated to connect conductor 1930 to conductor 1941 of the Total Dollars group. In the case of the 80-cent call, the total charge is increased to $1.10 as indicated by the grounded conductors 2041, 2061 and 2050 and in the case of the 90-cent call, the total charge is increased to $1.20 as indicated by the grounded conductors 2041, 2062 and 2050.

If the initial period of conversation is to be charged at the rate of 35 cents, then the A35 relay 2035 is operated in turn causing the operation of the A5 relay 2005 and the A30 relay 2030. Relay A5 operates as previously described to cause the operation of the DM relay 2002 to increase the value in the dimes place by one if the cents value of the charge for the overtime period is odd and relay 2030 increases the value in the dimes place by three and increases the value in the dollars place by one if the dime value of the charge for the overtime period is either 7, 8 or 9 and ground is connected to either conductor 1947, 1948 or 1949.

The conductors of the Total Dollars, Total Dimes and Total Cents group are connectable to the terminals of the cross-connecting rack 2100 of Fig. 21, connected to a card punching machine of a well-known type, through the successive operation of the DC, DMC and NC progress relays 2101, 2102 and 2103 under the control of the progress switch 1350 of Fig. 13 as later described. In addition, the conductors of these groups are instrumental in controlling the circuits of Fig. 21 to determine the federal tax to be assessed for a toll call.

*Computation of the Federal tax*

To compute the tax the dollar register relays 0D to 9D and designated 2110 to 2119, inclusive, are provided, with their windings connected respectively to the conductors of the Total Dollars group having corresponding digital values. For example, the winding of the 0D relay 2110 is connected to conductor 2040, the winding of the 1D relay 2111 is connected to conductor 2041, and so forth. Also, the ten 0 to 9 windings of relays 2120 to 2126, inclusive, are connected to conductors of the Total Dimes group having corresponding digital values. For example, the winding of the 0 relay 2120 is connected to conductor 2060, the winding of the 1 relay 2121 is connected to conductor 2061, the winding of the 2 relay 2122 is connected to conductor 2062, the 3 winding of relay 2123 is connected to conductor 2063, the 4 winding of relay 2123 is connected to conductor 2064, and so forth. The winding of the 5C relay 2127 is also connected to conductor 2055 of the Total Cents group and when operated registers a nickel charge in the cents place of the tax charge for a call.

It is assumed that in accordance with the federal law no tax is to be assessed on calls up to and including 20 cents. Consequently, with the 0D relay 2110 operated to register the zero dollars value for a call and with any one of the 0, 1 or 2 relays 2120, 2121 or 2122 operated to register a 0, 1 or 2 in the dimes place for the call, ground is connected over the lower front contact of relay 2110 and over the inner upper contacts of the operated relay 2120 or 2121, or over the inner upper contacts of relay 2122 and the inner upper back contact of the 5C relay 2127 to conductor 2150 indicative of a zero value of cents for the tax. With the 0D relay 2110 operated, ground is also connected from the lower contacts of the operated relay 2120, 2121 or 2122 over the inner lower contacts of relay 2110 to conductor 2160 indicative of a zero value of dimes for the tax, and with the 9D relay 2119 unoperated ground is connected over its lower back contact to conductor 2170 indicative of a zero value of dollars for the tax. Conductors 2170, 2160 and 2150 are at the appropriate time successively connected to the No. 0 terminal on the cross-connecting rack 2100 to control the No. 0 punch of the card punching machine upon the successive operation of the DT, DMT and NT relays 2104, 2105 and 2106 under the control of the progress switch 1350 as will be later described.

With the 2 relay 2122 and the 5C relay 2127 both operated indicative of a toll charge of 25 cents, the cents of the tax is changed to 5 by the connection of ground over the lower front contact of the 0D relay 2110, over the inner upper contacts of the 2 relay 2022 and over the inner upper front contact of the 5C relay 2127 to conductor 2155 indicative of a nickel tax. The operation of the 0D relay 2110, the 2 relay 2122 and the non-operation of the 9D relay 2119 cause the connection of ground to conductors 2160 and 2170 as before so that when the progress relays 2104, 2105 and 2106 are subsequently operated, ground is connected twice to the No. 0 terminal and then to the No. 5 terminal of the rack 2100 to control the card punching machine to punch 005 in the card indicative of a 5-cent tax.

On a call for which the total charge was 30, 35, 40 or 45 cents on the 0D relay 2110 will be operated and relay 2123 will be operated over its 3 or 4 winding dependent upon whether the tens digit was 3 or 4 and the 9D relay 2119 will not be operated. As a consequence ground will be connected over the lower back contact of relay 2119 to conductor 2170, ground will be connected over the upper contacts of relay 2123 and the inner lower contacts of relay 2110 to conductor 2160 and ground will be connected over the lower contacts of relay 2123 to conductor 2155. If, however, the 5 relay 2124 is operated rather than relay 2123 for a tens digit 5, ground is connected as just described to conductor 2170, but ground is connected to conductor 2160 over the inner lower contacts of relay 2110 and over the inner lower contacts of relay 2124, from the lower back contact of the 5C relay 2127 and ground is connected to conductor 2155 over the inner lower back contact of relay 2127 and over the lower contacts of relay 2124. Thus until the charge for the call exceeds 50 cents, the card punching machine is still controlled to punch 005 in the card indicative of a 5-cent tax. Thus until the charge exceeds 50 cents and the 5C relay 2127 operates together with the relay 2124 for a 55-cent call, or either relay 2125 or 2126 operates with or without relay 2127 for a call over 55 cents but less than $1.00 the tax is also calculated at 5 cents.

Each increment in the tens place of 50 or a fraction thereof results in an increase in the tax by 5 cents. If it be assumed that the total charge for the call was 55 cents and as a consequence the 0D relay 2110, the 5C relay 2127 and the 5 relay 2124 are all operated, but the 9D relay 2119 is not operated, ground is connected to conductor 2170 over the lower back contact of relay 2119 as before, and ground is applied to conductor 2161 over the upper contacts of relay 2110, over the upper contacts of relay 2124 and to ground over the lower front contact of relay 2127 and ground is also connected over the lower contacts of relay 2124 and the inner lower front contact of relay 2127 to conductor 2150.

If the charge for the call is 60, 70, 80 or 90 cents, either relay 2125 or relay 2126 will be operated resulting in the connection of ground over the upper contacts of such relay and the upper contacts of relay 2110 to conductor 2161 and the connection of ground over the lower contacts of such operated relay 2125 or 2126 to conductor 2150. If the charge for the call is 65, 75, 85, or 95 cents either relay 2125 or 2126 will be operated and relay 2127 will also be operated but without effect. Either relay 2125 or 2126 will connect ground over its upper contacts and the upper contacts of relay 2110 to conductor 2161 and will connect ground over its lower contacts to conductor 2150. If the charge for the call was $1.00 then the 1D relay 2111 and the 0 relay 2120 will be operated and the 0D and 9D relays 2110 and 2119 will be unoperated. Ground will therefore be connected to conductor 2161 over the lower contacts of relay 2111 and over the lower contacts of relay 2120 and ground will be connected over the lower back contact of relay 2110, over the upper contacts of relay 2120 and over the upper back contact of relay 2127 to conductor 2150. With relay 2119 unoperated, ground is connected to conductor 2170. Thus on all calls over 50 cents but less than $1.05 conductors 2170, 2161 and 2150 are grounded and when thereafter the progress relays 2104, 2105 and 2106 are sequentially operated such conductors are successively connected to the Nos. 0, 1 and 0 terminals on rack 2100 to control the card punching machine to punch 010 in a card indicative of a 10-cent tax.

It is obvious that a value between $1.05 and $1.20, inclusive, should register a 15-cent tax. A shift to accomplish this change from the arrangement for 5 to 20 cents as previously described is made by the release of the 0D relay 2110 which, when released, connects ground to the upper strapped contacts of the 0, 1 and 2 relays 2120, 2121 and 2122. For example, if the total charge for the call was $1.05, then 1D relay 2111, 0 relay 2120 and 5C relay 2127 are operated. Ground is now connected from the lower contacts of relay 2120 over the lower contacts of relay 2111 to conductor 2161 and ground is connected over the lower back contact of relay 2110 over the upper contacts of relay 2120 and the upper front contact of relay 2127 to conductor 2155. If the charge for the call is $1.10 or $1.20 either relay 2121 or 2122 will be operated but relay 2127 will not be operated and ground will be connected over the lower contacts of either relay 2121 or relay 2122 and over the lower contacts of relay 2111 to conductor 2161 and ground will be connected from the lower back contact of relay 2110 and over the upper contacts of either relay 2121 or relay 2122 to conductor 2155. If the charge for the call is $1.15 or $1.25 either 2121 or 2122 will be operated and relay 2127 will also be operated but without effect and ground will be connected over the lower contacts of either relay 2121 or relay 2122 and over the lower contacts of relay 2111 to conductor 2161 and ground will be connected from the lower back contact of relay 2110 over the upper contacts of either relay 2121 or relay 2122 to conductor 2155. In each case ground will be connected over the lower back contacts of relay 2119 to conductor 2170. Thus with ground connected to conductors 2170, 2161 and 2155, when later the progress relays 2104, 2105 and 2106 are sequentially operated, such conductors are successively connected to the Nos. 0, 1 and 5 terminals of rack 2100 to control the card punching machine to punch 015 in a card indicative of a 15-cent tax.

For calls of $1.30 to $1.50, inclusive, one of relays 2123 or 2124 will be operated and relay 2127 will also be operated if the charge were 5 in the cents place. With relay 2123 operated for call charge of $1.30, $1.35, $1.40 or $1.45, ground is connected over the upper contacts of relay 2123 and over the lower contacts of relay 2111 to conductor 2161 and ground is connected over the lower contacts of relay 2123 to conductor 2155. With relay 2124 operated for a $1.50 call ground is connected from the lower back contact of relay 2127, over the inner lower contacts of relay 2124 and over the lower contacts of relay 2111 to conductor 2161 and ground is connected over the lower contacts of relay 2124 and the inner lower back contact of relay 2127 to conductor 2155. Ground is also connected as before to conductor 2170. Thus with ground connected to conductors 2170, 2161 and 2155, when later the progress relays 2104, 2105 and 2106 are sequentially operated, such conductors are successively connected to the Nos. 0, 1 and 5 terminals of rack 2100 to control the card punching machine to punch 015 in a card indicative of a 15-cent tax.

For calls of $1.55 to $1.95, inclusive, one of relays 2124, 2125 and 2126 will be operated and relay 2127 will also be operated if the charge was 5 in the cents place. With relay 2124 operated together with relay 2127 on a call charge of $1.55 ground is connected to conductor 2162 over the lower front contacts of relay 2127, over the upper contact of relay 2124 and over the upper contacts of relay 2111 to conductor 2162, and ground is connected over the lower contacts of relay 2124 and over the inner lower front contact of relay 2127 to conductor 2150. With relays 2125 and 2126 operated for call charges of $1.60 to $1.95, inclusive, ground is connected over the upper contacts of either relay 2125 or relay 2126, and over the upper contacts of relay 2111 to conductor 2162 and ground is connected over the lower contacts of either relay 2125 or relay 2126 to conductor 2150 irrespective of the condition of relay 2127. Ground will also be connected to conductor 2170 as previously described. Thus with ground connected to conductors 2170, 2162 and 2150, when later the progress relays 2104, 2105 and 2106 are sequentially operated, such conductors will be connected to the Nos. 0, 2 and 0 terminals of rack 2100 to control the card punching machine to punch 020 in a card indicative of a 20-cent tax.

For a call charge of $2.00 the 2D relay 2112 and the 0 relay 2120 will be operated and relays 2127 and 2119 will be unoperated. With relays 2120 and 2112 operated, ground is connected over the lower contacts of relay 2120 and the lower contacts of relay 2112 to conductor 2162 and ground is connected from the lower back contact of relay 2110, over the upper contacts of relay 2120 and over the upper back contact of relay 2127 to conductor 2150. Ground is connected to conductor 2170 as before so that with ground connected to conductors 2170, 2162 and 2150 the card punching machine will be controlled to punch 020 in a card indicative of a 20-cent tax.

In a similar manner the tax is calculated on a basis of 5 cents additional tax for each 50-cent increase in the charge for the call. The maximum tax possible under the basic rate schedule set forth in the preceding table is $1.00 on a total call charge of $9.95 for a 99-minute call. On a call charge of $9.95 the 9D relay 2119, relay 2126 and the 5C relay 2127 will be operated. With relay operated ground is connected over the upper contacts of relay 2126 and the upper contacts of relay 2119 to conductor 2171 and ground is removed at the lower back contacts of relay 2119 from conductor 2170. Ground is also connected over the upper contacts of relay 2126, over the inner upper contacts of relay 2119 to conductor 2160 and ground is connected over the lower contacts of relay 2126 to conductor 2150. With ground connected to conductors 2171, 2160 and 2150, when later the progress relays 2104, 2105 and 2106 are sequentially operated, such conductors will be connected to the Nos. 1, 0 and 0 terminals of rack 2100 to control the card punching machine to punch 100 in a card indicative of a dollar tax.

*No overtime*

It will be recalled that on calls on which the elapsed time is equal to or less than the initial period of conversation ground is connected to conductor NOT. A circuit is thereby completed from such conductor through the windings of the DM–CT relay 1906 and DL relay 1905 in parallel to battery. With relays 1905 and 1906 operated all conductors of the Price Dollars group of Fig. 19 are disconnected at the back contacts of relay 1905, conductors 1940 to 1949, inclusive, of the Price Dimes group are disconnected at back contacts of relay 1906 and conductor 1950 of the Price Cents group is disconnected at the upper No. 6 back contact of relay 1906. However, ground is connected over the upper No. 4 front contact of relay 1906 to conductor 1940 of the Price Dimes group, ground is connected over the upper No. 6 front contact of relay 1906 to conductor 1950 of the Price Cents group, and ground is connected over the left No. 5 front contact of relay 1905 to conductor 1930 of the Price Dollars group. Thus with ground connected to conductors 1930, 1940 and 1950, a calculation of no overtime charge is made so that the subsequent addition of the charge for the initial period as calculated by the addition circuits of Fig. 20 results in the extension of such grounded conductors to conductors of the Total Dollars, Total Dimes and Total Cents groups in such a manner as will be indicative only of the charge for the initial period of conversation.

*Transfer of registered and calculated information to card punching machine*

It will be recalled that following the complete registration of all information concerning the toll call received from the ticket tape recorder, the progress switch 1350 of Fig. 13 was advanced one step out of its normal position to position brush 1355 in engagement with the No. 1 terminal of its associated arc. It will be recalled that the assumed directory listing of the calling line was AUDibon 1845 and that as a consequence the relays 613 and 516 of the Calling Code A register of Fig. 6 had been operated to register the digit 2 which is the numerical equivalent of the code letter A. A circuit is thereupon effective from ground on conductor GD, over the upper normal contacts of stepping relay 1352, over the upper back contact of relay 1388, over brush 1355, over conductor 1358, over the next to lower contacts of register relay 615, the lower contacts of register relay 613 and to the No. 2 terminal cross-connected to the No. 2 terminal of rack 2100 of Fig. 21. The No. 2 punch magnet of the card punching machine is thereby controlled to punch a hole at the digit 2 space of the first column of the card whereupon contacts 2107 are closed indicative of the operation of the punch and the card is advanced in the usual manner preparatory to punching in the next data column. The closure of contacts 2107 establishes an obvious circuit over conductor 2108 for relay 1389 which thereupon operates and establishes over its inner contacts an operating circuit for stepping relay 1352 which thereupon operates and locks over its lower contacts to ground at the upper contacts of relay 1389 and at its upper transfer contacts disconnects ground from the No. 2 terminal of cross-connecting rack 2100 to release the operated punch magnet. The punch magnet upon releasing opens contacts 2107 which causes the release of relay 1389 to open the operating and locking circuits of relay 1352 which relay thereupon releases. At its upper front contact relay 1352 establishes the circuit of stepping magnet 1351 of progress switch 1350 which operates and then releases following the release of stepping relay 1352 to advance the brushes of switch 1350 one step.

Figure 6:
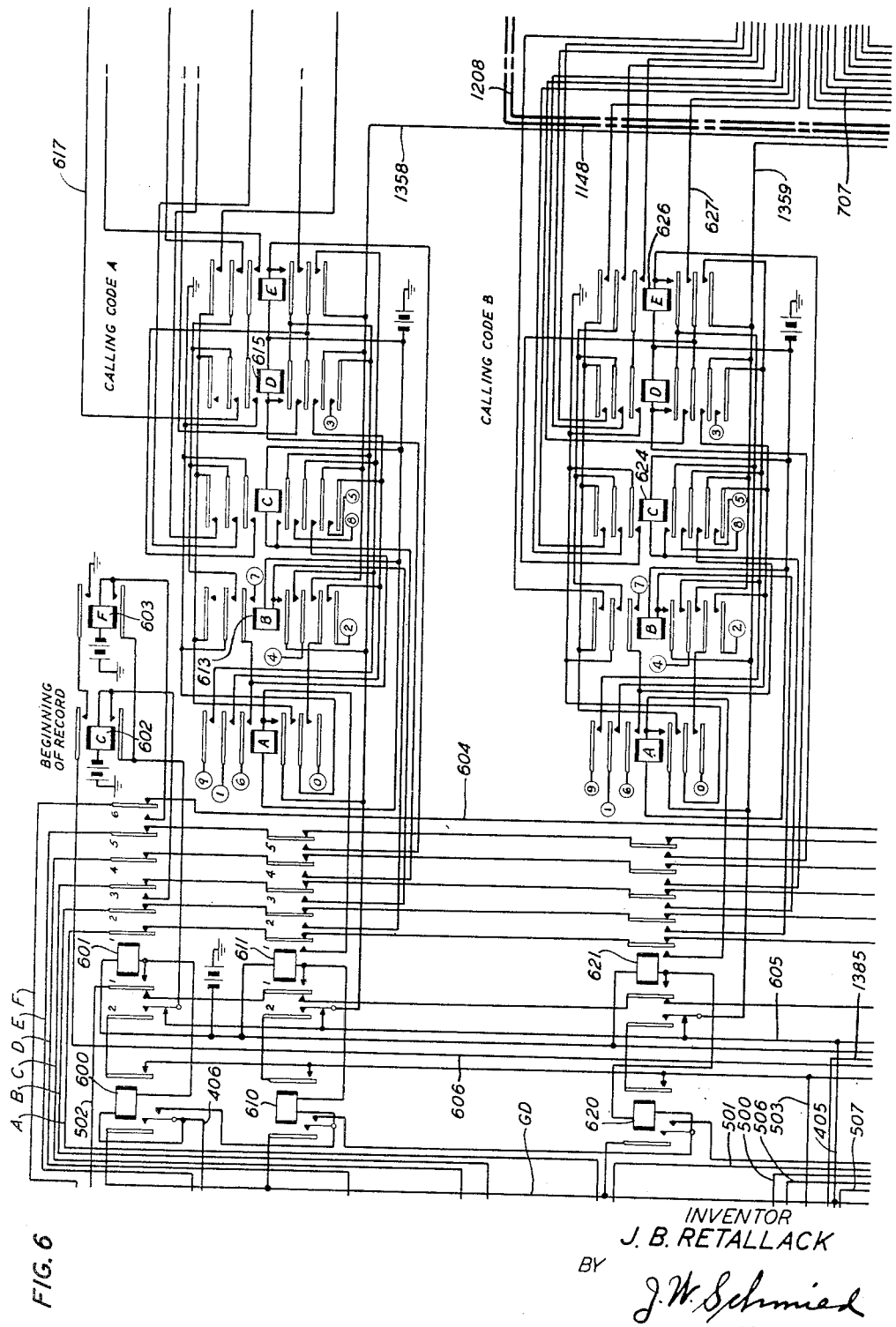
Fig. 6 shows a beginning-of-record register and the A and B calling office code registers of the receiver.

With brush 1355 on the second terminal of its arc ground on conductor GD is applied over the upper normal contacts of relay 1352, over the upper back contact of relay 1388, over brush 1355, over conductor 1359, over the lower contacts of relay 626 and the next-to-inner lower contacts of relay 624 of the Calling Code B register of Fig. 6 to the No. 8 terminal cross-connected to the No. 8 terminal of rack 2100 of Fig. 21. The No. 8 punch magnet of the card punching machine is thereby controlled to punch a hole at the digit 8 space of the second column of the card, whereupon contacts 2107 are closed indicative of the operation of the punch and the card is advanced in the usual manner preparatory to punching in the next data column. The closure of contacts 2107 causes the advance of the brushes of progress switch 1350 another step in the manner previously described.

Figure 7:
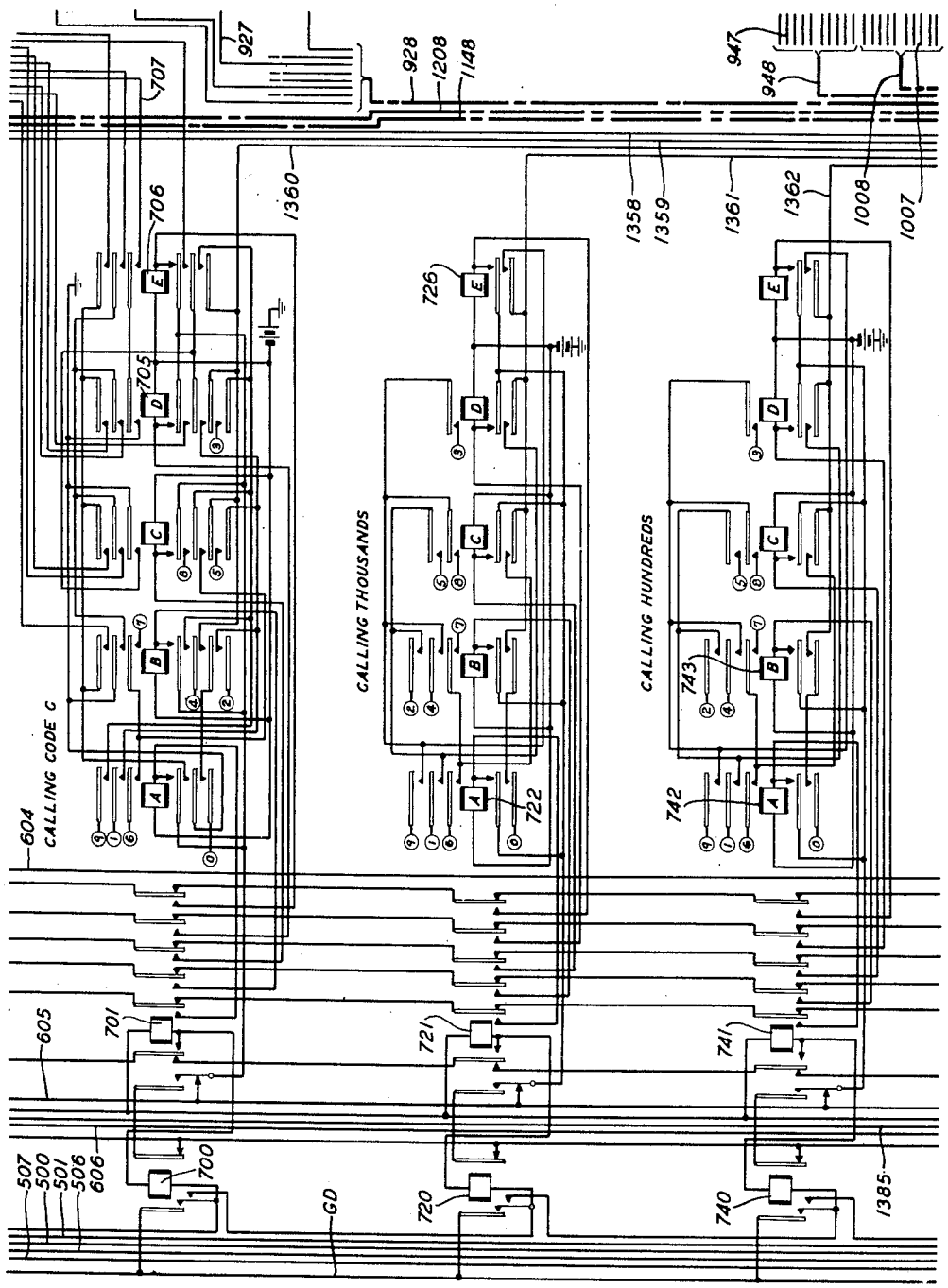
Fig. 7 shows the C calling office code register and the registers for registering the thousands and hundreds digits of the calling line number.

With brush 1355 now on the third terminal of its arc, ground on conductor GD is applied over the upper normal contacts of relay 1352, over the upper back contact of relay 1388, over brush 1355, over conductor 1360, over the lower contacts of relay 706 and the lower contacts of relay 705 of the Calling Code C register of Fig. 7 to the No. 3 terminal cross-connected to the No. 3 terminal of rack 2100 of Fig. 21. The No. 3 punch magnet of the card punching machine is thereby controlled to punch a hole at the digit 3 space of the third column of the card, whereupon contacts 2107 are closed indicative of the operation of the punch and the card is advanced in the usual manner preparatory to punching in the next data column. The closure of contacts 2107 causes the advance of the brushes of the progress switch 1350 another step in the manner previously described.

With brush 1355 now on the fourth terminal of its arc, ground on conductor GD is applied over the upper normal contacts of relay 1352, over the upper back contact of relay 1388, over brush 1355, over conductor 1361, over the lower contacts of relay 726 and the upper contacts of relay 722 of the Calling Thous. register of Fig. 7 to the No. 9 terminal cross-connected to the No. 9 terminal of rack 2100 of Fig. 21. The No. 9 punch of the card punching machine is thereby controlled to punch a hole at the digit 9 space of the fourth column of the card, whereupon contacts 2107 are closed indicative of the operation of the punch and the card is advanced in the usual manner preparatory to punching in the next data column. The closure of contacts 2107 causes the advance of the brushes of progress switch 1350 another step in the manner previously described.

With brush 1355 now on the fifth terminal of its arc, ground on conductor GD is applied over the upper normal contacts of relay 1352, over the upper back contact of relay 1388, over brush 1355, over conductor 1362, over the lower contacts of relays 743 and 742 of the Calling Hunds. register of Fig. 7 to the No. 0 terminal cross-connected to the No. 0 terminal of rack 2100 of Fig. 21. The No. 0 punch of the card punching machine is thereby controlled to punch a hole at the digit 0 space of the fifth column of the card, whereupon contacts 2107 are closed indicative of the operation of the punch and the card is advanced in the usual manner preparatory to punching in the next data column. The closure of contacts 2107 causes the advance of the brushes of switch 1350 another step in the manner previously described.

Figure 8:
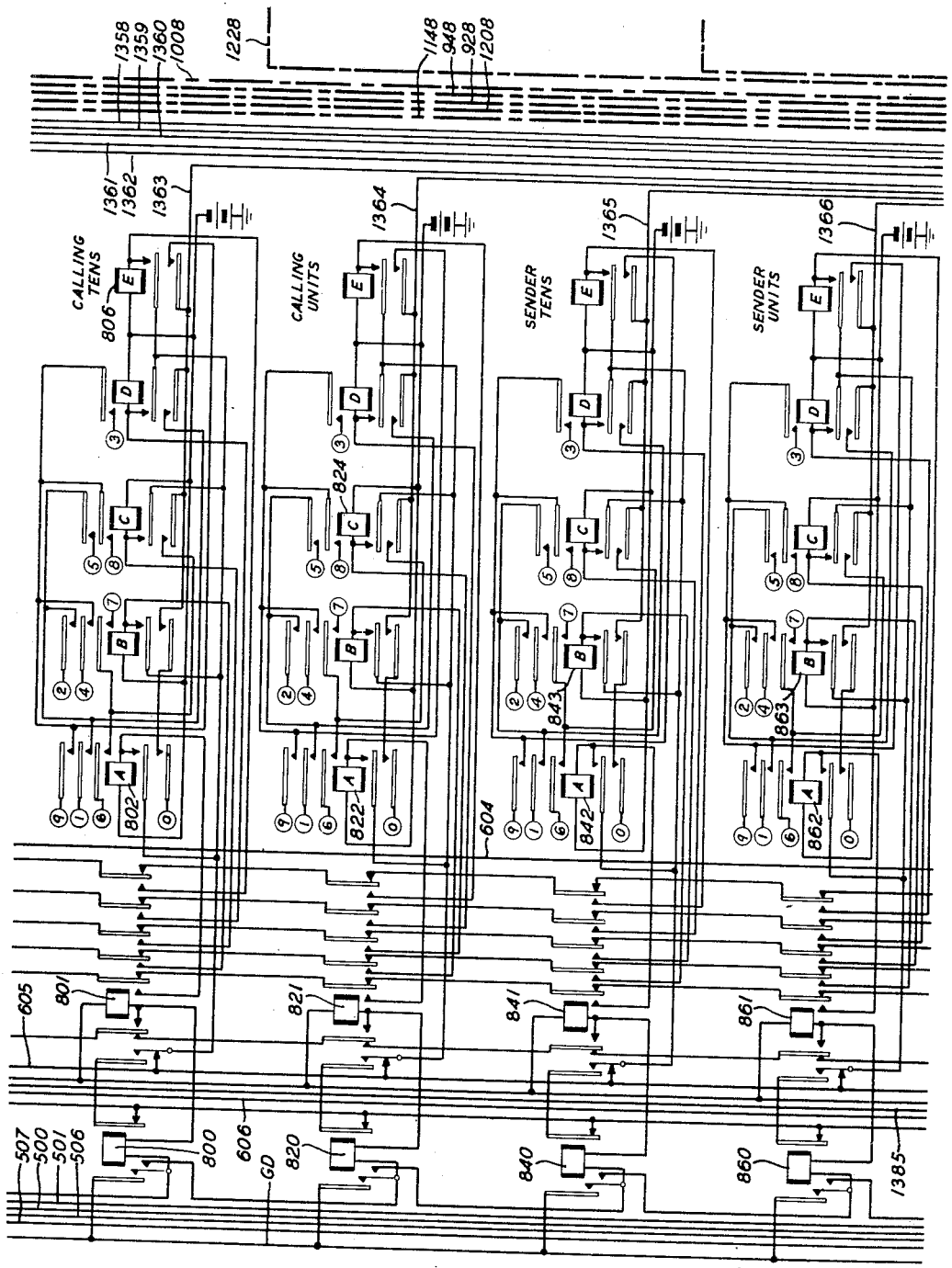
Fig. 8 shows the registers for registering the tens and units digits of the calling line number and the tens and units digits of the number of the sender used in the connection.

With brush 1335 on the sixth terminal of its arc, ground on conductor GD is applied over the upper normal contacts of relay 1352, over the upper back contact of relay 1388, over brush 1355, over conductor 1363, over the lower contacts of relay 806 and the upper contacts of relay 802 of the Calling Tens register of Fig. 8 to the No. 9 terminal cross-connected to the No. 9 terminal of rack 2100 of Fig. 21. The No. 9 punch of the card punching machine is thereby controlled to punch a hole at the digit 9 space of the sixth column of the card, whereupon contacts 2107 are closed indicative of the operation of the punch and the card is advanced in the usual manner preparatory to punching in the next data column. The closure of contacts 2107 causes the advance of the brushes of switch 1350 another step in the manner previously described.

With brush 1355 now on the seventh terminal of its arc, ground on conductor GD is applied over the upper normal contacts of relay 1352, over the upper back contact of relay 1388, over brush 1355, over conductor 1364, over the lower contacts of relay 824 and the inner upper contacts of relay 822 of the Calling Units register of Fig. 8 to the No. 6 terminal cross-connected to the No. 6 terminal of rack 2100 of Fig. 21. The No. 6 punch of the card punching machine is thereby controlled to punch a hole at the digit 6 space of the seventh column on the card, whereupon contacts 2107 are closed indicative of the operation of the punch and the card is advanced in the usual maner preparatory to punching in the next data column. The closure of contacts 2107 causes the advance of the brushes of switch 1350 another step in the manner previously described. The card has thus been punched in a manner indicative of the calling line number AUD 9096.

In the next nine positions the brush 1355, a month, day and hour circuit of the type disclosed in Patent No. 2,355,903, granted August 15, 1944, to F. E. Blount, may be associated with the progress switch to control the operation of the card punching machine to punch holes in a card in the eighth to fourteenth columns indicative of the tens and units digits of the month, the tens and units digits of the day of the month and the tens, units and tenth hour digits of the hour of the day. If it should be considered unnecessary to punch this data in the toll card the terminals of the arc of switch 1350 to which brush 1355 has access, reserved for the control and connection of a month, day and hour circuit, may be strapped together and connected to the back contact of the stepping magnet 1351 so that the magnet will function to rapidly advance the brush 1355 over such strapped terminals into engagement with the seventeenth terminal of its arc. In the case the month, day and minute data is required, the brush 1355 will have been advanced into engagement with the seventeenth terminal of its arc after the month, day and hour data has been punched in the card and the month, day and hour circuit has been disconnected from the receiving and the accounting circuits.

With brush 1355 on such seventeenth terminal of its arc, ground on conductor GD is now connected over the upper normal contacts of relay 1352, over the upper back contact of relay 1388, over brush 1355, over conductor 1365, over the lower contacts of relays 843 and 842 of the Sender Tens register of Fig. 8 to the No. 0 terminal cross-connected to the No. 0 terminal of rack 2100 of Fig. 21. The No. 0 punch of the card punching machine is thereby controlled to punch a hole in the card at the digit 0 space of the fifteenth column of the card, whereupon contacts 2107 are closed indicative of the operation of the punch and the card is advanced in the usual manner preparatory to punching in the next data column. The closure of contacts 2107 causes the advance of the brushes of switch 1350 another step in the manner previously described.

With brush 1355 on the eighteenth terminal of its arc, ground is applied from conductor GD over the upper normal contacts of relay 1352, over the upper back contact of relay 1388, over brush 1355, over conductor 1366 and over the lower contacts of relays 863 and 862 of the Sender Units register of Fig. 8 to the No. 0 terminal cross-connected to the No. 0 terminal of rack 2100 of Fig. 21. The No. 0 punch of the card punching machine is thereby controlled to punch a hole at the digit 0 space of the sixteenth column of the card, whereupon contacts 2107 are closed indicative of the operation of the punch and the card is advanced in the usual manner preparatory to punching in the next data column. The closure of contacts 2107 causes the advance of the brushes of switch 1350 another step in the manner previously described.

Figure 9:
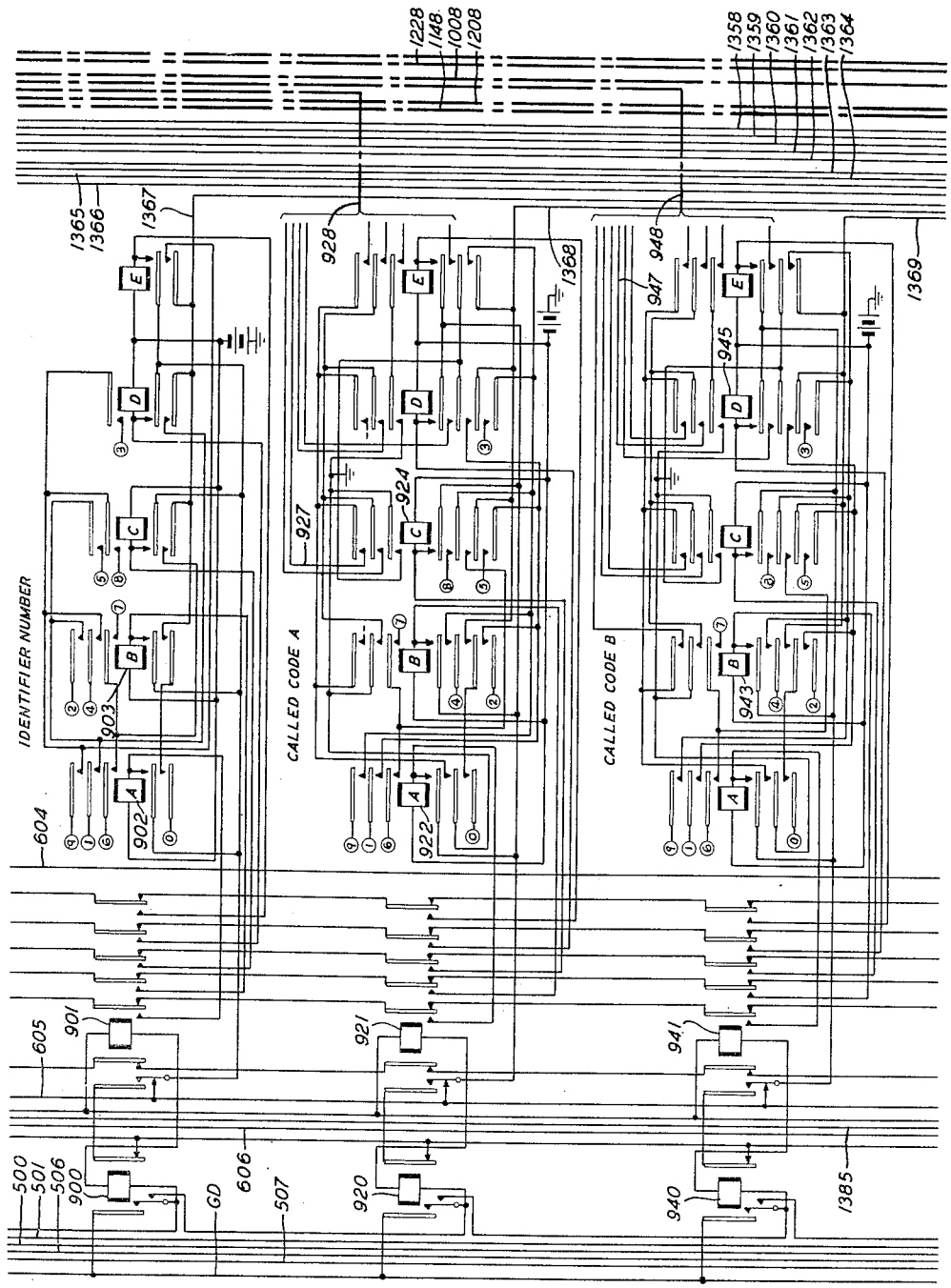
Fig. 9 shows the register for registering the number of the identifier used on the connection and the A and B called office code registers.

With brush 1355 on the nineteenth terminal of its arc, ground is applied from conductor GD over the upper normal contacts of relay 1352, over the upper back contact of relay 1388, over brush 1355, over conductor 1367 and over the lower contacts of relays 903 and 902 of the Identifier No. register of Fig. 9 to the No. 0 terminal cross-connected to the No. 0 terminal of rack 2100 of Fig. 21. The No. 0 punch of the card punching machine is thereby controlled to punch a hole at the digit 0 space of the seventeenth column of the card, whereupon contacts 2107 are closed indicative of the operation of the punch and the card is advanced in the usual manner preparatory to punching in the next data column. The closure of contacts 2107 causes the advance of the brushes of switch 1350 another step in the maner previously described. The numbers of the sender and identifier used on the connection have thus been punched in the card for maintenance purposes. Should it be found unnecessary to have a record of these numbers on the toll card, the seventeenth, eighteenth and nineteenth terminals of the arc of switch 1350 to which brush 1355 have access may be disconnected from the sender and identifier number registers and may be strapped together and connected to the back contact of the stepping magnet 1351 so that the magnet will be controlled to rapidly step the brush 1355 over such terminals into engagement with the twentieth terminal of its arc.

With brush 1355 on the twentieth terminal of its arc, ground on conductor GD is connected over the upper normal contacts of relay 1352, over the upper back contact of relay 1388, over brush 1355, over conductor 1368, over the next to lower contacts of relay 924 and over the inner upper contacts of relay 922 of the Called Code A register of Fig. 9 to the No. 6 terminal cross-connected to the No. 6 terminal on rack 2100 of Fig. 21. The No. 6 punch of the card punching machine is thereby controlled to punch a hole at the digit 6 space of the eighteenth column of the card, whereupon contacts 2107 are closed indicative of the operation of the punch and the card is advanced in the usual manner preparatory to punching in the next data column. The closure of contacts 2107 causes the advance of the brushes of switch 1350 another step in the manner previously described.

With brush 1355 on the twenty-first terminal of its arc, ground on conductor GD is connected over the upper normal contacts of relay 1352, over the upper back contact of relay 1388, over brush 1355, over conductor 1369, over the next to lower contacts of relay 945 and the lower contacts of relay 943 of the Called Code B register of Fig. 9 to the No. 2 terminal cross-connected to the No. 2 terminal of rack 2100 of Fig. 21. The No. 2 punch of the card punching machine is thereby controlled to punch a hole at the digit 2 space of the nineteenth column of the card, whereupon contacts 2107 are closed indicative of the operation of the punch and the card is advanced in the usual manner preparatory to punching in the next data column. Closure of contacts 2107 causes the advance of the brushes of switch 1350 another step in the manner previously described.

Figure 10:
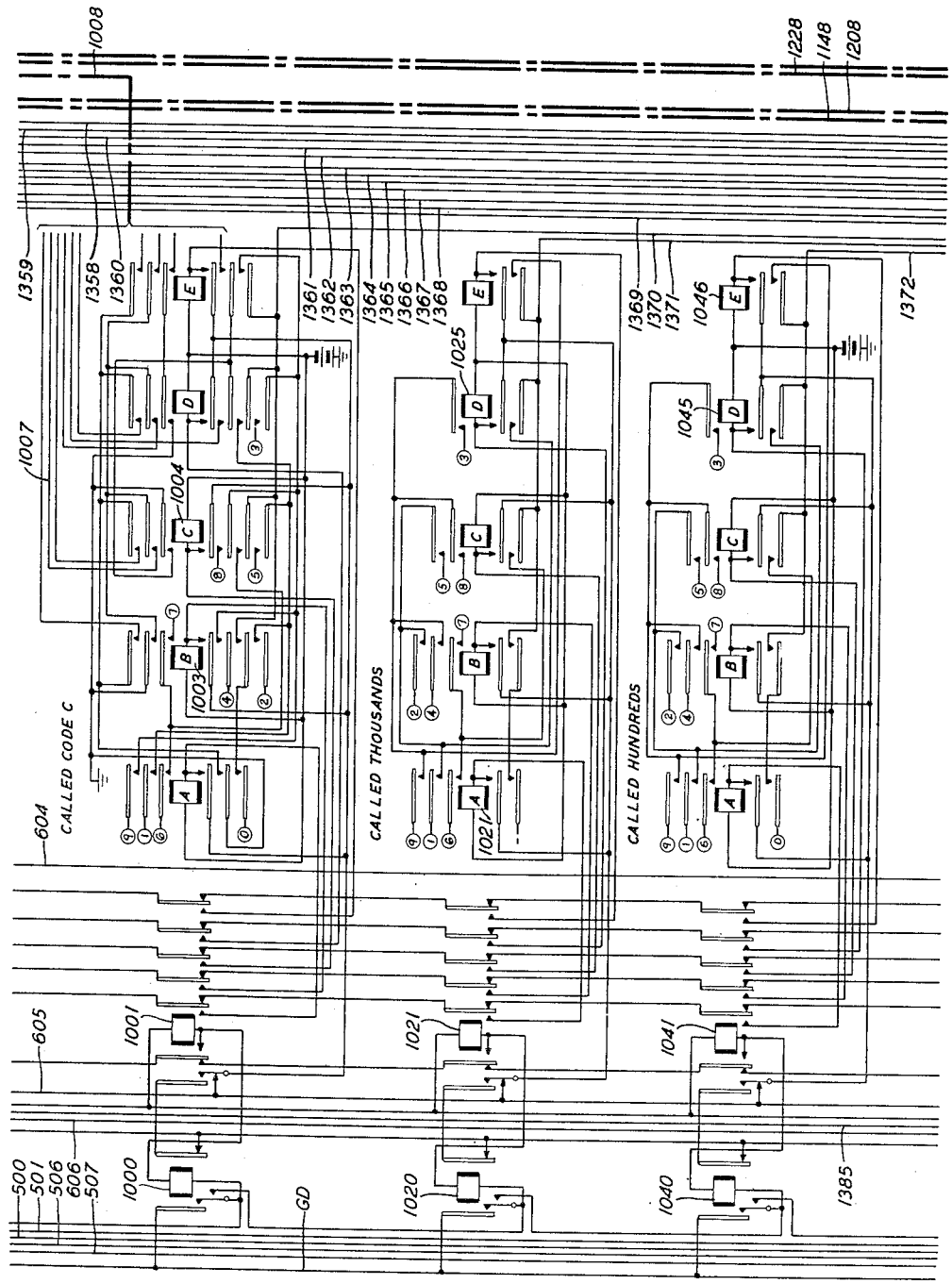
Fig. 10 shows the C called office code register and the registers for registering the thousands and hundreds digits of the called line number.

When brush 1356 engages the first terminal of its arc, ground on conductor GD is connected over the upper normal contacts of relay 1352, over the upper back contact of relay 1388, over brush 1356, over conductor 1370, over the next to lower contacts of relay 1004 and the inner upper contacts of relay 1003 of the Called Code C register of Fig. 10 to the No. 7 terminal cross-connected to the No. 7 terminal of Fig. 21. The No. 7 punch of the card punching machine is thereby controlled to punch a hole in the digit 2 space of the twentieth column of the card, whereupon contacts 2107 are closed indicative of the operation of the punch and the card is advanced in the usual manner preparatory to punching in the next data column. The closure of contacts 2107 causes the advance of the brushes of switch 1350 another step in the manner previously described.

With brush 1356 on the second terminal of its arc, ground on conductor GD is connected over the upper normal contacts of relay 1352, over the upper back contact of relay 1388, over brush 1356, over conductor 1371, over the lower contacts of relay 1025 and the middle upper contacts of relay 1021 of the Called Thous. register of Fig. 10 to the No. 1 terminal cross-connected to the No. 1 terminal of rack 2100 of Fig. 21. The No. 1 punch of the card punching machine is thereby controlled to punch a hole at the digit 1 space of the twenty-first column of the card, whereupon contacts 2107 are closed indicative of the operation of the punch and the card is advanced in the usual manner preparatory to punching in the next data column. The closure of contacts 2107 causes the advance of the brushes of switch 1350 another step in the manner previously described.

With brush 1356 on the third terminal of its arc, ground from conductor GD is connected over the upper normal contacts of relay 1352, over the upper back contact of relay 1388, over brush 1356, over conductor 1372, over the lower contacts of relay 1046 and over the upper contacts of relay 1045 of the Called Hunds. register of Fig. 10 to the No. 3 terminal cross-connected to the No. 3 terminal of rack 2100 of Fig. 21. The No. 3 punch of the card punching machine is thereby controlled to punch a hole at the digit 3 space of the twenty-second column of the card, whereupon contacts 2107 are closed indicative of the operation of the punch and the card is advanced in the usual manner preparatory to punching in the next data column. The closure of contacts 2107 causes the advance of the brushes of switch 1350 another step in the manner previously described.

Figure 11:
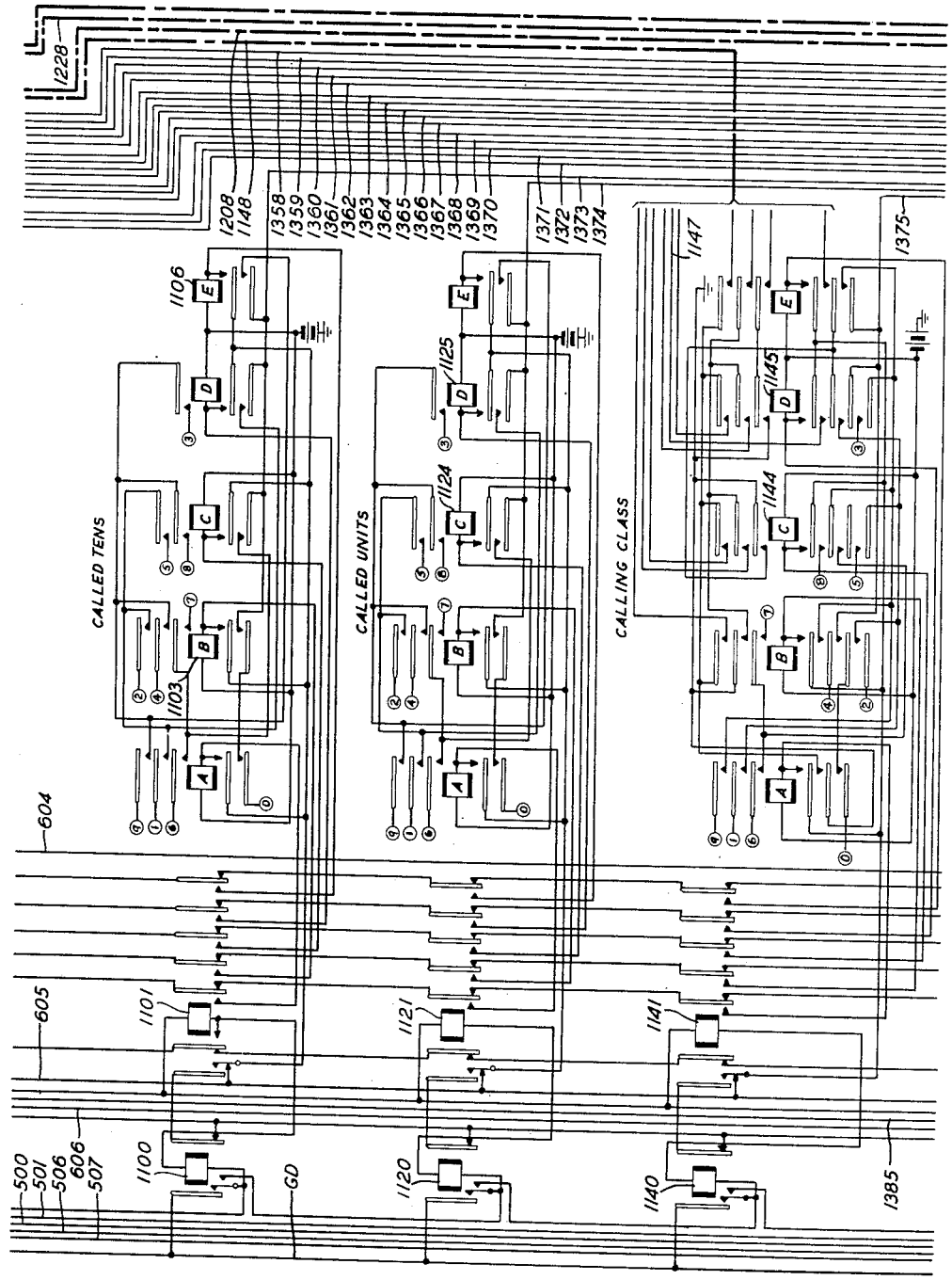
Fig. 11 shows the registers for registering the tens and units digits of the calling line number and the class of the calling line.

With brush 1356 on the fourth terminal of its arc, ground from conductor GD is connected over the upper normal contacts of relay 1352, over the upper back contact of relay 1833, over conductor 1373, over the lower contacts of relay 1106 and the middle upper contacts of relay 1103 of the Called Tens register of Fig. 11 to the No. 4 terminal cross-connected to the No. 4 terminal of rack 2100 of Fig. 21. The No. 4 punch of the card punching machine is thereby controlled to punch a hole at the digit 4 space of the twenty-third column of the card, whereupon contacts 2107 are operated indicative of the operation of the punch and the card is advanced in the usual manner preparatory to punching in the next data column. The closure of contacts 2107 causes the advance of the brushes of switch 1350 another step in the manner previously described.

With brush 1356 on the fifth terminal of its arc, ground on conductor GD is connected over the upper normal contacts of relay 1352, over the upper back contact of relay 1388, over brush 1356, over conductor 1374, over the lower contacts of relay 1125 and the upper contacts of relay 1124 of the Called Units register of Fig. 1 to the No. 5 terminal cross-connected to the No. 5 terminal of the rack 2100 of Fig. 21. The No. 5 punch of the card punching machine is thereby controlled to punch a hole at the digit 5 space of the twenty-fourth column of the card, whereupon contacts 2107 are closed indicative of the operation of the punch and the card is advanced in the usual manner preparatory to punching in the next data column. The closure of contacts 2107 causes the advance of the brushes of switch 1350 another step in the manner previously described. Holes have now been punched in the card indicative of the number of the called line, assumed to be MAR 1845.

With brush 1356 on the sixth terminal of its arc, ground from conductor GD is connected over the upper normal contacts of relay 1352, over the upper back contact of relay 1388, over conductor 1375, over the next to lower contacts of relay 1145 and the lower contacts of relay 1144 of the Calling Class register of Fig. 11 to the No. 5 terminal cross-connected to the No. 5 terminal of rack 2100 of Fig. 21. The No. 5 punch of the card punching machine is thus controlled to punch a hole at the digit 5 space of the twenty-fifth column of the card, whereupon contacts 2107 are closed indicative of the operation of the punch and the card is advanced in the usual manner preparatory to punching in the next data column. The closure of contacts 2107 causes the advance of the brushes of switch 1350 another step in the manner previously described.

With brush 1356 on the seventh terminal of its arc, ground from conductor GD is connected over the upper normal contacts of relay 1352, over the upper back contact of relay 1388, over brush 1356, over conductor 1376, over the next to lower contacts of relay 1205 and the lower contacts of relay 1203 of the Rate register of Fig. 12 to the No. 2 terminal cross-connected to the No. 2 terminal of ground 2100 of Fig. 21. The No. 2 punch of the card punching machine is thereby controlled to punch a hole at the digit 2 space of the twenty-sixth column of the card, whereupon contacts 2107 are closed indicative of the operation of the punch and the card is advanced in the usual manner preparatory to punching in the next data column. The closure of the contacts 2107 causes the advance of the brushes of switch 1350 another step in the manner previously described.

With brush 1356 on the eighth terminal of its arc, ground from conductor GD is connected over the upper normal contacts of relay 1352, over the upper back contact of relay 1388, over brush 1356, over conductor 1377, over the next to lower contacts of relay 1225 and the lower contacts of relay 1222 of the Elapsed Time Tens register of Fig. 12 to the No. 1 terminal cross-connected to the No. 1 terminal of rack 2100 of Fig. 21. The No. 1 punch of the card punching machine is thereby controlled to punch a hole at the digit 1 space of the twenty-seventh column of the card, whereupon contacts 2107 are closed indicative of the operation of the punch and the card is advanced in the usual manner preparatory to punching in the next data column. The closure of contacts 2107 causes the advance of the brushes of switch 1350 another step in the manner previously described.

With brush 1356 on the ninth terminal of its arc, ground from conductor GD is connected over the upper normal contacts of relay 1352, over the upper back contact of relay 1388, over brush 1356, over conductor 1378, over the next to lower contacts of relay 1244 and the inner upper contacts of relay 1242 of the Elapsed Time Units register of Fig. 12 to the No. 6 terminal cross-connected to the No. 6 terminal of rack 2100 of Fig. 21. The No. 6 punch of the card punching machine is thereby controlled to punch a hole at the digit 6 space of the twenty-eighth column of the card, whereupon contacts 2107 are closed indicative of the operation of the punch and the card is advanced in the usual manner preparatory to punching in the next data column. The closure of contacts 2107 causes the advance of the brushes of switch 1350 another step in the manner previously described.

Thus holes have been punched in the card representative of the calling line class, the charge rate and the tens and units digits of the elapsed time. This data may be used for record purposes since this data has, as previously described been employed in calculating the charge for the call. If it should not be necessary to punch this data in the card, the sixth, seventh, eighth and ninth terminals of the arc to which brush 1356 has access may be disconnected from conductors 1375 to 1378, inclusive, and then strapped together and connected to the back contact of stepping magnet 1351 whereby magnet 1351 may be controlled to rapidly advance brush 1356 over such terminals without controlling the card punching machine.

When it is considered desirable to punch holes in the toll card representative of the place name of the toll district to which the toll call has been extended, which latter would be of importance in the event of the adoption of national dialing, the brush 1356 causes the successive operation of the ten progress relays 1390 to 1399, inclusive, as it advanced over terminals 10 to 19, inclusive, of its arc. To simplify the disclosure only relays 1390, 1391 and 1399 of this group have been shown. It will be assumed that the place name relay 1535 of Fig. 15 has been operated, representative of the toll district NEW-YORK. The relay 1535 is provided with twenty contacts arranged in ten pairs for enabling the control of the card punching machine to punch data for a ten-letter place name. These ten contact pairs are connected over the conductors of cable 1540 with pairs of terminals on the cross-connecting rack 1387 of Fig. 13 allocated to the ten letter-progress relays 1390 to 1399, inclusive. For punching holes in toll cards representative of letters, the card punching machine is in the well-known manner provided for over-punching in the digit spaces 12, 11 and 0 of any column in addition to punching in the digit spaces 1 to 9 of such columns. The alphabetical code used by a well-known type of card punching machine suitable for the purpose of the present invention is shown in the following table:

| Over Punch | 12 | 11 | 0 |
|---|---|---|---|
| Numerical Punch Position: | | | |
| 1 | A | J | |
| 2 | B | K | S |
| 3 | C | L | T |
| 4 | D | M | U |
| 5 | E | N | V |
| 6 | F | O | W |
| 7 | G | P | X |
| 8 | H | Q | Y |
| 9 | I | R | Z |

With the assumption that the place name to be punched is NEW-YORK, then it will be seen that the operation of the following punches will be necessary: 11 and 5 for the letter N; 12 and 5 for the letter E; 0 and 6 for the letter W; 0 and 1 for the dash; 0 and 8 for the letter Y; 11 and 6 for the letter O; 11 and 9 for the letter R; and 11 and 2 for the letter K. Accordingly, the incoming terminal pairs of the rack 1387 are cross-connected to the front contacts of the progress relays 1390 to 1399, inclusive, in a manner to provide the proper punch operations. It is to be noted that the cross-connecting rack 1387 is provided with other groups of incoming terminals allocated to other place name relays which terminals may also be cross-connected to contacts of the progress relays.

When the brush 1356 engages the No. 10 terminal of its arc, and relay 1390 is operated over a circuit extending from ground on conductor GD, over the upper normal contacts of relay 1352, over the upper back contact of relay 1388, over brush 1356 and through the winding of relay 1390 to battery, ground is applied over contacts of place name relay 1535, conductors 1541 and 1542 of cable 1540, cross-connected terminals of rack 1387, over the Nos. 11 and 5 contacts of relay 1390 to the Nos. 11 and 5 terminals, cross-connected to the Nos. 11 and 5 terminals of rack 2100 of Fig. 21. The No. 11 overpunch and the No. 5 punch of the card punching machine are thereby operated to punch holes at the digits 11 and 5 spaces in the twenty-ninth column of the card representative of the letter N, whereupon the contacts 2107 are closed indicative of the operation of the punches and the card is advanced preparatory to punching in the next data column. The closure of contacts 2107 causes the advance of the brushes of switch 1350 another step in the manner previously described. The advance of the brush 1356 releases the progress relay 1390.

With brush 1356 engaged with the No. 11 terminal of its arc, relay 1391 is operated and connects conductors 1543 and 1544 of cable 1540, grounded through the operation of place name relay 1535, over its Nos. 12 and 5 contacts with the Nos. 12 and 5 terminals cross-connected to the Nos. 12 and 5 terminals of rack 2100 of Fig. 21. The No. 12 overpunch and the No. 5 punch of the card punching machine are thereby controlled to punch holes at the digits 12 and 5 spaces in the thirtieth column of the card representative of the letter E, whereupon the contacts 2107 are closed indicative of the operation of the punches and the card is advanced in the usual manner preparatory to punching in the next data column. The closure of contacts 2107 causes the advance of the brushes of switch 1350 another step in the manner previously described whereupon progress relay 1391 is released.

As the brush 1356 advances into engagement with the

Nos. 12 to 17 terminals of its arc, the progress relays 1392 to 1397 (not shown) are successively operated and then released to connect other pairs of conductors of cable 1540 grounded by relay 1535, with terminals cross-connected to terminals of rack 2100 whereby punches of the card punching machine are controlled to punch holes in the thirty-first to thirty-sixth columns of the card representative of the remaining letters W-YORK of the place name. Following the punching for the final letter K, the brush 1356 of the switch 1350 is advanced into engagement with the eighteenth terminal of its arc, whereupon the progress relay 1398 (not shown) is operated. Since it is unnecessary to punch holes in the card representative of additional letters in the assumed place name, conductors 1545 and 1546 of the cable 1540, grounded by the operation of the place name relay 1535, are cross-connected at the rack 1387 so that upon the operation of the progress relay 1398, ground becomes connected over the Nos. 0 and 1 contacts of such relay to the Nos. 0 and 1 terminals cross-connected to the Nos. 0 and 1 terminals of rack 2100 of Fig. 21 whereby holes are punched in the digits 0 and 1 spaces of the thirty-seventh column of the card representative of a dash, following which the brushes of switch 1350 are advanced another step.

With brush 1356 engaged with the nineteenth terminal of its arc, progress relay 1399 is operated, resulting in the connection of conductors 1547 and 1548 grounded by the operation of the place name relay 1635, over the Nos. 0 and 1 contacts of relay 1399 to the Nos. 0 and 1 terminals on rack 2100 whereupon punches are operated representative of an additional dash. Thereafter, the brushes of switch 1350 are advanced an additional step in the manner previously described. It is to be noted in this connection that in each case that the place name has fewer than ten letters, the contact pairs of the place name relay not required for the control of the card punching machine to punch holes representative of the letters of the place name, are connected through contacts of the progress relays corresponding to unemployed place name letters in the manner just described in connection with the progress relay 1399, whereby the card punching machine is controlled to punch holes representative of dashes.

Should it be determined to be unnecessary to record the place name on the card, the place name relay such as 1535 and the progress relays 1390 to 1399 would be omitted. To advance the progress switch past the terminals of the arc associated with brush 1356 reserved for place name control of the card punching machine, such terminals 10 to 19, inclusive, would be strapped together and connected to the back contact of stepping magnet 1352 whereby the magnet would be repeatedly operated in a self-interrupting circuit to advance brush 1356 over terminals 10 to 19 of its arc.

Following the last advance of the progress switch 1350 brush 1356 will be in engagement with the No. 20 terminal of its arc thereby connecting ground from conductor GD over the upper normal contacts of relay 1352, over the upper back contact of relay 1388, over brush 1356, over conductor 1379 and through the winding of the DC progress relay 2101 of Fig. 1 to battery, whereupon relay 2101 will operate and extend conductor 2040 of the Total Dollars group, assumed to be grounded on a call for which the total indicated charge was calculated to be 35 cents, over its uppermost contacts to the No. 0 terminal on the rack 2100 whereby the No. 0 punch of the card punching machine is operated to punch a hole in the digit 0 space of the thirty-ninth column of the card representative of a digit 0 for the dollars place of the charge for the call.

Following the operation of the punch, the progress switch 1350 is advanced a further step thereby releasing relay 2101 and causing the operation of the DMC progress relay 2102 over a circuit extending from ground on conductor GD, over the upper normal contacts of relay 1352, over the upper back contact of relay 1388, over brush 1356, engaged with the twenty-first terminal of its arc, over conductor 1380 and through the winding of relay 2102 to battery. For a 35-cent total charge ground has as previously described been connected to conductor 2063 of the Total Dimes group and therefore this ground becomes extended over the No. 3 contacts of relay 2102 to the No. 3 terminal on rack 2100 whereby the No. 3 punch of the card punching machine is operated to punch a hole in the digit 3 space of the fortieth column of the card representative of a digit 3 for the dimes place of the charge for the call.

Following the operation of the punch, the progress switch 1350 is advanced a further step thereby releasing relay 2102 and establishing the circuit of the NC progress relay 2103. The circuit for relay 2103 may be traced from ground on conductor GD over the upper normal contacts of relay 1352, over the upper back contact of relay 1388, over brush 1356 and the No. 22 terminal of its arc, over conductor 1381 and through the winding of relay 2103 to battery. For a 35-cent total charge, ground has been connected to conductor 2055 of the Total Cents group and therefore this ground becomes extended over the lower contacts of relay 2103 to the No. 5 terminal on rack 2100 whereby the No. 5 punch of the card punching machine is operated to punch a hole in the digit 5 space of the forty-first column of the card representative of a digit 5 in the cents place of the charge for the call.

Following the operation of the punch the progress switch 1350 is advanced a further step thereby releasing relay 2103 and establishing the circuit of the switchover relay 1388, which circuit may be traced from ground on conductor GD, over the upper normal contacts of relay 1352, over the upper back contact of relay 1388, over brush 1356, over the No. 23 terminal of its arc and through the winding of relay 1388 to battery. Relay 1388 thereupon operates and locks over its lower contacts to ground on conductor GD and at its upper contacts opens its own operating circuit. With relay 1388 operated a circuit is now extended from ground on conductor GD over the upper normal contacts of relay 1352, over the upper front contact of relay 1388 and over brush 1357 and the No. 1 terminal of its associated arc to the back contact of stepping magnet 1351. Thereupon magnet 1351 operates to advance the brushes of switch 1350 one step.

Brush 1357 now completes a circuit from ground on conductor GD over the upper normal contacts of relay 1352, over the upper front contact of relay 1388, over brush 1357 and the No. 2 terminal of its arc, over conductor 1382 and through the winding of the DT progress relay 2104 to battery. It will be recalled that for the assumed call, a charge of 35 cents was made and that a federal tax of 5 cents was calculated and that ground was therefore connected to conductors 2170, 2160 and 2155. The ground on conductor 2170 is now extended through the operation of progress relay 2104 to the No. 0 terminal on rack 2100 whereby the No. 0 punch of the card punching machine is operated to punch a hole in the digit 0 space of the forty-second column of the card representative of a digit 0 in the dollars place for the tax for the call.

Following the operation of the punch, the progress switch 1315 is advanced a further step thereby releasing relay 2104 and establishing a circuit for the DMT progress relay 2105. This circuit may be traced from ground on conductor GD over the upper normal contacts of relay 1352, over the upper front contact of relay 1388, over brush 1357 and the No. 3 terminal of its arc, over conductor 1383 and through the winding of relay 2105 to battery. With ground connected to conductor 2160, such ground is now extended over the lower contacts of relay 2105 to the No. 0 terminal of rack 2100 whereby the No. 0 punch of the card punching machine is operated to punch a hole in the digit 0 space of the forty-third column of the card representative of a digit 0 in the tens place of the tax for the call.

Following the operation of the punch, the progress switch 1350 is advanced a further step thereby releasing relay 2105 and establishing a circuit for the NT progress relay 2106. The circuit for relay 2106 may be traced from ground on conductor GD over the upper normal contacts of relay 1352, over the upper front contact of relay 1388, over brush 1357, over conductor 1384 and through the winding of relay 2106 to battery. With ground connected to conductor 2155, such conductor is now extended over the lower contacts of relay 2106 to the No. 5 terminal on rack 2100 whereby the No. 5 punch of the card punching machine is operated to punch a hole in the digit 5 space of the forty-fourth column of the card representative of a digit 5 in the cents place of the tax for the call. Thus holes are punched in the card representative of the tax of 5 cents.

All of the data required for billing the toll call of the calling subscriber has now been punched in the toll card which card may be used in an automatic billing machine in the printing of a bill. While in the preceding description the punching of the toll data in a card in a particular order has been set forth, it will be obvious that the order in which the data is punched may be readily changed at the arc terminals of the progress switch 1350.

When brush 1357 engages the fifth terminal of its arc, following the completion of the control of the card punching machine, ground on conductor GD is applied over the normal contacts of relay 1352, over the upper front contact of relay 1388, over brush 1357 and over conductor 1385 through the winding of the RL relay 403 of Fig. 4. Relay 403 thereupon operates and locks over its left front contact to ground at the inner left contacts of relay 404 and at its left back contact opens the shunt around the right winding of relay 402. With all of the windings of relay 402 included in the previously traced circuit through the windings of relays 324 and 325 of Fig. 3, the current flowing through the winding of operated relay 325 is reduced to such an extent that relay 325 releases and initiates the release of the trunk finder 250, to disconnect the ticketing trunk from the receiving and calculating circuit at the accounting center. Relay 402 thereupon releases in turn releasing relays 400, 403, and 404. Relay 404 upon releasing removes ground from conductors GD and 605.

The removal of ground from conductor 605 releases all of the operated register relays of Figs. 6 to 13, inclusive, which in turn cause the release of all of the operated relays of Figs. 14 to 21, inclusive. The removal of ground from conductor GD releases the operated relays 1304 and 1388 of Fig. 13. Relay 1304 upon releasing applies ground over its back contact and the strapped terminals of the arc associated with brush 1353, over the back contact and through the winding of stepping magnet 1351. Magnet 1351 thereupon operates over its self-interrupting circuit to advance the brushes of the switch 1350 until brush 1354 engages the strapped terminals of its associated arc. Thereafter with ground applied from the back contact of relay 1304 to such strapped terminals, the brushes of switch 1350 are advanced through another half revolution by the magnet 1351 until the brush 1354 leaves the last terminal of its arc whereupon the circuit of magnet 1351 is broken and the switch brushes come to rest with brush 1353 in engagement with the normal terminal of its arc.

While the invention has been disclosed herein as applied to a system in which the data for each toll call is recorded magnetically on a tape and is transmitted upon the termination of the call to a central accounting center in which the necessary computations for the cost of the call are made in accordance with the established rate structure and in which a toll record of the call is thereafter made for use in an automatic billing machine, it is of course obvious that the data for each toll call could be recorded in other well-known manners such as preparing a punched record, scannable by a suitable reader or preparing a printed record scannable by a photoelectric scanner and that the computed data for each toll call could be recorded in any suitable manner as by printing or punching.

Furthermore, the toll record whether punched, printed or electromagnetically produced could contain the date of several toll calls and be transmitted to the accounting center at such time during the billing period as would be most conducive to efficient operation rather than upon the termination of each separate call and the computing apparatus could accordingly be arranged to prepare a new record in which punching would be made of the computed data for such toll calls.

Furthermore, the output of the computations together with the subscriber's directory number and other pertinent information could be recorded on magnetic paper or metal tape so that the process of sorting could be carried out by electronic means at greater speed and efficiency than is possible with punched cards or tapes.

What is claimed is:

1. In an automatic billing system, a plurality of originating offices, a plurality of recording means in each of said offices each arranged to record a plurality of items of information, an accounting center common to said offices, a plurality of receiving means at said accounting center, means effective at the completion of recording in any one of said recording means for connecting said recording means to any idle one of said receiving means, and means for transmitting the items of information recorded in said recording means to said selected receiving means.

2. In an automatic billing system, a telephone office, a tape recorder at said office for recording a plurality of items of information, an accounting center, a plurality of receiving means at said accounting center, means effective at the completion of recording on the tape of said recorder for connecting said recorder to any idle one of said receiving means, means effective upon the selection of said idle receiving means for causing said recorder to transmit signals to said receiving means representative of the recorded items of information, tuned circuits in said receiving means selectively responsive to said signals, and registers controlled by said tuned circuits for registering the items of information.

3. In an automatic billing system, a plurality of telephone offices, means at each of said offices for determining a plurality of items of information, a plurality of first trunks at each of said offices, a plurality of recording means at each of said offices, one recording means individual to each of said trunks, said recording means being operative under the control of said means for recording said information on a recording medium, an accounting center common to said offices, a plurality of receiving means at said accounting center, a trunk interconnecting each of said offices and said accounting center terminating at one end in a trunk finder and at the other end in a receiver selector, means effective at the completion of recording in the recording means of any one of said first trunks for causing the operation of said trunk finder and said receiver selector to connect said recording means to any idle one of said receiving means, and means for transmitting the items of information recorded on said recording medium in said recording means over said interconnecting trunk to a recording medium in said selected receiving means.

4. In an automatic billing system, a plurality of telephone offices, means at each of said offices for determining information as to the calling and called party's directory numbers, the class of the calling line, the charge rate for the call and the elapsed conversation time, a plurality of first trunks at each of said offices, a plurality of recording means at each of said offices, one recording means individual to each of said trunks, said recording means being operative under the control of said means for recording said information on a recording medium, an accounting center common to said offices, a plurality of receiving means at said accounting center, a trunk interconnecting each of said offices and said accounting center terminating at one end in a trunk finder and at the other end in a receiver selector, means effective at the completion of recording in the recording means of any one of said first trunks for causing the operation of said trunk finder and said receiver selector to connect said recording means to any idle one of said receiving means, and means for transmitting the items of information recorded on said recording medium in said recording means over said interconnecting trunk to a recording medium in said selected receiving means.

References Cited in the file of this patent

UNITED STATES PATENTS

| | | |
|---|---|---|
| 2,112,951 | Carpenter | Apr. 5, 1938 |
| 2,165,924 | Goodrum | July 11, 1939 |
| 2,266,215 | Kesten | Dec. 16, 1941 |
| 2,289,939 | Stehlik | July 14, 1942 |
| 2,297,365 | Ostline | Sept. 29, 1942 |
| 2,298,519 | Tillman | Oct. 13, 1942 |
| 2,369,868 | Taylor | Feb. 20, 1945 |
| 2,484,612 | Dehn et al. | Oct. 11, 1949 |
| 2,486,722 | Stehlik | Nov. 1, 1949 |
| 2,513,112 | Shepherd | June 27, 1950 |